(12) United States Patent
Weed et al.

(10) Patent No.: US 11,529,913 B2
(45) Date of Patent: Dec. 20, 2022

(54) MANAGING RECREATIONAL VEHICLES AND ACCESSORIES

(71) Applicant: Polaris Industries Inc., Medina, MN (US)

(72) Inventors: Joshua T. Weed, Forest Lake, MN (US); Aidan B. Shaughnessy, Madison, AL (US); Brian D. Krosschell, North Branch, MN (US)

(73) Assignee: Polaris Industries Inc., Medina, MN (US)

( * ) Notice: Subject to any disclaimer, the term of this patent is extended or adjusted under 35 U.S.C. 154(b) by 506 days.

(21) Appl. No.: 16/560,692

(22) Filed: Sep. 4, 2019

(65) Prior Publication Data

US 2020/0198561 A1 Jun. 25, 2020

Related U.S. Application Data

(60) Provisional application No. 62/878,927, filed on Jul. 26, 2019, provisional application No. 62/783,601, filed on Dec. 21, 2018.

(51) Int. Cl.
| | | |
|---|---|---|
| *B60R 16/023* | (2006.01) | |
| *B60K 35/00* | (2006.01) | |
| *B60P 1/64* | (2006.01) | |
| *B60Q 1/14* | (2006.01) | |
| *B60Q 1/26* | (2006.01) | |

(Continued)

(52) U.S. Cl.
CPC ......... *B60R 16/0231* (2013.01); *B60K 35/00* (2013.01); *B60P 1/6409* (2013.01); *B60Q 1/1407* (2013.01); *B60Q 1/2615* (2013.01); *B60R 16/0238* (2013.01); *B60R 16/03* (2013.01); *B62D 63/04* (2013.01); *G06F 13/4282* (2013.01); *G06K 7/10366* (2013.01); *G06K 19/0723* (2013.01); *H04L 67/12* (2013.01); *B60K 2370/111* (2019.05); *B60K 2370/152* (2019.05); *B60K 2370/157* (2019.05); *B60K 2370/171* (2019.05); *B60K 2370/48* (2019.05); *B60K 2370/566* (2019.05); *B60K 2370/586* (2019.05); *B60K 2370/589* (2019.05); *B60K 2370/61* (2019.05); *B60K 2370/95* (2019.05); *B60Q 2300/10* (2013.01); *B60R 21/13* (2013.01); *G06F 2213/40* (2013.01)

(58) Field of Classification Search
USPC .......................................................... 701/36
See application file for complete search history.

(56) References Cited

U.S. PATENT DOCUMENTS

| | | |
|---|---|---|
| 3,861,229 A | 1/1975 | Domaas |
| 6,120,399 A | 9/2000 | Okeson |

(Continued)

OTHER PUBLICATIONS

International Search Report and Written Opinion issued by The International Searching Authority, dated Jun. 15, 2020, for International Patent Application No. PCT/US2019/49559; 24 pages.

*Primary Examiner* — Tyler D Paige
(74) *Attorney, Agent, or Firm* — Faegre Drinker Biddle & Reath LLP

(57) ABSTRACT

A vehicle is electrically connected to one or more accessories. The vehicle includes at least one controller that may be configured to identify the accessory based on accessory identification information. The controller may also be configured to provide one or more commands to control an operation of the accessory.

16 Claims, 42 Drawing Sheets

(51) Int. Cl.
*B62D 63/04* (2006.01)
*G06F 13/42* (2006.01)
*G06K 19/07* (2006.01)
*G06K 7/10* (2006.01)
*B60R 16/03* (2006.01)
*H04L 67/12* (2022.01)
*B60R 21/13* (2006.01)

(56) References Cited

U.S. PATENT DOCUMENTS

| | | | |
|---|---|---|---|
| 6,176,796 | B1 | 1/2001 | Lislegard |
| 6,860,826 | B1 | 3/2005 | Johnson |
| 6,938,508 | B1 | 9/2005 | Saagee |
| 8,544,587 | B2 | 10/2013 | Holroyd |
| 8,827,019 | B2 | 9/2014 | Deckard |
| 9,211,924 | B2 | 12/2015 | Safranski |
| 9,738,134 | B1 | 8/2017 | Rittenour |
| 9,809,195 | B2 | 11/2017 | Giese |
| 10,183,717 | B2 | 1/2019 | Holt |
| 2007/0050095 | A1 | 3/2007 | Nelson |
| 2014/0303807 | A1 | 10/2014 | Addepalli |
| 2015/0193030 | A1 | 7/2015 | Grover |
| 2015/0223032 | A1 | 8/2015 | Nespolo |
| 2016/0059660 | A1 | 3/2016 | Brady |
| 2016/0129916 | A1 | 5/2016 | Olsen |
| 2017/0008162 | A1 | 1/2017 | Tsubota |
| 2017/0034326 | A1 | 2/2017 | Chang |
| 2017/0127230 | A1 | 5/2017 | Enriquez |
| 2017/0182957 | A1 | 6/2017 | Watson |
| 2017/0334500 | A1 | 11/2017 | Jarek |
| 2018/0141543 | A1 | 5/2018 | Krosschell |
| 2020/0198467 | A1* | 6/2020 | Shaughnessy ...... G06F 13/4282 |
| 2020/0198559 | A1* | 6/2020 | Krosschell ......... G06K 19/0723 |
| 2020/0198561 | A1* | 6/2020 | Weed .................... B60P 1/6409 |

* cited by examiner

| Accessory |
|---|
| 10" Light Bar |
| 30" Light Bar |
| Cube Lights |
| Worklight |
| Wiper |
| Wiper Pump |

| Vout@14V | Z1 (OHM) | Z2 (OHM) |
|---|---|---|
| 3 | 1100 | 300 |
| 4 | 1000 | 400 |
| 5 | 900 | 500 |
| 6 | 800 | 600 |
| 7 | 700 | 700 |
| 8 | 600 | 800 |

Fig. 15

| Channel | Priority | $I_{max}$ (A) | Logic | PWM | Override |
|---------|----------|---------------|-------|-----|----------|
| 1 | 2 | 6 | Key | Y | NO |
| 2 | 1 | 15 | L,H | N | YES |
| 3 | 3 | 5 | R | Y | NO |
| | | | | | |
| | | | | | |
| n | n | $I_n$ | | N | N |

Fig. 24

MANAGING RECREATIONAL VEHICLES AND ACCESSORIES

CROSS-REFERENCE TO RELATED APPLICATIONS

This application claims benefit of U.S. Provision Application No. 62/783,601, filed Dec. 21, 2018, titled SYSTEMS AND METHODS FOR CONNECTING ACCESSORIES TO RECREATIONAL VEHICLES, and U.S. Provisional Application No. 62/878,927 filed Jul. 26, 2019, titled SYSTEMS AND METHODS FOR CONNECTING ACCESSORIES TO RECREATIONAL VEHICLES, the entire disclosures of which are expressly incorporated by reference herein.

FIELD OF DISCLOSURE

The present disclosure relates to recreational vehicles and accessories, and in particular to systems and methods for connecting accessories to a recreational vehicle, controlling accessories, and/or displaying the connected accessories on a user interface of the vehicle.

BACKGROUND OF THE DISCLOSURE

Recreational vehicles, such as motorcycles, all-terrain vehicles (ATVs), side-by-side vehicles, utility vehicles, and snowmobiles, are widely used for recreational purposes. These vehicles might be used on-road and/or off-road, such as trails.

Recreational vehicles with display screens are known. Systems and methods for displaying customized information regarding a recreational vehicle are disclosed in US Published Patent Application 2017/0334500 (filed May 23, 2016, titled DISPLAY SYSTEMS AND METHODS FOR A RECREATIONAL VEHICLE), the entire disclosure of which is expressly incorporated by reference herein. However, it is difficult to automatically connect accessories to recreational vehicles, and to control the connected accessories from the display. Accordingly, there exists a need for one or more improved methods or systems in order to address one or more of the above-noted drawbacks.

SUMMARY OF THE DISCLOSURE

In an exemplary embodiment of the present disclosure, a method for connecting an accessory to a vehicle is provided. For example, a controller receives, from the accessory, accessory identification in response to establishing a physical connection between the vehicle and the accessory. The controller identifies the connected accessory based on the received accessory identification information. The controller displays on a display of the vehicle a representation of at least a portion of the vehicle and a representation of the connected accessory. The representation of the connected accessory is displayed in response to the identification of the connected accessory.

In some instances, the controller receives the accessory identification information via a controller area network (CAN) bus. In some examples, the controller receives the accessory identification information via a LIN bus. In some variations, the controller receives signal fluctuation characteristics via one or more power lines. The controller compares the signal fluctuation characteristics received from the one or more power lines to at least one known signal fluctuation characteristic to identify the accessory. The at least one known signal fluctuation characteristic is unique to the connected accessory. In some instances, the controller receives the accessory identification information via the physical connection. In some examples, the accessory identification information indicates an electrical characteristic corresponding to the physical connection between the vehicle and the connected accessory.

In some variations, the electrical characteristic is a voltage. The controller identifies the accessory by comparing the voltage to one or more known voltages corresponding to one or more known accessories. In some instances, the electrical characteristic is a pulse width modulation (PWM) characteristic. The controller identifies the connected accessory by comparing the PWM characteristic to one or more known PWM characteristics corresponding to one or more known accessories.

In some examples, the controller determining whether an accessory speaker or a base speaker is connected to the vehicle. In response to determining the accessory speaker is connected, the controller enables a plurality of first characteristics corresponding to the accessory speaker. In response to determining the base speaker is connected, the controller enables a plurality of second characteristics corresponding to the base speaker. In some variations, the controller determines one or more faults corresponding to connecting the accessory speaker or the base speaker to the vehicle. The controller displays the one or more determined faults on the display of the vehicle. In some examples, the controller displays, on the display of the vehicle, the representation of at least the portion of the vehicle and a representation of the accessory speaker. The controller displays, on the display of the vehicle, the representation of at least the portion of the vehicle and a representation of the base speaker.

In another exemplary embodiment of the present disclosure, a method for connecting an accessory to a vehicle is provided. The controller wirelessly receives, from a mobile device and by a vehicle controller, accessory identification information corresponding to the accessory. The controller determines the accessory based on the received accessory identification information. The controller causing display of a representation of at least a portion of the vehicle and a representation of the accessory on a user interface, the representation of the accessory being displayed in response to the determination of the accessory.

In some instances, the mobile device comprises a radio frequency identification (RFID) scanner. The accessory identification information indicates a scanned RFID tag. The controller determines the accessory is based on comparing the scanned RFID tag with one or more known RFID tags corresponding to one or more known accessories. In some examples, the mobile device comprises the user interface. The controller provides one or more instructions to the mobile device to cause display of the representation of at least the portion of the vehicle and the representation of the accessory on the user interface of the mobile device. In some variations, the user interface is a vehicle display interface. The accessory identification information indicates an identity of the accessory. The controller determines the accessory based on the identity of the accessory. The controller causes display of the representation of at least the portion of the vehicle and the representation of the accessory on the vehicle display interface. In some instances, the user interface is a vehicle display interface. The accessory identification information indicates an image of the accessory. The controller determines the accessory based on the image of the accessory. The controller causes display of the representation of at least the portion of the vehicle and the representation of the accessory on the vehicle display interface.

In another exemplary embodiment of the present disclosure, a vehicle system for use with at least one removable accessory is provided. The vehicle system comprises a recreational vehicle associated with a user interface and a wiring harness operatively coupled to the at least one removable accessory and the recreational vehicle. The recreational vehicle includes a plurality of ground engaging members, a frame supported by the plurality of ground engaging members, and a controller. The controller is configured to receive accessory identification information from the at least one removable accessory and via a wiring harness, identify the at least one removable accessory based on the accessory identification information, and provide one or more commands to control the at least one removable accessory based on the identifying the at least one removable accessory.

In some instances, the user interface includes a display and the controller is further configured to cause a representation of the at least one removable accessory to be presented on the display of the user interface in response to the at least one removable accessory being identified. In some examples, a first unit includes the user interface and the controller. In some variations, the controller is separate from the user interface. In some instances, the vehicle system further comprises the at least one removable accessory comprising an accessory controller. The accessory controller configured to receive, using a communication method, the one or more commands to control the at least one removable accessory, and execute the one or more commands. In some variations, the communication method comprises at least one of: a CAN bus, a LIN bus, a communication protocol over one or more power lines, and a pulse width modulation (PWM) characteristic over one or more dedicated PWM lines. In some examples, the accessory identification information indicates a particular voltage associated with the at least one removable accessory. The wiring harness comprises voltage divider circuitry. The voltage divider circuitry is configured to provide the particular voltage associated with the at least one removable accessory to the controller.

In some instances, the recreational vehicle further comprises the user interface. The user interface is supported by the frame and configured to receive user input from a user. In some variations, the wiring harness comprises a transceiver configured to transmit the accessory identification information and receive the one or more commands. The wiring harness further comprises a wiring harness controller operatively coupled to the transceiver and configured to execute the one or more commands.

In another exemplary embodiment of the present disclosure, a recreational vehicle operatively coupled to a user interface is provided. The recreational vehicle includes a plurality of ground engaging members, a frame supported by the plurality of ground engaging members, an electrical power supply supported by the frame and configured to provide power to at least one removable accessory, at least one sensor operatively coupled to the frame and configured to provide sensor information, and a controller. The controller is configured to receive user input indicating at least one user priority from the user interface, receive the sensor information from the at least one sensor, and adjust the power from the electrical power supply to the at least one removable accessory based on the sensor information and the user input.

In some instances, the user input indicates a threshold to adjust the power to the at least one removable accessory. The sensor information indicates a sensor value. The controller is configured to adjust the power from the electrical power supply to the at least one removable accessory based on determining whether the sensor value satisfies the threshold from the user input. In some examples, the at least one sensor comprises an electrical power supply voltage sensor configured to provide an electrical power supply voltage to the controller. The controller is configured to adjust the power from the electrical power supply to the at least one removable accessory based on the user input and determining the electrical power supply voltage satisfies a threshold. In some variations, the recreational vehicle further comprises an engine supported by the frame. The at least one sensor comprises an engine speed sensor configured to monitor an engine speed of the engine and provide the engine speed to the controller. The controller is configured to adjust the power from the electrical power supply to the at least one removable accessory based on the user input and based on determining the engine speed satisfies a threshold.

In some instances, the at least one sensor comprises an accessory current consumption sensor configured to detect a current consumption of the at least one removable accessory and provide the current consumption to the controller. The controller is configured to adjust the power from the electrical power supply to the at least one removable accessory based on the user input and based on determining the current consumption satisfies a threshold. In some examples, the controller is further configured to determine a voltage corresponding to the at least one removable accessory, determine a power consumption of the at least one removable accessory based on the voltage and the current consumption, and to adjust the power from the electrical power supply to the at least one removable accessory based on the user input and the power consumption of the at least one removable accessory.

In some instances, the controller comprises the accessory current consumption sensor, and the controller is configured to detect the current consumption of the at least one removable accessory. In some examples, the user input indicates a first maximum current allowed threshold for a first accessory of the at least one removable accessory. The at least one sensor comprises an accessory current consumption sensor configured to detect a first current consumption of the first accessory and provide the first current consumption to the controller. The controller is configured to terminate the power from the electrical power supply to the first accessory based on determining whether the first current consumption of the first accessory satisfies the first maximum current allowed threshold. In some examples, the user input further indicates a second maximum current allowed threshold for a second accessory of the at least one removable accessory. The second maximum current allowed threshold is different from the first maximum current allowed threshold. The accessory current consumption sensor is configured to detect a second current consumption of the second accessory and provide the second current consumption to the controller. The controller is configured to terminate the power from the electrical power supply to the second accessory based on determining whether the second current consumption of the second accessory satisfies the second maximum current allowed threshold.

In another exemplary embodiment of the present disclosure, a method for connecting an accessory to a vehicle is provided. The controller receives user input indicating a plurality of priorities corresponding to the plurality of accessories. The controller receives, from at least one sensor, sensor information indicating a vehicle parameter. The controller determines at least one accessory from the plurality of accessories based on the plurality of priorities and the vehicle parameter satisfying a vehicle parameter threshold associated with the at least one accessory. The controller provides one or more commands to limit an amount of power supplied to the at least one accessory.

In some instances, the controller determines a plurality of vehicle parameter thresholds based on the plurality of priorities, determines whether to turn off power to the at least one accessory based on comparing the vehicle parameter with the plurality of vehicle parameter thresholds, and provides one or more commands to turn off the power to the at least one accessory. In some examples, the controller determines a plurality of vehicle parameter thresholds based on the plurality of priorities, determines whether to reduce the amount of power supplied to the at least one accessory based on comparing the vehicle parameter with the plurality of vehicle parameter thresholds, and provides one or more commands to reduce the amount of power supplied to the at least one accessory. In some instances, each priority of the plurality of priorities has a corresponding accessory of the plurality of accessories.

In some variations, the sensor information indicating the vehicle parameter comprises electrical power supply voltage information indicating a state of charge of an electrical power supply. In some instances, the sensor information indicating the vehicle parameter comprises engine speed information indicating whether an engine of the vehicle is turned off. In some examples, the sensor information indicating the vehicle parameter comprises sensor information indicating a total current consumption of the plurality of accessories or a total power consumption of the plurality of accessories.

In another exemplary embodiment of the present disclosure, a recreational vehicle operatively coupled to a user interface is provided. The recreational vehicle includes a plurality of ground engaging members, a frame supported by the plurality of ground engaging members, at least one sensor operatively coupled to the frame and configured to provide sensor information, and a controller. The controller is configured to identify an accessory type corresponding to at least one accessory operatively coupled to the recreational vehicle, receive user input indicating a customization of one or more vehicle parameters for the at least one accessory from the user interface, receive the sensor information indicating the one or more vehicle parameters from the at least one sensor, generate one or more instructions to control at least one removable accessory based on the accessory type and the comparing the sensor information with the user input indicating the customization associated with the at least one removable accessory, and provide, to the at least one removable accessory, the one or more instructions.

In some instances, the controller is configured to determine, based on the sensor information, whether the recreational vehicle is encountering an event and generate the one or more instructions to control the at least one removable accessory based on the event. In some examples, the event is an airborne event, a turning event, a cornering event, an idling event, or a braking event. In some instances, the at least one sensor comprises an inertial measurement unit (IMU). The sensor information indicates an IMU measurement. In some variations, the IMU measurement comprises at least one of: a yaw rate, a pitch rate, a roll rate, a lateral acceleration, and a longitudinal acceleration. In some examples, the at least one sensor comprises a steering sensor. The sensor information indicates a steering angle, a steering rate, or a steering position.

In some instances, the at least one removable accessory comprises a light accessory. In some examples, the at least one sensor comprises a vehicle speed sensor. The sensor information indicates a vehicle speed. The controller is configured to generate the one or more instructions to control the light accessory based on the vehicle speed satisfying one or more vehicle speed thresholds. In some variations, the at least one sensor comprises a vehicle speed sensor and the sensor information indicates a vehicle speed. The controller is configured to determine a number of lights within the light accessory to turn on based on data representing an algorithm and the vehicle speed and generate one or more instructions to turn on the determined number of lights within the light accessory.

In some variations, the at least one sensor comprises a global positioning system (GPS) sensor and the sensor information indicates a geographical location of the recreational vehicle. The controller is configured to generate the one or more instructions to control the light accessory based on the geographical location of the recreational vehicle. In some instances, the at least one sensor comprises an ambient light detection sensor and the sensor information indicates a detected amount of ambient light surrounding the recreational vehicle. The controller is configured to generate the one or more instructions to control the light accessory based on the detected amount of ambient light.

In some examples, the at least one sensor comprises an inertial measurement unit (IMU), the sensor information indicates an IMU measurement, the controller is further configured to determine an orientation of the recreational vehicle based on the IMU measurement, and the controller is configured to generate the one or more instructions to control the light accessory based on the orientation of the recreational vehicle. In some instances, the controller determines the orientation of the recreational vehicle by determining whether the recreational vehicle is on flat ground, travelling uphill, or travelling downhill. In some variations, the controller generates the one or more instructions to control the light accessory by generating, based on the orientation of the recreational vehicle, one or more instructions to activate or de-activate the light accessory.

In some examples, the controller generates the one or more instructions to control the light accessory by generating, based on the orientation of the recreational vehicle, one or more instructions to actuate the light accessory to adjust an angle of a beam of light generated by the light accessory. In some instances, the IMU measurement is a pitch angle of the recreational vehicle. In some variations, the user input indicates a user-defined IMU threshold for the IMU measurement and the controller determines the orientation of the recreational vehicle based on the user-defined IMU threshold and the sensor information. In some variations, the controller is further configured to receive second user input indicating an angle to adjust a beam of light generated the light accessory, and generate the one or more instructions to control the light accessory by generating one or more instructions to actuate the light accessory to adjust the angle of the beam of light based on the second user input and the orientation of the recreational vehicle.

In some instances, the at least one removable accessory comprises a mechanical attachment accessory. In some examples, the user interface, and wherein the user interface is supported by the frame and configured to receive the user input from a user.

In another exemplary embodiment of the present disclosure, a recreational vehicle operatively coupled to a user interface is provided. The recreational vehicle includes a plurality of ground engaging members, a frame supported by the plurality of ground engaging members, a user configurable input device operatively coupled to the user interface, and a controller. The controller is configured to receive a first user input indicating customization of the user configurable input device from the user interface, change, based on the first user input, an action associated with the user configurable input device such that the user configurable input device is configured to control at least one removable accessory, subsequent to changing the action associated with the user configurable input device, receive a second user input from the user configurable input device, generate one or more instructions to control the at least one removable accessory based on the customization of the user configurable input device and the second user input, and provide, to the at least one removable accessory, the one or more instructions.

In some instances, the user configurable input device is physical input device and is configured to provide the second user input to the controller. In some examples, the user configurable input device is an analog user input device and configured to provide information indicating an analog value to the controller. In some variations, the at least one removable accessory comprises a light accessory. The controller is configured to change the action associated with the user configurable input device such that the user configurable input device is configured to turn on or turn off the light accessory and generate one or more instructions to turn on or turn off the light accessory. In some instances, the at least one removable accessory comprises a plurality of light accessories. The controller is configured to change the action associated with the user configurable input device such that the user configurable input device is configured to turn on or turn off the plurality of light accessories with the second user input. The second user input is a single user input. The controller is configured to generate one or more instructions to turn on or turn off the plurality of light accessories based on the single second user input.

In some examples, the user configurable input device is a network controller. The controller is configured to receive the second user input via the network controller and from a key frequency operated button (FOB) comprising at least one second user configurable input device. In some instances, the at least one removable accessory comprises a first accessory and a second accessory. The controller is configured to change the action for the at least one second user configurable input device from being able to control the first accessory to being able to control the second accessory. In some variations, the user configurable input device is an interactive button displayed on the user interface. In some instances, the at least one removable accessory comprises a light accessory. The controller is configured to cause display of a representation of at least a portion of the recreational vehicle and a representation of the light accessory. The interactive button displayed on the user interface corresponds to the representation of the light accessory. In some variations, the vehicle comprises the user interface, and the user interface is supported by the frame and configured to provide the first user input indicating customization of the user configurable input device.

In another exemplary embodiment of the present disclosure, a recreational vehicle operatively coupled to a user interface is provided. The recreational vehicle includes a plurality of ground engaging members, a frame supported by the plurality of ground engaging members, a user input device operatively coupled to the user interface, and a controller. The controller is configured to determine a vehicle type of the recreational vehicle based on a vehicle information number (VIN), receive, from the user input device, user input indicating system information indicating one or more installed audio components and a vehicle configuration, determine an audio tune configuration for a vehicle system based on comparing the determine vehicle type and the received system information with stored vehicle types and system information entries, and configure the vehicle system using the determined audio tune configuration.

In some instances, the audio tune configuration indicates a distortion setting for the vehicle system and the controller configures the vehicle system by providing one or more signals to a digital signal processor to reduce the distortion of one or more audio signals based on the distortion setting. In some examples, the audio tune configuration indicates a delay setting for the vehicle system, and the controller configures the vehicle system by providing one or more signals to a digital signal processor to adjust the delay settings for the one or more installed audio components. In some variations, the audio tune configuration indicates a frequency setting for the vehicle system, the frequency setting indicates pre-determined gains at a plurality of different frequency bands, and the controller configures the vehicle system by providing one or more signals to a digital signal processor or an amplifier to set the plurality of different frequency bands at the pre-determined gains.

In some examples, the controller is further configured to determine, based on the user input, whether the vehicle system includes one or more audio components installed in a rear portion of the recreational vehicle, and determine the audio tune configuration for the vehicle system based on whether the vehicle system includes the one or more audio components in the rear portion of the recreational vehicle. In some instances, the controller is further configured to determine, based on the user input, whether the vehicle system includes an installed subwoofer, and determine the audio tune configuration for the vehicle system based on whether the vehicle system includes the installed subwoofer. In some variations, the controller is further configured to determine, based on the user input indicating the vehicle configuration, whether the vehicle configuration indicates one or more enclosure attachments are installed on the recreational vehicle, and determine the audio tune configuration for the vehicle system based on whether the vehicle configuration indicates the one or more enclosure attachments are installed on the recreational vehicle.

In some examples, the recreational vehicle further comprises a digital signal processor operatively coupled to the controller, and the controller is configured to configure the vehicle system by providing one or more commands to the digital signal processor to adjust at least one of a distortion setting, a delay setting, and a frequency setting based on the audio tune configuration. In some instances, the controller comprises the digital signal processor.

In another exemplary embodiment of the present disclosure, a recreational vehicle includes a plurality of ground engaging members, a frame supported by the plurality of ground engaging members, a plurality of light devices, at least one location determination devices, and a controller in communication with the plurality of light devices and the at least one location determination devices. The controller is configured to determine a user location based on the location information from the one or more location determination devices, determine at least one lighting characteristic for at least one light device from the plurality of light devices based on the user location, and provide, to the at least one light device, one or more instructions to the at least one light device indicting the at least one lighting characteristic.

In some examples, the one or more location determination devices comprise at least two signal receivers. The controller is configured to determine the user location based on receiving a first signal characteristic associated with a remote device from a first receiver of the at least two signal receivers, receiving a second signal characteristic associated with the remote device from a second receiver of the at least two signal receivers, and determining the user location based on the first signal characteristic and the second signal characteristic. In some instances, the one or more location determination devices comprise at least one detection device. The controller is configured to determine the user location based on information from the detection device. In some examples, the at least one detection device includes at least one of: a camera, a heat-seeking sensor, a motion sensor, and an ultrasonic sensor.

In some variations, wherein the at least one light device comprises a first light accessory and a first OEM light. The controller is further configured to identify the first light accessory operatively coupled to the recreational vehicle. The controller is configured to provide the one or more instructions by providing one or more instructions to control the first light accessor, and providing one or more instructions to control the first OEM light. In some instances, the controller determines the at least one lighting characteristic for the at least one light device by determining to activate or de-activate the at least one light device. In some examples, the controller determines the at least one lighting characteristic for the at least one light device by determining to adjust an orientation the at least one light device. In some variations, the controller determines the at least one lighting characteristic for the at least one light device by determining to adjust a brightness of the at least one light device.

In another exemplary embodiment of the present disclosure, a method of controlling at least one light device supported by a recreational vehicle based on a location of a vehicle user is provided. The method comprises determining a position of a remote device associated with the vehicle user relative to the vehicle, and altering a lighting characteristic of the at least one light device supported by the recreational vehicle based on the position of the remote device associated with the vehicle.

In some instances, the remote device is a helmet being worn by the vehicle user. In some examples, the lighting characteristic is an activation of the at least one lighting device. In some variations, the lighting characteristic is a deactivation of the at least one lighting device. In some instances, the lighting characteristic is an orientation of the at least one lighting device relative to a frame of the vehicle. In some examples, the lighting characteristic is a brightness of the at least one lighting device.

In another exemplary embodiment of the present disclosure, a recreational vehicle includes a plurality of ground engaging members, a frame supported by the plurality of ground engaging members, at least one sensor operatively coupled to the frame and configured to provide sensor information indicating one or more vehicle parameters, the at least one sensor including a vehicle pitch sensor, at least one lighting device supported by the frame, and a controller operatively coupled to the at least one sensor and operatively coupled to the at least one lighting device. The controller is configured to receive a pitch of the vehicle from the vehicle pitch sensor and alter a lighting characteristic of the at least one lighting device based on the pitch of the vehicle.

In some instances, the controller is further configured to determine, based on the pitch of the vehicle, an orientation of the vehicle. The controller is configured to alter the lighting characteristic based on the orientation of the vehicle. In some examples, the at least one lighting device includes a first lighting device positioned at a forward end of the recreational vehicle and a second lighting device positioned between a forward pair of the plurality of ground engaging members and a rear pair of the plurality of ground engaging members. In some variations, an operator seat supported by the frame and a roll cage extending over the operator seat, wherein the second lighting device is supported by the roll cage.

In some instances, the lighting characteristic is an activation of the at least one lighting device. In some examples, the lighting characteristic is a deactivation of the at least one lighting device. In some variations, the lighting characteristic is an orientation of the at least one lighting device relative to a frame of the vehicle. In some instances, the lighting characteristic is a brightness of the at least one lighting device.

Additional features of the present disclosure will become apparent to those skilled in the art upon consideration of the following detailed description of illustrative embodiments exemplifying the best mode of carrying out the invention as presently perceived.

BRIEF DESCRIPTION OF THE DRAWINGS

The foregoing aspects and many additional features of the present system and method will become more readily appreciated and become better understood by reference to the following detailed description when taken in conjunction with the accompanying drawings, where:

FIG. 15 illustrates an exemplary table used to identify the one or more accessories;

FIG. 24 illustrates the exemplary user interface of FIG. 16 displaying a seventh exemplary screen layout, such as a channel-by-channel adjustment screen;

DETAILED DESCRIPTION OF EMBODIMENTS

Figure 1:
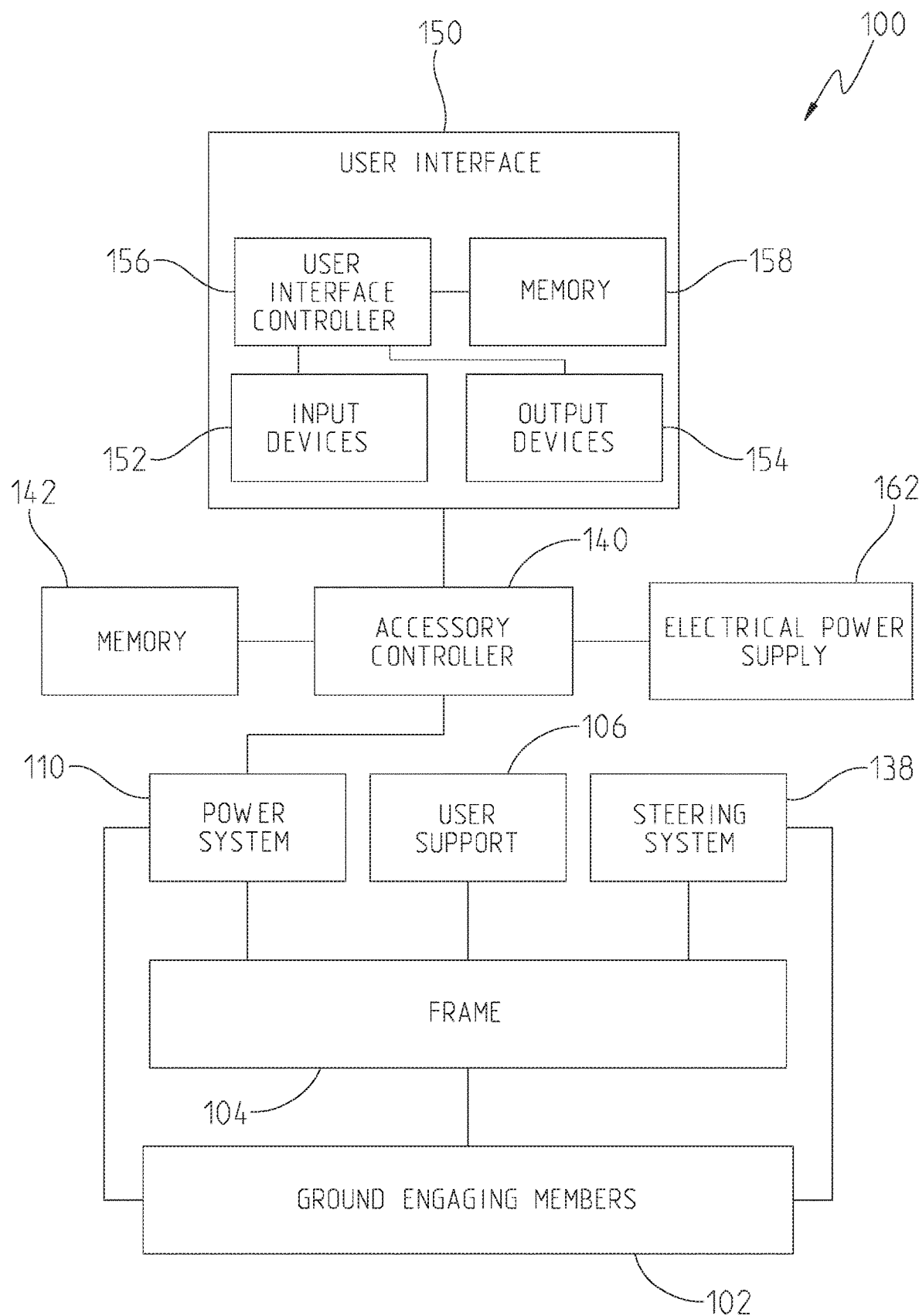
FIG. 1 is a representative view of an exemplary vehicle.

For the purposes of promoting an understanding of the principles of the present disclosure, reference will now be made to the embodiments illustrated in the drawings, which are described below. The embodiments disclosed below are not intended to be exhaustive or limited to the precise form disclosed in the following detailed description. Rather, the embodiments are chosen and described so that others skilled in the art may utilize their teachings.

Referring to FIG. 1, a recreational vehicle 100 is represented. Recreational vehicle 100 includes a plurality of ground engaging members 102. Exemplary ground engaging members include skis, endless tracks, wheels, and other suitable devices which support vehicle 100 relative to the ground. Recreational vehicle 100 further includes a frame 104 supported by the plurality of ground engaging members 102. In one embodiment, frame 104 includes cast portions, weldments, tubular components or a combination thereof. In one embodiment, frame 104 is a rigid frame. In one embodiment, frame 104 has at least two sections which are moveable relative to each other.

A user support 106 is supported by frame 104. Exemplary user supports include straddle seats, bench seats, bucket seats, and other suitable support members. In addition to user support 106, recreational vehicle 100 may further include a passenger support. Exemplary passenger supports include straddle seats, bench seats, bucket seats, and other suitable support members.

A power system 110 is supported by frame 104. Power system 110 provides the motive force and communicates the same to at least one of the ground engagement members 102 to power movement of recreational vehicle 100.

Figure 2:
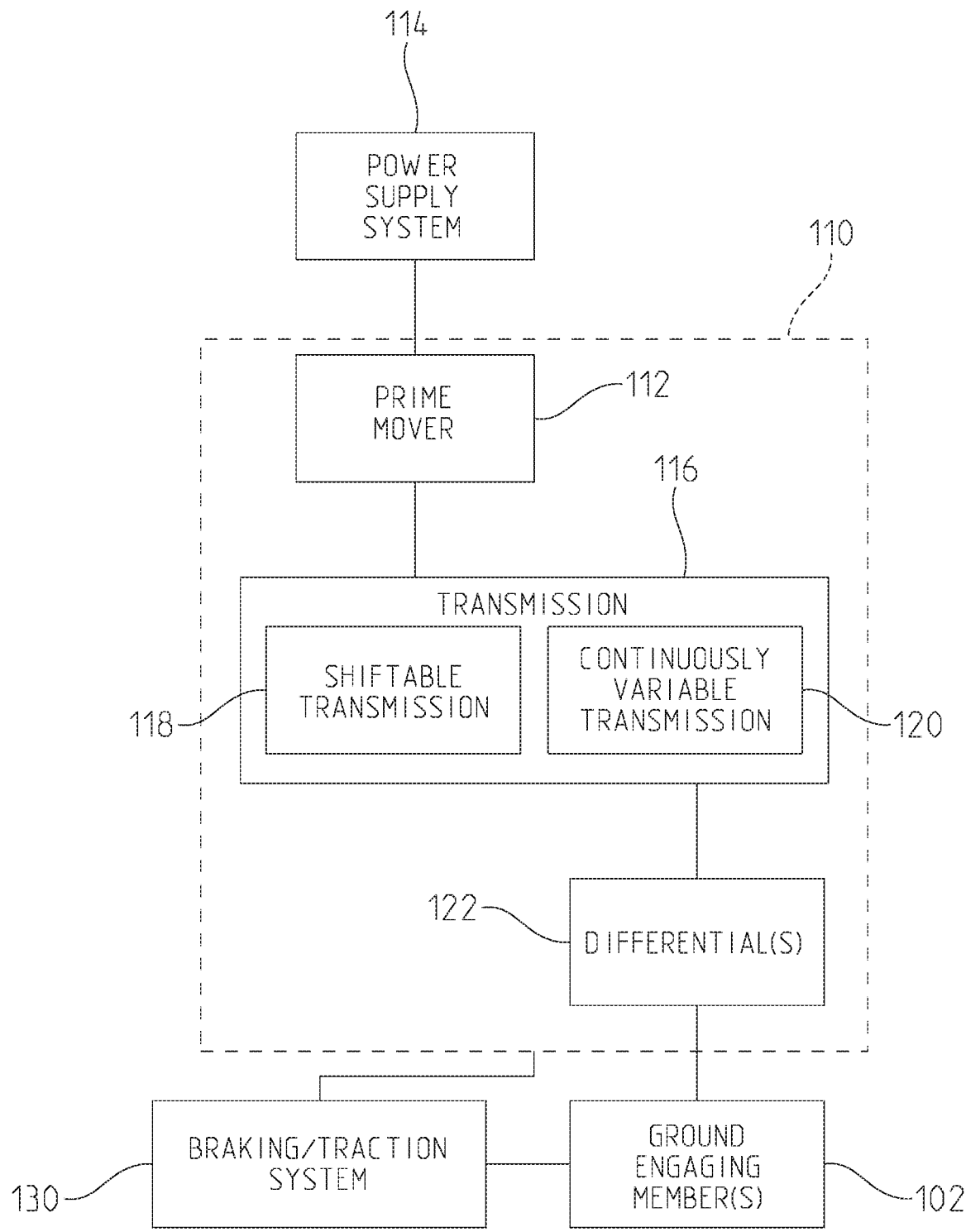
FIG. 2 is a representative view of an exemplary power system of the vehicle of FIG. 1.

Referring to FIG. 2, an exemplary embodiment of power system 110 is illustrated. Power system 110 includes a prime mover 112. Exemplary prime movers 112 include internal combustion engines, two stroke internal combustion engines, four stroke internal combustion engines, diesel engines, electric motors, hybrid engines, and other suitable sources of motive force. To start the prime mover 112, a power supply system 114 is provided. The type of power supply system 114 depends on the type of prime mover 112 used. In one embodiment, prime mover 112 is an internal combustion engine and power supply system 114 is one of a pull start system and an electric start system. In one embodiment, prime mover 112 is an electric motor and power supply system 114 is a switch system which electrically couples one or more batteries to the electric motor.

A transmission 116 is coupled to prime mover 112. Transmission 116 is illustrated as having a shiftable transmission 118 and a continuously variable transmission ("CVT") 120. CVT 120 is coupled to prime mover 112. Shiftable transmission 118 is in turn coupled to CVT 120. In one embodiment, shiftable transmission 118 includes a forward high setting, a forward low setting, a neutral setting, a park setting, and a reverse setting. The power communicated from prime mover 112 to CVT 120 is provided to a drive member of CVT 120. The drive member in turn provides power to a driven member through a belt. Exemplary CVTs are disclosed in U.S. Pat. Nos. 3,861,229; 6,176,796; 6,120,399; 6,860,826; and 6,938,508, the disclosures of which are expressly incorporated by reference herein. The driven member provides power to an input shaft of shiftable transmission 118. Although transmission 116 is illustrated as including both shiftable transmission 118 and CVT 120, transmission 116 may include only one of shiftable transmission 118 and CVT 120. Additionally, and/or alternatively, in some examples, the transmission 116 does not include a CVT 120 and another type of transmission is included. For example, other types of transmissions include, but are not limited to, automatic transmissions, manual transmissions, and/or automated manual transmissions.

In the illustrated embodiment, transmission 116 is further coupled to at least one differential 122 which is in turn coupled to at least one ground engaging member 102. Differential 122 may communicate the power from transmission 116 to one of ground engaging members 102 or multiple ground engaging members 102. In an ATV embodiment, one or both of a front differential and a rear differential are provided. The front differential operatively couples at least one of two front wheels of the ATV to transmission 116 and the rear differential operatively couples at least one of two rear wheels to transmission 116. In a utility vehicle embodiment, one or both of a front differential and a rear differential are provided. The front differential operatively couples at least one of two front wheels of the utility vehicle to transmission 116 and the rear differential operatively couples at least one of multiple rear wheels of the utility vehicle to the transmission 116. In one example, the utility vehicle has three axles and a differential is provided for each axle. In a motorcycle embodiment, a differential 122 and CVT 120 are not generally included. Rather, shiftable transmission 118 is coupled to at least one rear wheel through a chain or belt. In another motorcycle embodiment, a differential 122 is not included. Rather, CVT 120 is coupled to at least one rear wheel through a chain or belt. In a snowmobile embodiment, a differential 122 is not included. Rather, CVT 120 is coupled to an endless track through a chain case. In one golf cart embodiment, a transmission is not included. Rather, an electric motor is coupled directly to a differential 122. An exemplary differential is a helical gear set. The motor can be run in a first direction for forward operation of the golf cart and in a second direction for reverse operation of the golf cart. Although mentioned in connection with a golf cart, the concepts described herein may be used in connection with any electric vehicle.

Recreational vehicle 100 further includes a braking/traction system 130. In one embodiment, braking/traction system 130 includes anti-lock brakes. In one embodiment, braking/traction system 130 includes active descent control and/or engine braking. In one embodiment, braking/traction system 130 includes a brake and in some embodiments a separate parking brake. Braking/traction system 130 may be coupled to any of prime mover 112, transmission 116, differential 122, and ground engaging members 102 or the connecting drive members therebetween.

Returning to FIG. 1, recreational vehicle 100 further includes a steering system 138. Steering system 138 is coupled to at least one of the ground engagement members 102 to direct recreational vehicle 100. Steering system 138 generally includes a steering member adapted to be grasped by a user of vehicle 100. Exemplary steering members include handlebars and steering wheels.

Further, recreational vehicle 100 includes a controller 140, such as an accessory controller, having at least one associated memory 142. The accessory controller 140 provides the electronic control of the various components of recreational vehicle 100, such as the providing control of the user interface 150 and/or components of the user interface 150. Further, the accessory controller 140 is operatively coupled to a plurality of sensors 212 (see FIG. 3) which monitor various parameters of recreational vehicle 100 or the environment surrounding vehicle 100. In some examples, the accessory controller 140 forms a portion of a processing subsystem including one or more computing devices having memory, processing, and communication hardware. The accessory controller 140 may be a single device or a distributed device, and the functions of the accessory controller 140 may be performed by hardware and/or as computer instructions on a non-transient computer readable storage medium, such as memory 142.

The accessory controller 140, such as an accessory control module, also interacts with a user interface 150 which includes at least one input device 152 and at least one output device 154. Exemplary input devices 152 include levers, buttons, switches, soft keys, selectors, knobs, inputs from frequency operated button (FOB), hard keys, and other suitable input devices. Exemplary output devices 154 include lights, displays, touch screens, audio devices, tactile devices, and other suitable output devices. User interface 150 further includes a user interface controller (controller) 156 and an associated memory 158. Interface controller 156 performs certain operations to control one or more subsystems of user interface 150 or of other vehicle components, such as one or more of input devices 152 and output devices 154. In some examples, user interface 150 includes a touch screen display and interface controller 156 interprets various types of touches to the touch screen display as inputs and controls the content displayed on touch screen display. In some instances, interface controller 156 forms a portion of a processing subsystem including one or more computing devices having memory, processing, and communication hardware. The interface controller 156 may be a single device or a distributed device, and the functions of interface controller 156 may be performed by hardware and/or as computer instructions on a non-transient computer readable storage medium, such as memory 158.

In some examples, output devices 154 include a display and interface controller 156 formats information to be displayed on the display and causes displays of the information on the output device 154. In some variations, output devices 154 include a touch display and interface controller 156 formats information to be displayed on the touch display, displays the information, and monitors the touch display for user input. Exemplary user inputs include a touch, a drag, a swipe, a pinch, a spread, and other known types of gesturing.

The accessory controller 140 is operatively coupled to an electrical power supply 162. The electrical power supply 162 may be any type of electrical power supply, including a battery, a high voltage bus, stators, regulators, ferrous cores, solar components, and/or any other type of alternative power methods and/or sources. The electrical power supply 162 provides power to operate the vehicle 100. Additionally, and/or alternatively, the electrical power supply 162 is operatively coupled to the user interface 150 (e.g., the user interface controller 156), the power system 110, and/or additional components of the vehicle 100. For example, the electrical power supply 162 may be electrically connected to components of the vehicle 100 via a network (e.g., a vehicle bus and/or a controller area network (CAN), which is described below).

Figure 3:
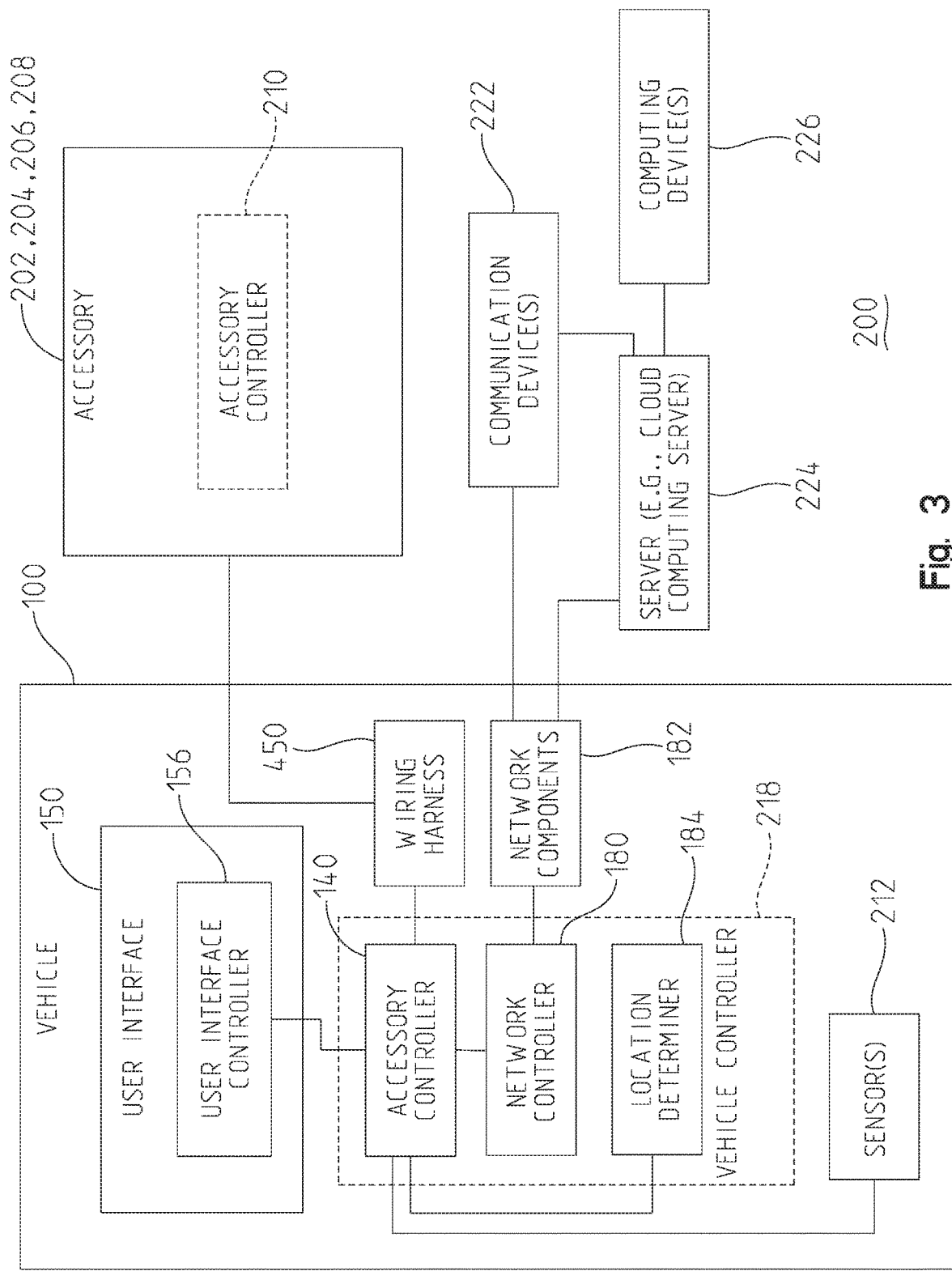
FIG. 3 is a representative view of exemplary components of the vehicle of FIG. 1, including a vehicle controller.

FIG. 3 illustrates an example block diagram of a vehicle system 200 for use with a removable accessory, such as accessory 202, 204, 206, 208. Referring to FIG. 3, the accessory controller 140 is included within a vehicle controller 218 (e.g., an electronic control module). The vehicle controller 218 further includes a network controller 180. However, while not illustrated, additional controllers, such as a suspension controller, a steering system controller, and/or a power system controller, may be included within the vehicle controller 218. Each of these controllers, including the vehicle controller 218, may each be single devices or distributed devices or one or more of these controllers may together be part of a single device or distributed device. The functions of these controllers may be performed by hardware and/or as computer instructions on a non-transient computer readable storage medium, such as memory 142. Additionally, and/or alternatively, memory, such as memory 142, may be included within the vehicle controller 218. In other words, the controllers within the vehicle controller 218 may use the memory 142 to store and/or retrieve information.

In some variations, the vehicle controller 218 includes at least two separate controllers (e.g., network controller 180 and/or the accessory controller 140) that communicate over a network. In some instances, the network is a controller area network (CAN). In some variations, the CAN network is implemented in accord with the society of automotive engineers standard J1939 protocol. Details regarding an exemplary CAN network are disclosed in U.S. patent application Ser. No. 11/218,163, filed Sep. 1, 2005, the disclosure of which is expressly incorporated by reference herein. Other exemplary networks or other suitable data connections may be implemented in place of the CAN network. For example, in embodiments, a two wire serial communication is used to communicate between the controllers.

In some examples, the vehicle controller 218 communicates with other devices and/or entities within the vehicle 100 via a network, such as the CAN network described above. For example, the accessory controller 140 may communicate with one or more sensors 212, the electrical power supply 162, and/or the user interface 150. Additionally, and/or alternatively, the accessory controller 140 may communicate directly and/or indirectly (e.g., through the user interface controller 156) to components within the user interface 150, such as the input devices 152, memory 158, and/or the output devices 154. Exemplary sensors 212 of the vehicle 100, including the types of sensors within the vehicle 100 are disclosed herein, see FIG. 11. Other exemplary networks or other suitable data connections may be implemented in place of the CAN network and used to communicate between the entities and/or device within the vehicle 100 and the controller 218.

Controller 218 further includes a network controller 180 that controls communications between recreational vehicle 100 and other devices through one or more network components 182. In embodiments, network controller 180 of recreational vehicle 100 communicates with paired devices over a wireless network (e.g., via a wireless or WiFi chip). An exemplary wireless network is a radio frequency network utilizing a BLUETOOTH protocol. In this example, network components 182 include a radio frequency antenna. Network controller 180 controls the pairing of devices and/or servers to recreational vehicle 100 and the communications between recreational vehicle 100 and the remote devices. Additionally, and/or alternatively, the network controller 180 controls and/or provides communication between multiple different recreational vehicles (e.g., vehicle-to-vehicle communication).

Exemplary remote devices include, but are not limited to, a communication device 222 (e.g., a mobile phone or smartphone), a server 224 (e.g., a cloud computing server), and/or a computing device 226 (e.g., a laptop, desktop, and/or other personalized computers). As illustrated in FIG. 3, the cloud computing server 224 connects the computing device 226 to the network controller 180. For example, the network controller 180 provides information to a cloud computing server 224. Furthermore, based on the information, the cloud computing server 224 may store the information. The computing device 226 may receive (e.g., obtain and/or retrieve) the information from the cloud computing server 224. Additionally, and/or alternatively, while not shown in FIG. 3, the computing device 226 may directly connect to the network controller 180 via the network components 182 to communicate with the vehicle 100. Furthermore, in embodiments, the server 224 may be in communication with the communication device 222. In other words, the communication device 222 may receive and/or transmit information from either the server 224 and/or the vehicle 100.

In some examples, exemplary communication devices 222 include, but are not limited to, cellular telephones, smartphones, tablets, satellite telephones, audio interface devices, and/or other devices capable of sending and receiving communications through external networks. Exemplary audio interface devices include headsets including a microphone to receive audio and convert the audio to electronic signals and a speaker to convert electronic signals into audio. In some instances, the exemplary communication devices 222 include one or more displays that display information, such as information regarding the vehicle 100. The network controller 180 may provide instructions to the communication device 222 to cause display of the vehicle information on the display screens of the device 222.

Controller 218 further includes a location determiner 184 which determines a current location of recreational vehicle 100. An exemplary location determiner 184 is a GPS unit which determines the position of recreational vehicle 100 based on interaction with a global satellite system.

The accessory controller 140 is connected to one or more accessories 202, 204, 206, and/or 208 via a wiring harness 450. Accessories are any suitable component, assembly, and/or device that can be powered and/or controlled by the vehicle 100 (e.g., by the accessory controller 140 and/or the user interface controller 156). In embodiments, accessories may be added to the vehicle during factory assembly of the vehicle and/or subsequent to vehicle delivery to a dealer, customer, or other individual or entity. Exemplary accessories include components, assemblies, and/or devices that are required for vehicle motive operation relative to the ground (although replaceable with other accessories or components, assemblies, and/or devices that are not powered and/or controlled by the vehicle) and components, assemblies, and/or devices that are not required for vehicle motive operation relative to the ground (although replaceable with other accessories or components, assemblies, and/or devices that are not powered and/or controlled by the vehicle) and which otherwise provide altered (additional or diminished) vehicle functionality, altered (additional or diminished) vehicle performance, and/or additional alterations to the vehicle capabilities. Exemplary accessories required for vehicle motive operation include shocks, ride height adjuster, electronic CVT (ECVT), and other suitable accessories. Exemplary accessories not required for vehicle motive operation include lights, winch, sprayer, plow, HVAC system, and other suitable accessories. Exemplary accessories are disclosed throughout.

Figure 4:
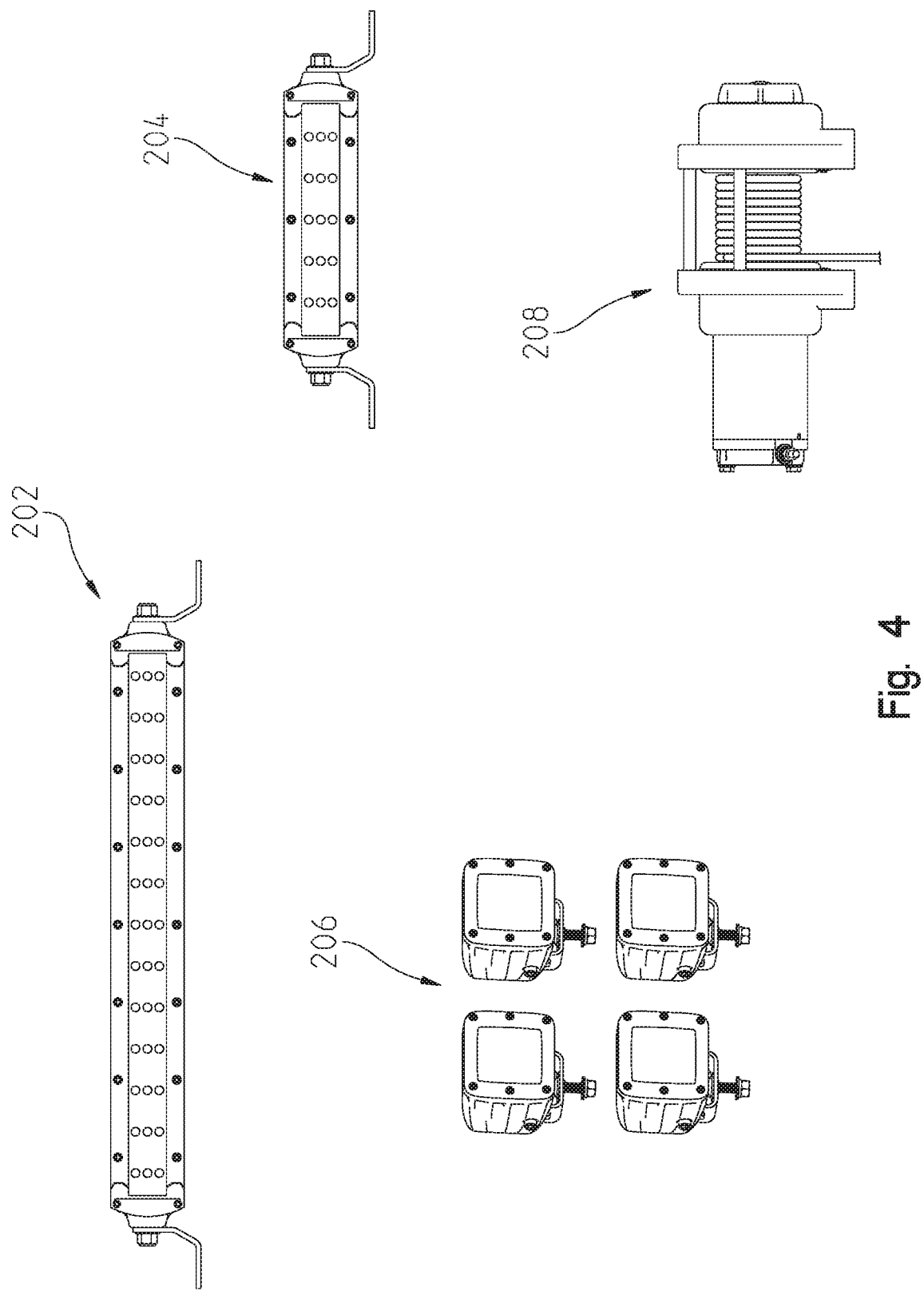
FIG. 4 illustrates exemplary accessories that may be operatively coupled to the vehicle of FIG. 1.

FIG. 4 illustrates various exemplary accessories. For example, accessory 202 is a 30-inch light bar, accessory 204 is a 10-inch light bar, accessory 206 includes four cube lights, and accessory 208 is a winch. However, the accessories shown in FIG. 4 are merely exemplary, and other types of accessories not shown in FIG. 4 may also be powered and/or controlled by the vehicle 100, and in particular the user interface controller 156 and/or the accessory controller 140. For example, additional accessories include, but are not limited to, rock lights, light emitting diode (LED) whips, work lights, rear lights, head/tail lights with turn signals, sprayers, salt spreaders, plows, motorcycle windshield, power seats, power windows, and/or motorcycle puddle lights. In some examples below, only accessories 202-208 are described. However, it should be understood that the accessory controller 140 and/or the user interface controller 156 may operate any accessories, including any of the accessories listed above. For example, the controller 140 and/or controller 156 may identify the accessories, control the accessories, and/or provide/terminate and/or reduce power to the accessories. Further, even if accessory 202-208 are described below, it should be understood that the accessory or accessories can be any type of accessory, including, but not limited to, accessories listed above and/or other types of accessories that may be connected to the vehicle 100.

Returning to FIG. 3, the wiring harness 450 is any type and/or combination of harness, relays, switches, wires, connectors, and/or transmitters that connects the accessories to the accessory controller 140. As shown, the wiring harness 450 connects the accessories 202, 204, 206, 208 to the accessory controller 140. In some examples, the wiring harness 450 directly connects the accessories to the user interface controller 156. In some examples, one or more of the accessories may also include an accessory controller 210. The accessory controller 210 may receive information from the accessory controller 140 and/or the user interface controller 156 and be configured to control the corresponding accessory. The wiring harness 450, the accessories, and the accessory controller 210 will be described in further detail below.

Although the accessory controller 140 and interface controller 156 are illustrated separately in FIG. 3, their functionality may be combined (e.g., the interface controller 156 may be included within the vehicle controller 218 and/or within the accessory controller 140). Further, a portion or all of the functionality of one or more of network controller 180 and location determiner 184 may be included as part of interface controller 156 and/or accessory controller 140. In one embodiment, it is desired to include the functionality of network controller 180 and location determiner 184 as part of interface controller 156 to provide components that are easily replaceable or upgradable. Throughout this application, various features and functionality are described in connection with the accessory controller 140, vehicle controller 218, interface controller 156, or generally a vehicle associated controller. Any of the vehicle controller 218, the accessory controller 140, and interface controller 156 may provide the described features and functionality.

Referring to FIG. 1, memory in the vehicle 100, such as memory 142 or memory 158, has computer-readable media in the form of volatile and/or nonvolatile memory and is removable, nonremovable, a combination, and/or non-transitory. Media examples include Random Access Memory (RAM); Read Only Memory (ROM), Electronically Erasable Programmable Read Only Memory (EEPROM), flash memory, optical or holographic media, magnetic storage devices, and/or any other medium that can be used to store information and can be accessed by an electronic device. Additionally, and/or alternatively, memory 142 and/or memory 158 are representative of multiple memories, and each memory is attached to a different device and/or component of the user interface 150, the vehicle controller 218, and/or another device/component within the vehicle 100.

Referring to FIG. 1, the vehicle 100 is any vehicle, such as a two wheel vehicle, a three wheel vehicle, a four wheel vehicle, and/or other multi-wheeled recreational vehicle that is used on roads, trails, and/or both. Some examples of the vehicles include, but are not limited to, motorcycles, all-terrain vehicles (ATVs), Jeep-type vehicles, side-by-side recreational vehicles, snowmobiles and utility vehicles. FIGS. 5-10 illustrate different embodiments of vehicles 100 that are configured to connect to different accessories and/or control (e.g., provide commands and/or power) the accessories. However, the vehicles shown in FIGS. 5-10 are non-exhaustive, and other types of vehicles are contemplated within this disclosure.

Figure 5:
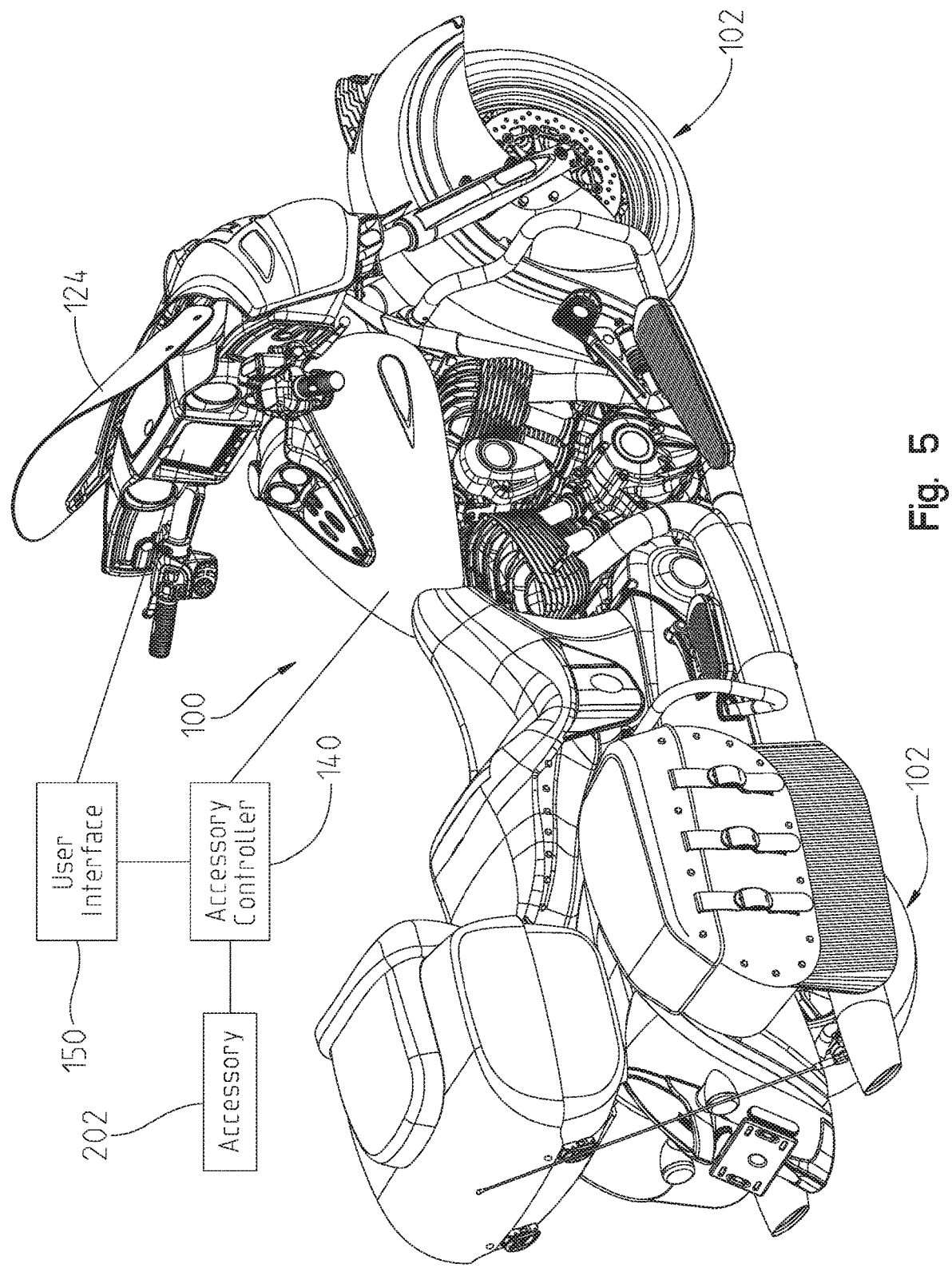
FIG. 5 is a front perspective view of another exemplary vehicle, such as a two-wheeled vehicle.

FIG. 5 illustrates the vehicle 100 as a two-wheeled vehicle, such as a motorcycle. The motorcycle 100 includes two ground engaging members (wheels) 102. Further, the motorcycle includes a windshield 124 and a user interface (e.g., display) 150. As mentioned previously, the user interface 150 may include input devices 152 (e.g., hard buttons and/or soft buttons), output devices 154 (e.g., a display), memory 158 and/or a user interface controller 156 configured to receive input from the input devices 152 and/or cause display of images on the output devices 154.

Figure 6:
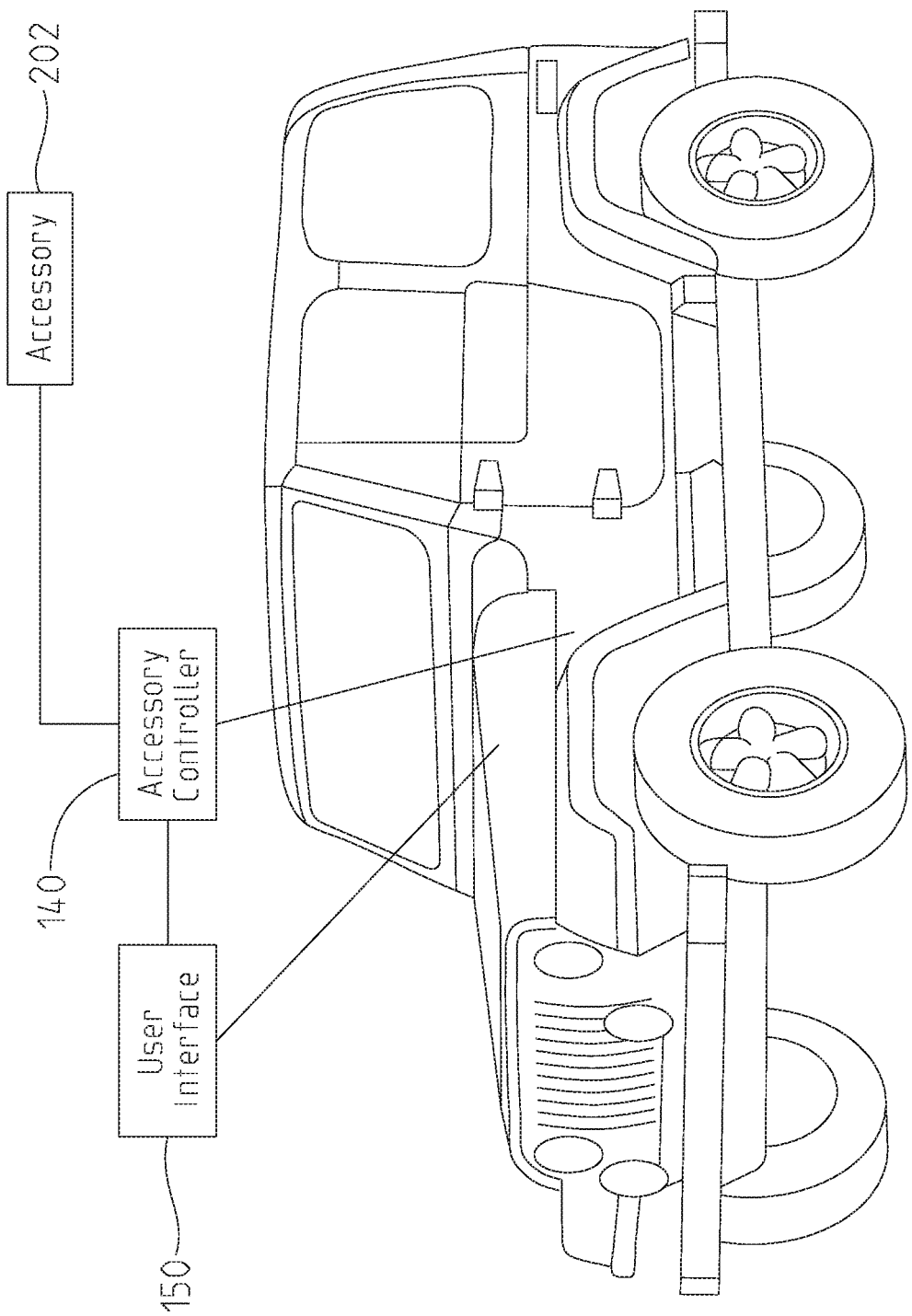
FIG. 6 is a front perspective view of another exemplary vehicle, such as a four-wheeled vehicle.
Figure 7:
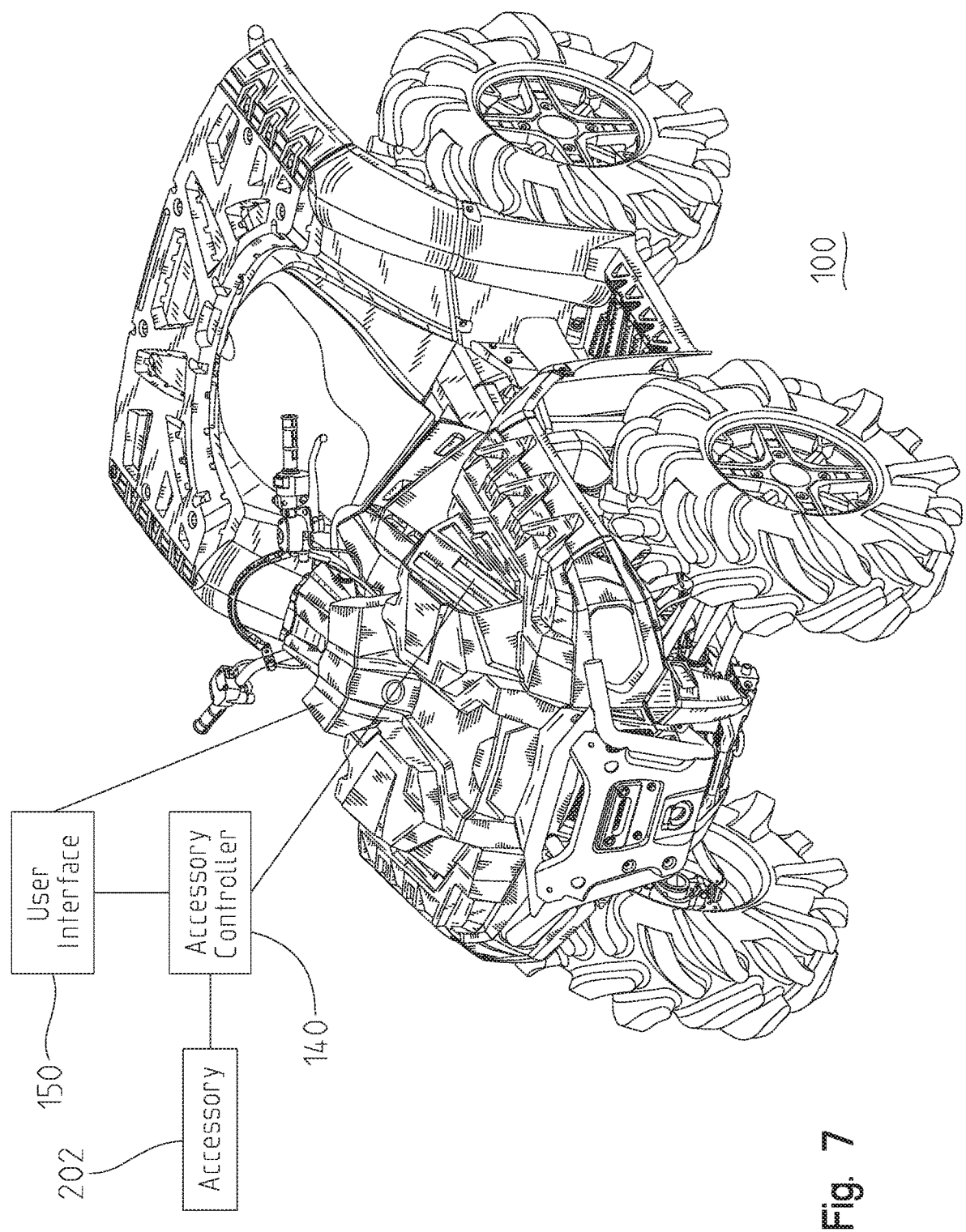
FIG. 7 is a front perspective view of another exemplary vehicle, such as an all-terrain vehicle.
Figure 8:
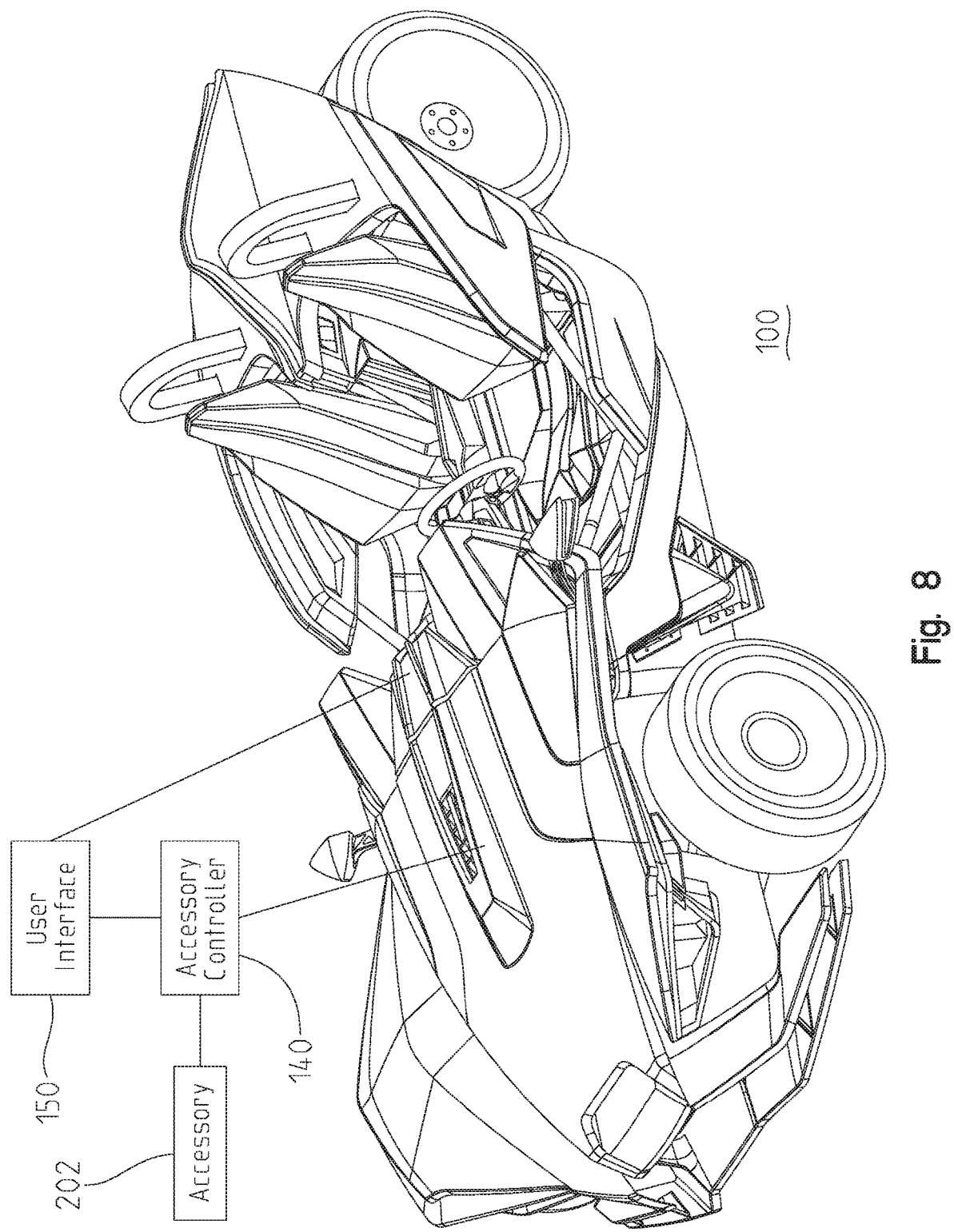
FIG. 8 is a front perspective view of another exemplary vehicle, such as a three-wheeled vehicle.
Figure 9:
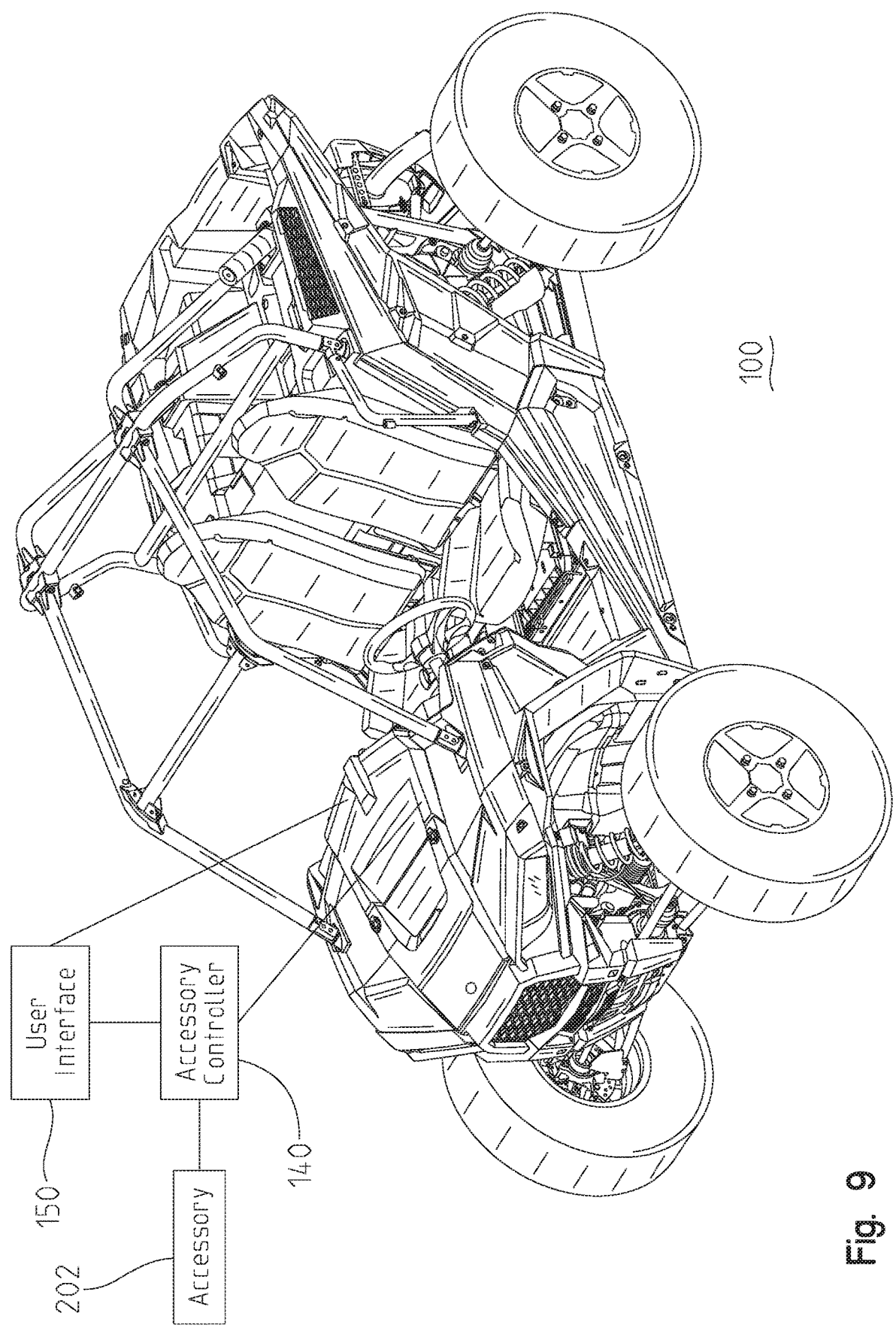
FIG. 9 is a front perspective view of another exemplary vehicle, such as a utility vehicle.
Figure 10:
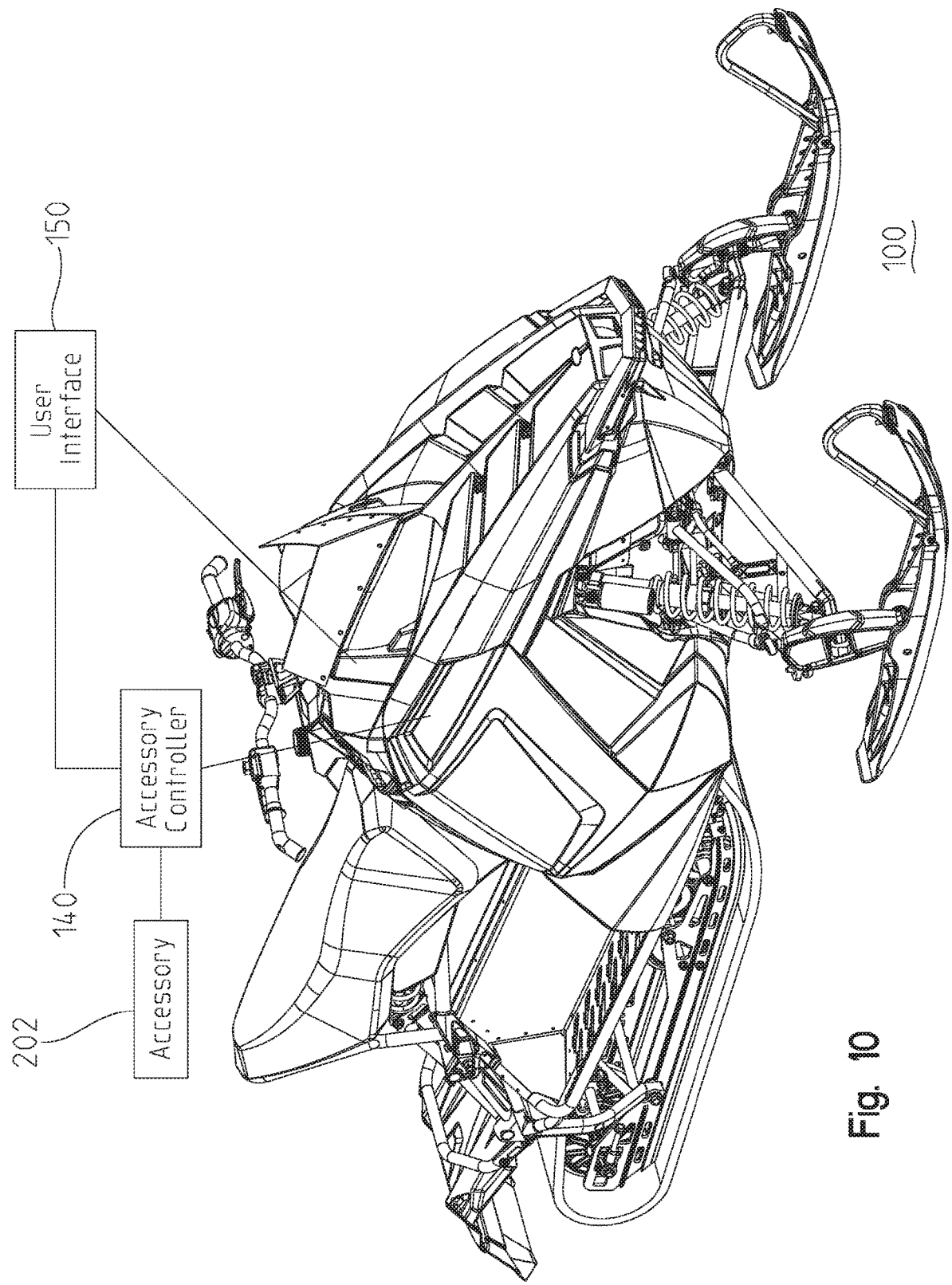
FIG. 10 is a front perspective view of another exemplary vehicle, such as a snowmobile.

FIG. 6 illustrates a four-wheeled vehicle 100, such as a four-wheeled on-road and/or off-road vehicle. FIG. 7 illustrates an all-terrain vehicle (ATV) 100. FIG. 8 illustrates a three wheeled motorcycle type vehicle 100, such as the POLARIS SLINGSHOT. FIG. 9 illustrates a four wheel vehicle 100, such as a utility vehicle. FIG. 10 illustrates a snowmobile 100. Each of the vehicles 100 shown in FIGS. 5-10 includes one or more user interfaces 150 and accessory controller 140. Further, the accessory controller 140 maybe connected to one or more accessories. Additionally, and/or alternatively, a controller (e.g., a user interface controller 156 and/or an accessory controller 140) within the vehicles 100 shown in FIGS. 5-10 may receive, control, and/or transmit information to the accessories, such as accessories 202, 204, 206, 208. Additionally, and/or alternatively, the controller may also provide power to the accessories.

Additional details regarding the different types of the vehicle 100 shown in FIGS. 5-10 are provided in U.S. Pat. No. 8,827,019 (filed Dec. 18, 2013, titled SIDE-BY-SIDE VEHICLE), U.S. Pat. No. 9,211,924 (filed Mar. 25, 2014, titled SIDE-BY-SIDE VEHICLE), U.S. Pat. No. 8,544,587 (filed Mar. 21, 2012, titled THREE-WHEELED VEHICLE), U.S. application Ser. No. 15/387,504 (filed Dec. 21, 2016, titled TWO-WHEELED VEHICLE), U.S. Pat. No. 9,738,134 (filed Jun. 23, 2016, titled UTILITY VEHICLE), and U.S. Pat. No. 9,809,195 (filed Nov. 22, 2013, titled SNOWMOBILE), all assigned to the present assignee, the entire disclosures of which are expressly incorporated by reference herein.

Figure 11:
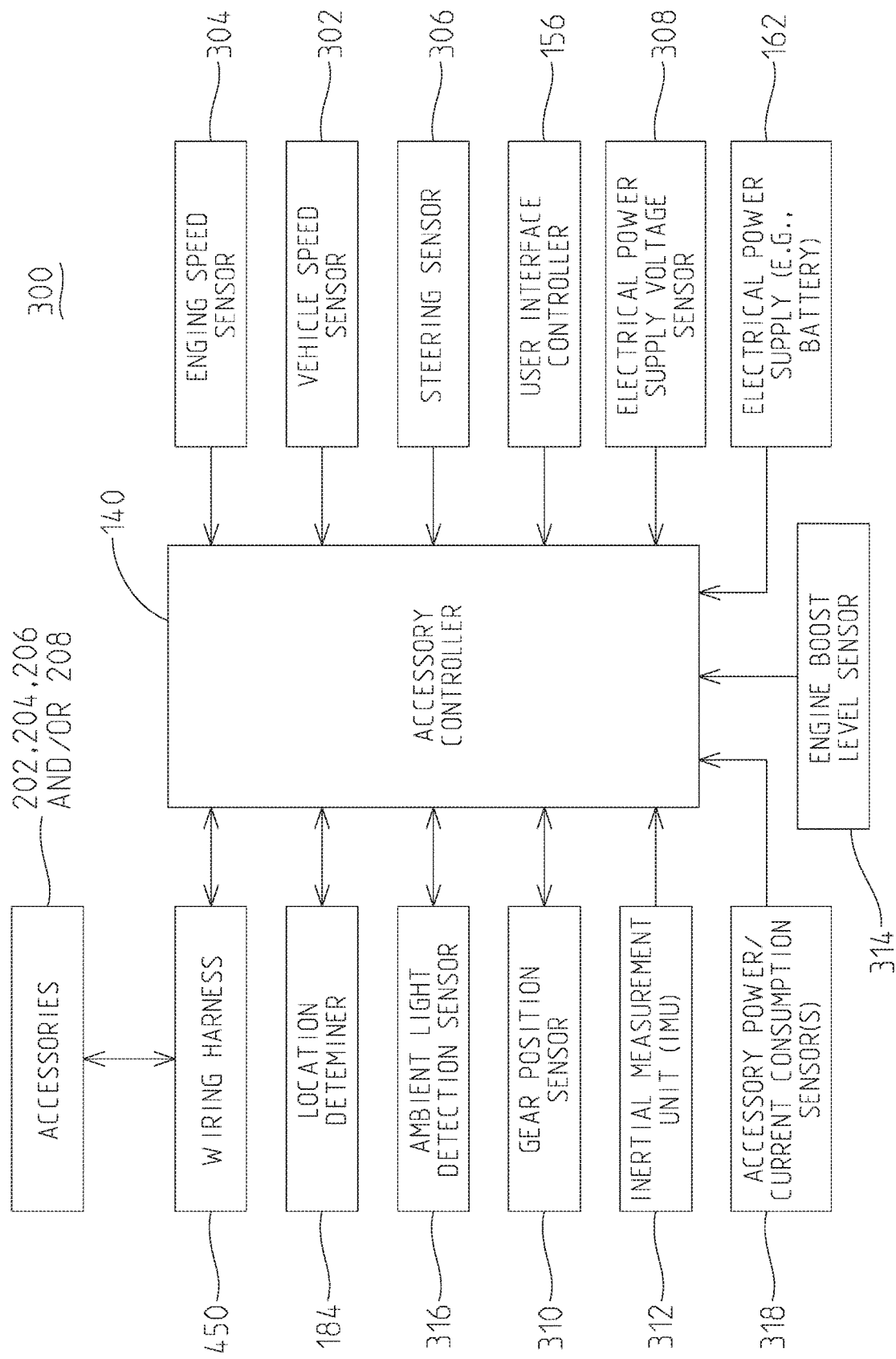
FIG. 11 illustrates an exemplary control system for controlling the one or more accessories.

FIG. 11 illustrates an exemplary control system 300 for controlling and/or connecting one or more accessories. In some instances, the control system 300 is included within the vehicle 100 shown above (e.g., the vehicles shown in FIGS. 5-10). For example, the accessory controller 140 may communicate (e.g., receive and/or transmit information) with one or more entities (e.g., sensors 212, devices, controllers, and/or subsystems) from the vehicle 100 described above. In some examples, the sensors, devices, and/or subsystems from FIG. 11 are connected to and/or communicate with the user interface controller 156. In other words, the sensors, devices, and/or subsystems from FIG. 11 bypasses the accessory controller 140 and may directly or indirectly communicate with the user interface controller 156.

The accessory controller 140 and/or user interface controller 156 may connect to one or more accessories (e.g., accessories 202, 204, 206, 208) via a wiring harness 450 and/or a wireless connection. Further, the accessory controller 140 and/or user interface controller 156 may control operations of the accessories, such as providing commands to the accessories and/or automatically identifying the accessories.

The sensors, devices, and/or subsystems of control system 300 include, but are not limited to, the wiring harness 450, the location determiner 184, an ambient light detection sensor 316, a gear position sensor 310, an inertial measurement unit (IMU) 312, accessory power/current consumption sensor(s) 318, an engine boost level sensor 314, an electrical power supply 162 (e.g., a battery), an electrical power supply voltage sensor 308 (e.g., a battery voltage sensor), a steering sensor 306, a vehicle speed sensor 302, and/or an engine speed sensor 304. The electrical power supply 162 provides power to the accessories, such as accessory 202-208. The operation of the sensors, devices, and/or subsystems of control system 300 will be described in further detail below.

While exemplary sensors, devices, controllers, and/or subsystems are provided in FIG. 11, additional exemplary sensors, devices, controllers, and/or subsystems used by the accessory controller 140 and/or user interface controller 156 to control the accessories are provided in US Published Patent Application No. 2016/0059660 (filed Nov. 6, 2015, titled VEHICLE HAVING SUSPENSION WITH CONTINUOUS DAMPING CONTROL) and US Published Application No. 2018/0141543 (filed Nov. 17, 2017, titled VEHICLE HAVING ADJUSTABLE SUSPENSION), both assigned to the present assignee and the entire disclosures of each expressly incorporated by reference herein.

The illustrative control system 300 is not intended to suggest any limitation as to the scope of use or functionality of embodiments of the present disclosure. Neither should the illustrative control system 300 be interpreted as having any dependency or requirement related to any single entity or combination of entities illustrated therein. Additionally, various entities depicted in FIG. 11, in embodiments, may be integrated with various ones of the other entities depicted therein (and/or entities not illustrated). For example, the accessory controller 140 and/or user interface controller 156 may be included within the vehicle controller 218. The functionalities of the accessory controller 140, user interface controller 156, and/or other entities in control system 300 will be described below.

Self-Identification of Accessories

Figure 12:
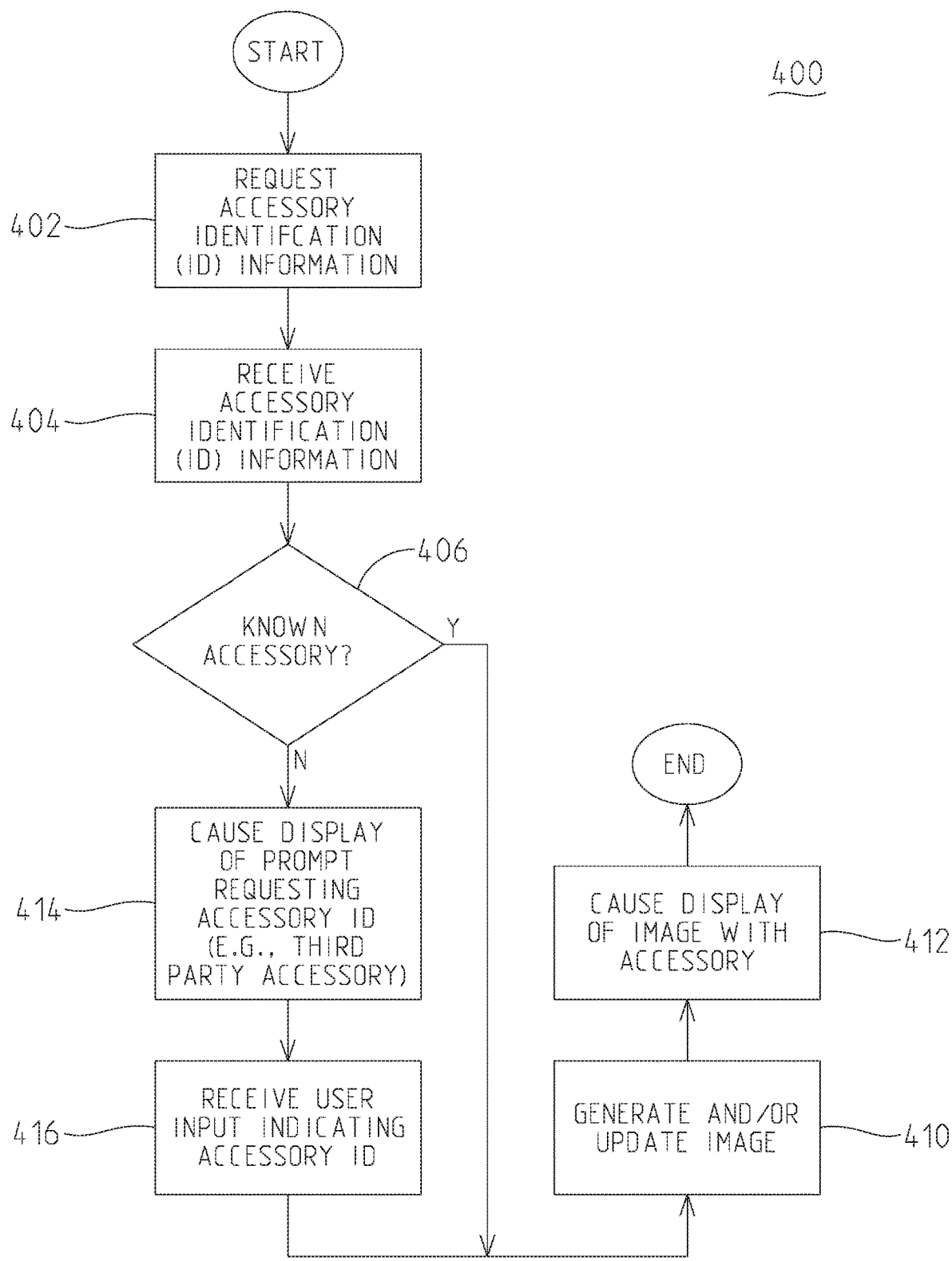
FIG. 12 illustrates an exemplary flowchart for identifying one or more accessories.

FIG. 12 illustrates an example flowchart describing a processing sequence 400 for a controller (e.g., the user interface controller 156 and/or the accessory controller 140) to automatically identify one or more accessories. Processing sequence 400 relates to automatically identifying accessories and further relates to displaying information related to the identified accessories. An advantage, among others, of automatically identifying accessories is the simplification of connecting accessories on vehicle 100. In embodiments, by simply connecting the accessories to the wiring harness 450, the vehicle 100 is able to identify and/or display the connected accessories to the user. Further, by identifying the accessories, the vehicle 100 is able to customize and/or control the accessories based on user inputs or customization.

Figure 13:
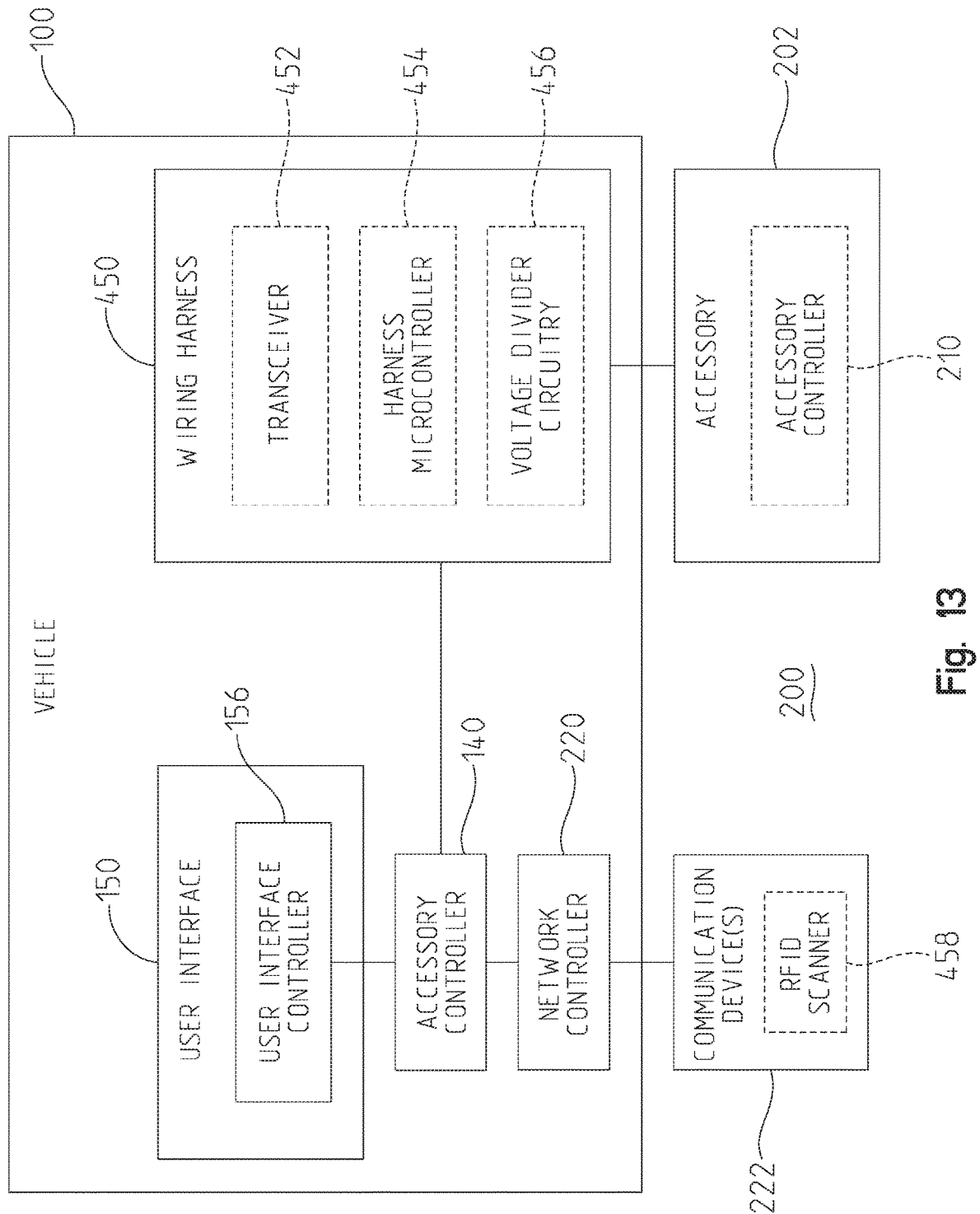
FIG. 13 is another representative view of exemplary components of the vehicle of FIG. 1, a communication device, and an accessory.

The processing sequence 400 will be described with reference to FIGS. 3 and 13. FIG. 13 illustrates the vehicle system 200 with a more detailed block diagram of the wiring harness 450. The transceiver 452, harness microcontroller 454, and the voltage divider circuitry 456 of the wiring harness 450 are optional. In other words, in some examples, the wiring harness 450 includes a transceiver 452, a harness microcontroller 454, and/or voltage divider circuitry 456. For example, in instances when the accessory, such as accessory 202, does not include an accessory controller, such as accessory controller 210, the wiring harness 450 includes the transceiver 452, the harness microcontroller 454, and/or the voltage divider circuitry 456. In other examples, the wiring harness 450 might not include one or more of the components, such as the transceiver 452, the harness microcontroller 454, and/or the voltage divider circuitry 456. In such examples, the accessory (e.g., 202) and/or the accessory controller (e.g., 210) may include the transceiver 452, the microcontrollers 454, and/or the voltage divider circuitry 456.

In operation, as represented by block 402, the user interface controller 156 requests accessory identification (ID) information from an accessory, such as the accessory 202, and/or the accessory controller 140. The accessory identification may be unique to an accessory (e.g., a light bar 202 or a winch 208) and may allow the user interface controller 156 to identify the accessory as will be explained below.

For example, referring to FIG. 13, the accessory controller 140 may establish a connection (e.g., a power and/or electrical connection) with an accessory (e.g., the light bar accessory 202) via a wiring harness 450. The user interface controller 156 uses the established connection between the controller 140 and the accessory 202 to request the accessory identification information. In some variations, the user interface controller 156 may establish a connection with an accessory without using (e.g., bypassing) the accessory controller 140.

The connection between the accessory controller 140 and an accessory, such as accessory 202, may be any type of electrical connection (e.g., a wired and/or wireless electrical connection). In some examples, the electrical connection includes one or more wires. For example, a user or operator may physically connect wires, such as one or more power lines (e.g., power/ground wires), from the accessory 202 to one or more relays or switches of the wiring harness 450. The wiring harness 450 may also include one or more wires that connect the relays or switches with the accessory controller 140. Based on establishing a connection (e.g., a power connection) between the controller 140 and the accessory 202, the controller 140 may provide information to the user interface controller 156 indicating the connection between the controller 140 and the accessory 202. In response to receiving this information, the controller 156 transmits a request for the accessory identification information to the accessory 202.

In some instances, the accessory controller 140 uses an established connection to provide power to the accessory 202 using the electrical power supply 162. In other words, the accessory controller 140 provides power from the electrical power supply 162 to an accessory, such as accessory 202, via the wiring harness 450. In other instances, the electrical power supply 162 provides power to the accessory 202 based on a connection to the wiring harness 450 (e.g., by bypassing the accessory controller 140), and the accessory controller 140 may detect the connection between the accessory 202 and the electrical power supply 162 and provide information to the user interface controller 156 information indicating the connection.

In some examples, the accessory controller 140 provides information indicating connections between the controller 140 and one or more accessories during vehicle 100 start-up. For example, the user may connect accessories when the vehicle 100 is powered off. After starting the ignition, the accessory controller 140 detects whether there are any connections between it and any accessories. For each detected connection, the accessory controller 140 provides information indicating the connection to the user interface controller 156, and processing sequence 400 proceeds to identify the accessory. In some variations, the vehicle 100 has already been powered on, and the user connects an accessory to the wiring harness 450. In response to detecting a connection, the accessory controller 140 provides information indicating the connection to the user interface controller 156.

In some instances, block 402 is optional. In other words, after an accessory has been powered on, the accessory may provide the accessory identification information to the controller 156 without the controller 156 requesting the accessory identification information. In such instances, the processing sequence 400 begins at block 404.

As represented by block 404, the user interface controller 156 receives accessory identification (ID) information from the accessory 202 via the wiring harness 450 and/or the accessory controller 140. For example, the controller 140 may obtain the accessory identification information from the accessory 202 and provide the accessory identification information to the controller 156. Various communication methods and/or techniques may be used by the controller 156 and/or the controller 140 to obtain (e.g., request, receive, and/or retrieve) the accessory identification information. For example, as mentioned previously, the controller 140 may communicate with the controller 156 using a CAN network, which may be implemented in accord with the J1939 protocol.

Similarly, in some instances, the controller 140 and/or the controller 156 uses a CAN network/bus and/or a J1939 communication protocol to communicate with an accessory, such as accessory 202. For example, the wiring harness 450 may include power wires and/or two additional wires to transmit/receive information using the J1939 protocol. In such examples, the connected accessory, such as accessory 202, may include an accessory controller 210. The accessory controller 210 receives information, such as the request for the accessory identification information, processes the information, and/or transmits information, such as the accessory identification information, using the CAN network and/or the J1939 protocol.

In some variations, the accessory 202 does not include an accessory controller 210. In such variations, the wiring harness 450 includes a transceiver 452 and/or a harness microcontroller 454 used to perform operations similar to the accessory controller 210. For example, the transceiver 452 receives and/or transmits information (e.g., the request for the accessory identification information and/or the accessory identification information). The microcontroller 454 processes the request to determine (e.g., retrieve) the accessory identification information for the accessory, such as accessory 202. Additionally, and/or alternatively, as will be explained below, the transceiver 452 and/or the microcontroller 454 are used to control functions of the accessory based on user inputs and/or vehicle parameters.

In some examples, the controller 140 and/or the controller 156 uses a local interconnect network (LIN) bus, wires, and/or communication protocol to communicate with an accessory, such as accessory 202. For example, the wiring harness 450 may include power wires and/or an additional wire to transmit/receive information using the LIN protocol. In such examples, the connected accessory, such as accessory 202, may include an accessory controller 210. The accessory controller 210 receives information, such as the request for the accessory identification information, processes the information, and/or transmits information, such as the accessory identification information, using the LIN bus and/or protocol. Further, similar to the CAN network/J1939 protocol, if the accessory 202 does not include an accessory controller 210, the wiring harness 450 includes a transceiver 452 and/or a harness microcontroller 454 to perform the operations similar to the accessory controller 210.

In some examples, the controller 140 and/or the controller 156 communicates with an accessory, such as accessory 202, over the power lines/wires of the wiring harness 450. For example, the accessory 202 provides a communication signal, such as the accessory identification information, over the power wires using a communication protocol, such as a LIN communication protocol. In other words, in such examples, no additional wires other than the power lines are used to communicate between the vehicle 100 and the accessory 202.

The communication protocol over power provides signal fluctuation characteristics (e.g., additional noise, serial communication, and/or PWM characteristics over the power lines) through the power lines of the wiring harness 450 during powering up of the accessory. For example, after the accessory, such as accessory 202, has been powered up, the accessory controller 210 provides accessory identification information, such as the signal fluctuation characteristics (e.g., a fluctuation of the voltage/current over the normal voltage/current), via the power lines. For instance, the signal fluctuation characteristics may be superimposed on the voltage signal of the power lines (e.g., using LIN and/or universal asynchronous receiver/transmitter (UART) protocol bytes over the DC power lines). The controller 140 and/or controller 156 may detect the signal fluctuation characteristics via the power lines. Then, as will be explained below, the controller 140 and/or controller 156 uses the signal fluctuation characteristics to identify the accessory 202. Additionally, and/or alternatively, as will be explained below, the controller 140 and/or controller 156 may control operations of accessory, such as accessory 202, by providing signal fluctuations through the power lines. In examples where the accessory 202 does not include an accessory controller 210, the wiring harness 450 includes a transceiver 452 and/or a harness microcontroller 454 that performs the operations similar to the accessory controller 210.

Figure 14:
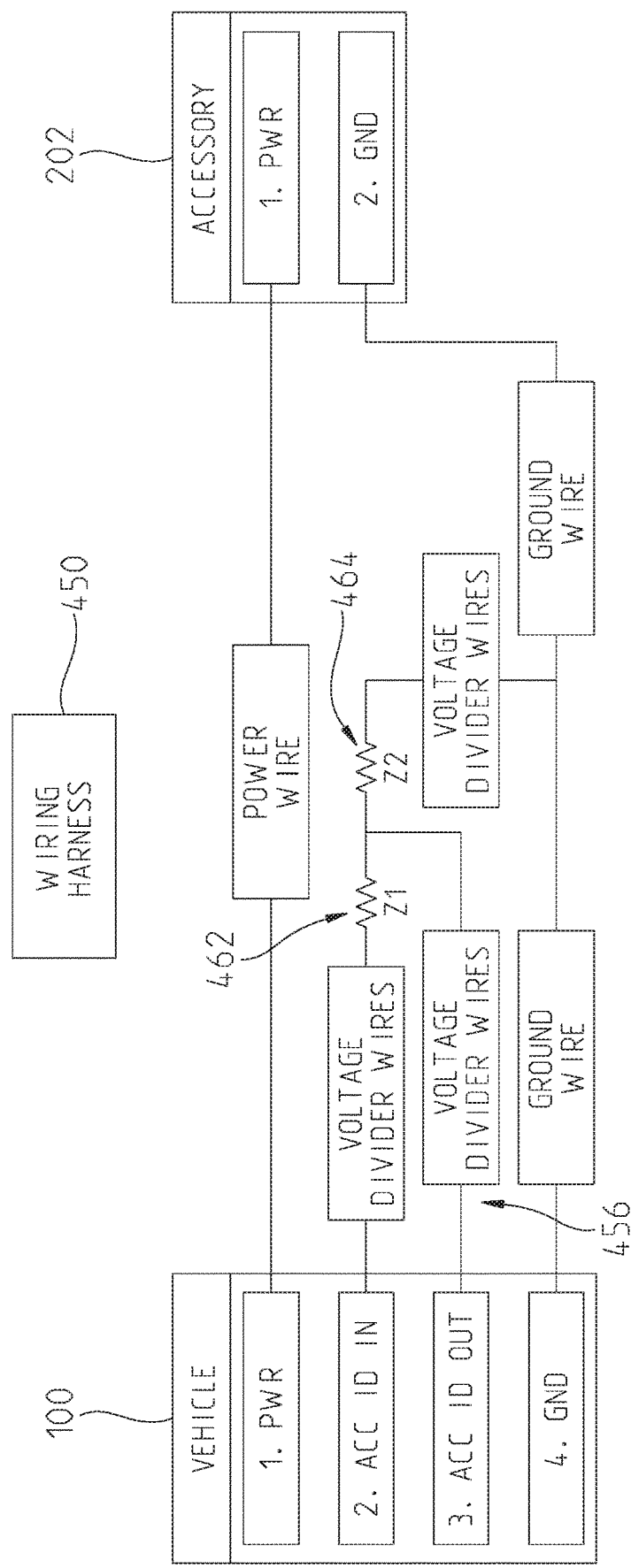
FIG. 14 illustrates an exemplary voltage divider circuitry used to identify the one or more accessories.

In some variations, the controller 140 and/or the controller 156 receives the accessory identification information indicating a particular voltage for the accessory. For example, the wiring harness 450 and/or the accessory 202 includes the voltage divider circuitry 456. FIG. 14 illustrates an exemplary wiring harness 450 with a voltage divider circuitry 456. The wiring harness 450 connects the vehicle 100 to the accessory (e.g., 202). For instance, the wiring harness 450 includes two wires (e.g., a power wire and a ground wire) that power the accessory 202. Further, the wiring harness 450 includes voltage divider circuitry 456, which includes one or more voltage divider wires and at least two resistors 462 and 464. In some instances, the power wire and one of the voltage divider wires may be the same wire. In other words, the power wire may include the resistors 462 and 464.

By varying the resistors 462 and 464 such that they are unique for each type of accessory and by keeping the "ACC ID IN" ($V_{in}$) constant for the accessories, the controller 140 and/or controller 156 receives a particular voltage (e.g., "ACC ID OUT" ($V_{out}$)) associated with the accessory. In some examples, the voltage divider circuitry 456 for the light bar accessory 202 has a resistor 462 value of 1000 ohms and a resistor 464 value of 400 ohms. If the $V_{in}$ is 14 volts, then the controller 140 and/or controller 156 receives a $V_{out}$ of 4 volts. Similarly, in some instances, a cube light accessory 206 has a voltage divider circuitry 456 that has a resistor 462 of 900 ohms and a resistor 464 value of 500 ohms. As such, if the yin is 14 volts, then the controller 140 and/or controller 156 receives a $V_{out}$ of 5 volts.

In some instances, the controller 140 and/or the controller 156 receives the accessory identification information indicating a particular pulse-width modulation (PWM) characteristic for an accessory, such as accessory 202. For instance, the controller 140 and/or controller 156 receives a PWM characteristic for an accessory via a communication line. In some examples, the communication line may be separate from the power lines. In some variations, the controller 140 and/or the controller 156 receives the accessory identification information via digital inputs, such as via an ethernet line. In other words, the wiring harness 450 includes one or more digital input lines (e.g., ethernet lines) that connect the controller 140 with the accessory. The controller 140 may receive the accessory identification information and/or control the accessory using the digital input lines.

As represented by block 406, the controller 156 determines whether the connected accessory is a known accessory based on the accessory identification information. In some examples, as mentioned previously, the controller 156 and/or the controller 140 uses a communication protocol, such as the J1939 communication protocol and/or the LIN communication protocol, to transmit (e.g., provide) accessory identification information to the controller 156 and/or the controller 140. In some instances, the accessory identification information is a message, such as a configuration message or an authentication message, that indicates the particular accessory. For instance, the accessory controller 210 for light bar accessory 202 may transmit a message indicating the accessory 202 is a light bar. Based on the controller 156 and/or the controller 140 receiving the message, the controller 156 determines (e.g., identifies) the accessory 202 and/or the type of accessory connected to the vehicle 100, and the processing sequence moves to 410.

In some variations, the accessory identification information includes information that does not indicate the particular accessory. Instead, after receiving the accessory identification information via the J1939, LIN communication protocol, and/or a communication protocol over power lines, the controller 156 compares the accessory identification information with stored information. For example, the memory 142 and/or 158 stores known accessory information. The controller 156 retrieves the known accessory information from the memory 142 and/or 158 and compares the known information with the accessory identification information. If the controller 156 determines a match and identifies the accessory, then the processing sequence 400 moves to block 410. Otherwise, the processing sequence 400 moves to block 414.

In some variations, the accessory identification information indicates a particular voltage for the accessory (e.g., using the voltage divider circuitry 456). The controller 156 compares the voltage with stored known accessory information. If there is a match, the controller 156 identifies the accessory, and the processing sequence 400 moves to block 410. For example, the memory 142 and/or 158 stores known accessory information. The controller 156 retrieves the known accessory information from the memory 142 and/or 158 and compares the known information with the accessory identification information. FIG. 15 illustrates exemplary stored accessory information. For example, the table 470 shows different accessories, such as a 10 inch light bar 204, a 30 inch light bar 202, cubes lights 206, a worklight, a wipe, and a wiper pump. Further, the table 470 shows different resistor 462 or 464 values and different $V_{out}$ values. The controller 156 compares the detected voltage from the controller 140 with the accessory information to determine the accessory. For example, if the detected $V_{out}$ is 4 Volts, then the controller 156 determines the accessory is a 30 inch light bar 202. If the controller 156 does not determine a match, the processing sequence 400 moves to block 414.

In some examples, the accessory identification information indicates a particular PWM characteristic associated with the accessory. The controller 156 compares the PWM characteristic associated with the accessory with stored accessory information indicating PWM characteristics associated with known accessories. If there is a match, the controller 156 identifies the accessory, and the processing sequence 400 moves to block 410. If not, the processing sequence 400 moves to block 414.

As represented by block 410, the controller 156 generates and/or updates an image to include the accessory. For example, after identifying the accessories, the controller 156 generates and/or updates images showing the identified accessory. The images showing the identified accessory may also show information about the vehicle 100, the accessory, and/or may include one or more interactive buttons (e.g., zones) to customize the accessory when displayed on the user interface 150. After generating and/or updating the image with the accessory, the controller 156 may store the image with the accessory in memory, such as memory 142 and/or 158 (e.g., the image may be stored in a frame buffer, updated and stored back in the frame buffer). As represented by block 416, the controller 156 causes display of the image of the accessory on the user interface 150.

Figure 16:
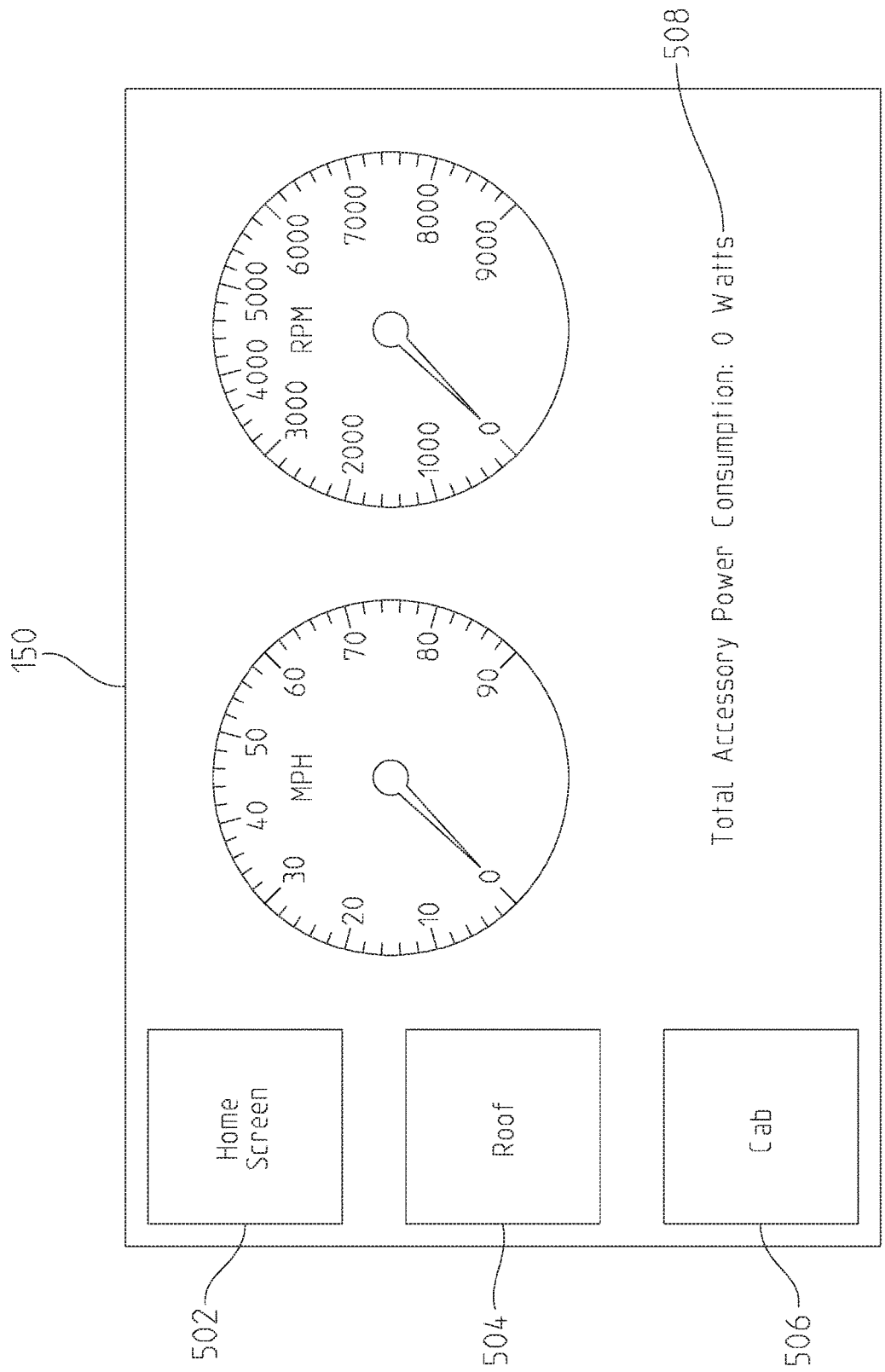
FIG. 16 illustrates an exemplary user interface displaying a first exemplary screen layout, such as a home screen.
Figure 17:
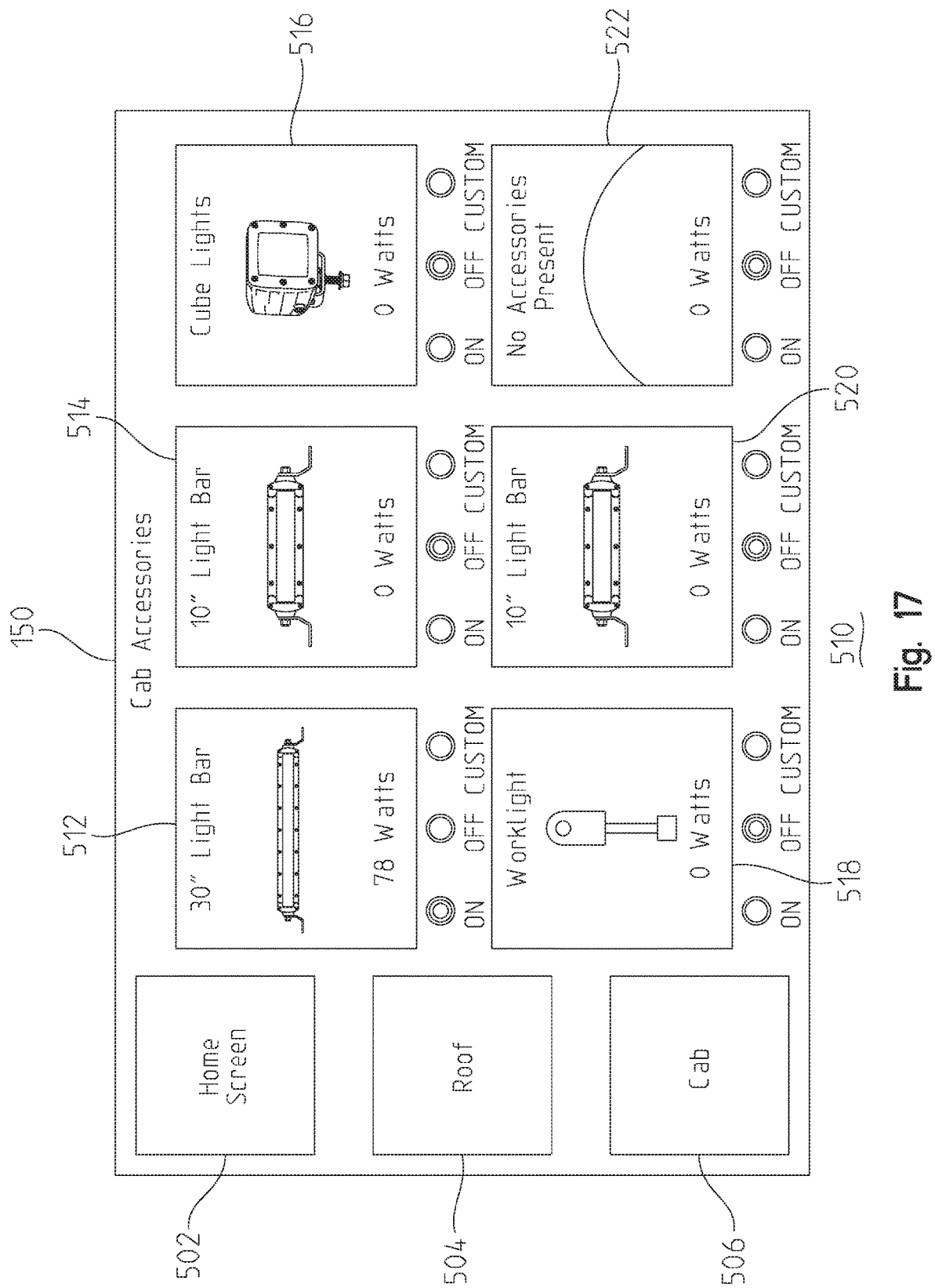
FIG. 17 illustrates the exemplary user interface of FIG. 16 displaying a second exemplary screen layout, such as an identified accessory screen.

FIGS. 16 and 17 illustrate images that are displayed on the user interface 150, and will be used to describe blocks 410 and 412. For example, FIG. 16 illustrates an image 500 that is displayed on the user interface 150. After displaying image 500, the user interface 150 illustrates information regarding the vehicle 100, such as vehicle speeds and/or the total accessory power consumption 508. Further, in some examples, the user interface 150 is and/or includes a touch screen. For example, the user interface 150 includes interactive buttons, zones, and/or portions, such as a home screen button 502, a roof button 504, and/or a cab button 506, that when pressed, may cause a different image to be displayed. In other words, if a user or operator presses, touches, and/or otherwise interacts with an interactive button, such as the cab button 506, the controller 156 receives the user input indicating an interaction with the interactive button 506, and causes display of another image, such as image 510, on the user interface 150.

FIG. 17 illustrates another image 510 that is displayed on the user interface 150. For example, if the user interacts with the cab button 506 on the user interface 150, then the controller 156 causes display of image 510 on the user interface 150. Image 510 may include similar buttons to FIG. 16, such as the home screen button 502, the roof button 504, and the cab button 506. If a user interacts with interactive button 502 (e.g., the home screen button 502), the controller 156 may cause display of image 500 on the user interface 150. If a user interacts with button 504 (e.g., the roof button 504), the controller 156 may cause display of another image that is similar to image 510, but shows the accessories connected to the roof of the vehicle 100.

Further, after displaying image 510 on the user interface 150, the user interface 150 includes additional information and/or interactive buttons for the different accessories. For example, the controller 156 generates/updates image based on the identified accessories from block 406. If an accessory is disconnected and/or if a new accessory is connected (e.g., using processing sequence 400), the controller 156 may update an image, such as image 510. For example, the controller 156 may remove the disconnected accessory from the image 510 and/or add the newly connected accessory to the image 510. Each accessory may include accessory information, such as the power consumed by the accessory, and one or more interactive buttons for the accessory. For example, after identifying the accessory as the 30-inch light bar 202, the controller 156 updates the image 510 with an image of the light bar 202 and one or more buttons for the light bar 202, and causes display of the image 510 on the user interface 150. Below the image 512 of the light bar 202, the user interface 150 displaying the image 150 includes three interactive buttons (e.g., zones, portions, and/or selections) representing "ON", "OFF", and "CUSTOM". By interacting with the "ON"/"OFF" selector, the user may turn on or off the light bar 202. The "CUSTOM" interactive button may permit a user to customize the accessory. Additionally, and/or alternatively, a customization screen may be displayed by the user interface 150 based on a user interaction with the image of the accessory (e.g., the image 512 of the light bar 202). The customization of the accessory, such as accessory 202, and the customization screen will be described in further detail below.

Referring back to block 406, if the controller 156 does not determine the accessory is a known accessory, then processing sequence 400 moves to block 414. As represented by block 414, the controller 156 causes display of a prompt requesting an accessory ID. For example, the connected accessory may be a third party accessory. As such, the controller 156 is not able to determine the identification of the accessory, and causes display of a prompt on the user interface 150.

As represented by block 416, the controller 156 receives user input indicating the accessory ID. For example, the user may use the user interface 150 to input the accessory ID. The controller 156 may obtain the user input, and the processing sequence 400 moves to block 410. As represented by block 410, the controller 156 generates and/or updates the image (e.g., image 510) based on the user input indicating the accessory identification. As represented by block 412, the controller 156 causes display of the image with the accessory. The processing sequence 400 of self-identification of the accessory ends after block 412. However, if a new accessory is connected, processing sequence 400 may repeat to identify, generate, update, and/or cause display of an image with the new accessory. Further, as will be described below, after identifying the accessories, the controller 156 controls and/or customizes the accessories based on user input and/or vehicle parameters.

Additionally, and/or alternatively, processing sequence 400 may also be used to identify accessories using radio-frequency identification (RFID) chips. Referring to FIG. 13, the communication device 222, such as a mobile phone, optionally includes an RFID scanner 458. When the RFID scanner 458 is present, the communication device 222 is able to scan RFID tags on accessories, identify the accessories, and/or cause display of the accessories. Additionally, and/or alternatively, the communication device 222 may provide information including the scanned RFID tags and/or the identified accessories to the accessory controller 140 and/or the user interface controller 156. The controller 140 and/or the controller 156 may identify the accessories and/or cause display of an image indicating the accessories on the user interface 150.

Figure 18:
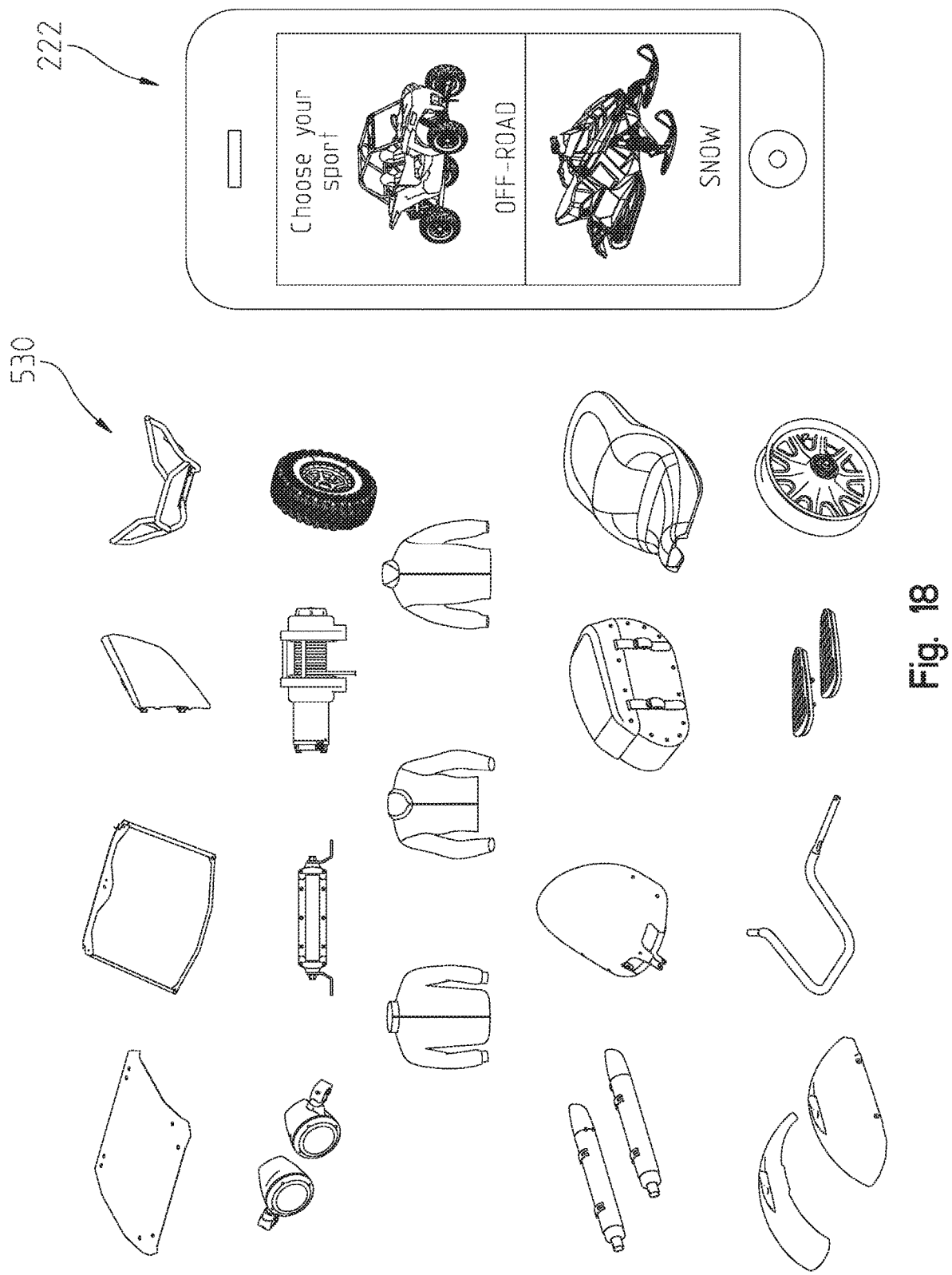
FIG. 18 illustrates additional exemplary accessories to be displayed on the user interface and another exemplary user interface displaying a third exemplary screen layout.

FIG. 18 illustrates multiple exemplary accessories 530 with RFID tags and an exemplary communication device 222. The processing sequence 400 will be described below with reference to FIG. 18. In operation, as represented by block 402, the communication device 222 (e.g., a processor or controller of the device 222) requests accessory identification information. For example, the communication device 222 includes a mobile application for the vehicle. While executing the mobile application, the communication device 222 causes display of a prompt indicating which vehicle to associate with an accessory. In response to the prompt, the communication device 222 receives user input indicating the vehicle, such as vehicle 100, that the user seeks to associate with an accessory. The communication device 222 then requests the accessory identification information. In other words, the communication device 222 causes display of a prompt for the user to scan the RFID tag associated with the accessory.

As represented by block 404, the communication device 222 receives accessory identification information (e.g., the RFID tag) for the accessory. In other words, the RFID scanner 458 scans the RFID tag for an accessory, such as one of the accessories from the accessories 530. The RFID scanner 458 provides the scanned RFID tag to the communication device 222.

As represented by block 406, the communication device 222 determines whether the accessory is a known accessory based on the scanned RFID tag. If yes, processing sequence 400 moves to block 410. As represented by block 410, the communication device 222 generates and/or updates an image with the accessory based on the scanned RFID tag. In some examples, the image with the accessory may include the vehicle 100. For example, the image may include the vehicle 100 with accessory, such as the light bar 202, connected on the vehicle 100. The communication device 222 may generate and/or update image of the light bar 202 connected to the vehicle 100 regardless if the light bar 202 is actually connected to the vehicle 100.

As represented by block 410, the communication device 222 causes display of the image with the accessory. In some examples, the communication device 222 causes display of the image with the accessory on a display screen of the communication device 222. In other examples, the communication device 222 transmits the image to the controller 140 and/or the controller 156. The controller 140 and/or the controller 156 causes display of the image with the vehicle 100 and the accessory on the user interface 150.

Returning back to block 406, if the communication device 222 determines the accessory is not a known accessory, processing sequence 400 might not move to block 414. Instead, if the communication device 222 does not determine the accessory is a known accessory, the communication device 222 may cause display of a prompt indicating the accessory is not known.

In some examples, blocks 406, 410, and/or 412 is performed by the controller 156 and/or the controller 140 instead of the communication device 222. For example, after scanning the RFID tag of the accessory, the communication device 222 transmits the RFID tag to the controller 156 and/or the controller 140. The controller 156 and/or the controller 140 determines whether the accessory is known from the RFID tag, then generates, updates, and/or causes display of an image with the accessory and the vehicle 100.

In some instances, after identifying the connected accessory, the controller 156 generates and/or provides commands to the connected accessory to control the operation of the accessory (e.g., turn the accessory on or off and/or any of the other commands described below). This will be described in further detail below.

Additionally, and/or alternatively, similar to using processing sequence 400 to identify accessories using radio-frequency identification (RFID) chips, processing sequence 400 may be used to identify accessories using other indicators, such as using photo identification, QR codes, and/or additional indicators. For example, the communication device 222 may include a camera and/or a QR code scanner. The communication device 222 may capture a photo of an accessory with the camera and/or scan a QR code associated with an accessory with a dedicated QR code scanner and/or the camera. Then, similar to above, the communication device 222, the controller 156, and/or the controller 140 may identify the accessory and/or cause display of an image with the accessory and/or the vehicle 100.

In some variations, an accessory, such as the accessory 202, may request an identification indicator (e.g., a password and/or pin) prior to permitting the use of the accessory. For example, after the vehicle 100 connects to an accessory, a user may provide an identification indicator to the accessory. In other words, the user interface 150 may receive user input indicating the identification indicator and provide the identification indicator to the accessory controller 210. The accessory controller (e.g., controller 210) may store the identification indicator in memory, such as memory in the accessory.

After storing the identification indicator in memory, the accessory may be disconnected from the vehicle 100 and connected to a second vehicle. The accessory controller may provide information to the second vehicle and prompt a user for the second vehicle to provide the identification indicator associated with the accessory. The accessory controller may receive the user input and compare the user input with the stored identification indicator. If the accessory controller determines a match, the second recreational vehicle may identify the accessory and/or control the accessory as described below. If the controller determines the stored identification indicator and the user input does not match, the accessory controller may lock out or prevent the second vehicle from identifying, controlling, and/or powering the accessory.

Self-Identification of Accessory Speakers

Figure 19:
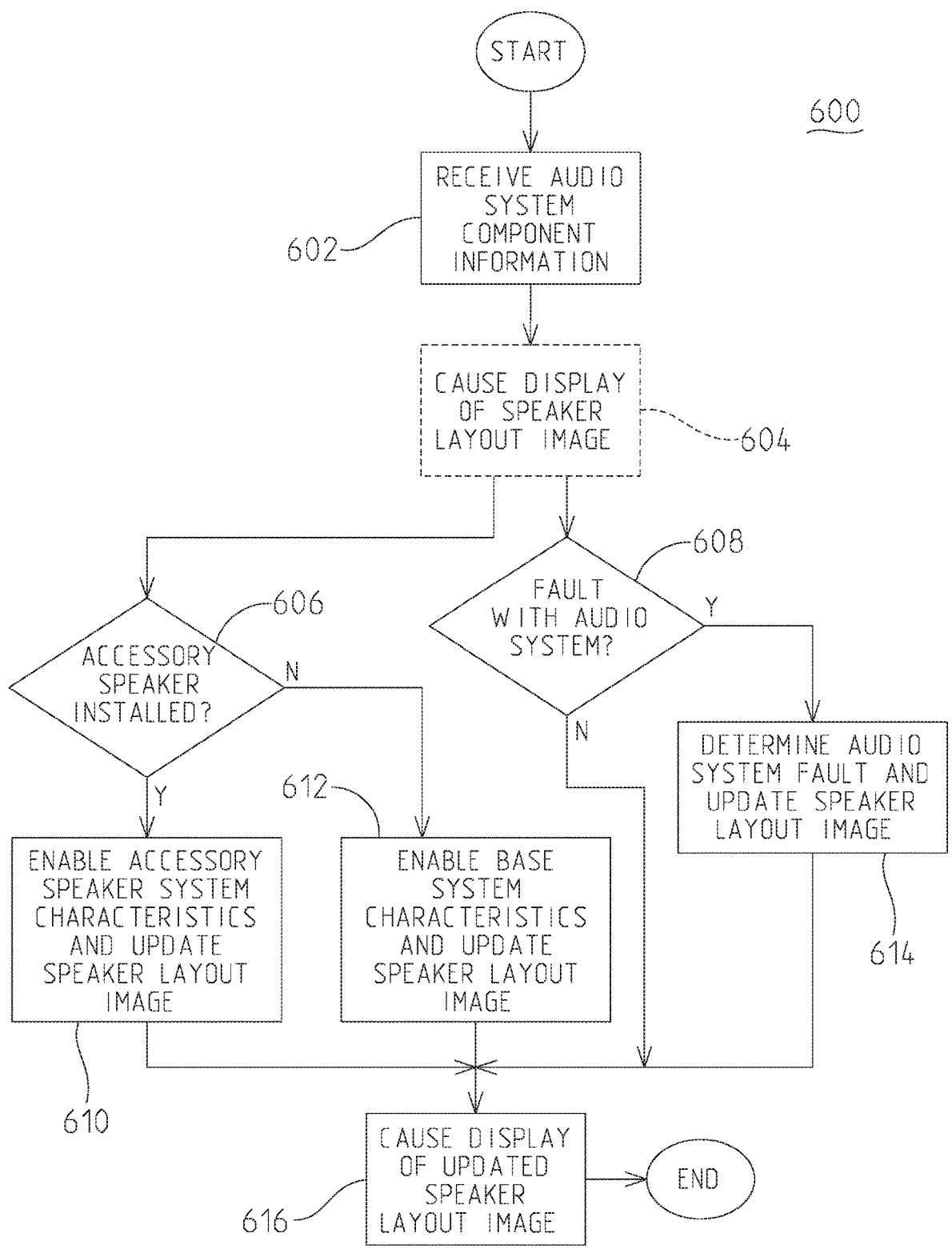
FIG. 19 illustrates another exemplary flowchart for identifying one or more accessories.

FIG. 19 illustrates an example flowchart describing a processing sequence 600 for a controller (e.g., the user interface controller 156 and/or the accessory controller 140) to automatically identify one or more accessories. In some examples, processing sequence 600 is a more detailed version of processing sequence 400. Processing sequence 600 will be described with reference to FIGS. 3, and 13. The processing sequence 600 allows the user a simpler processing sequence to identify connected speakers. For example, by simply replacing the base speakers with accessory speakers, the processing sequence 600 permits the audio system to gain additional features and/or characteristics. The automatic configuration of audio features is stored within the user interface 150. Upon detection of the accessory speakers being connected, the features associated with the accessory speakers are enabled. Further, after the connection, the user interface 150 displays to the user which speakers are connected along with any audio configuration faults in response to the user navigating to a speaker layout image (e.g., image 650 explained below) on the user interface 150.

In operation, as represented by block 602, the user interface controller 156 receives audio system component information. The audio system component information indicates one or more connected speakers, including whether the connected speakers are accessory speakers (e.g., user added speakers) or base speakers (original speakers that came with the vehicle 100). For example, similar to blocks 402 and 404, the accessory controller 140 may be coupled to and/or detect connections between an accessory and the electrical power supply 162. In other words, a smart power supply, such as the controller 140 and the electrical power supply 162, is used to determine a connection between the electrical power supply 162 and the accessory, such as a connected speaker. The controller 140 provides information indicating the connection to the controller 156. In some instances, the speakers include an audio amplifier. The controller 140 detects the audio amplifier from the speakers and based on detecting the audio amplifier, provides information to the controller 156 indicating the connected accessory speakers. In other words, the accessory speakers include and/or are operatively coupled to the identification circuitry. The controller 140 provides a signal to the identification circuitry to determine whether the speaker is an accessory speaker or a base speaker.

Figure 20:
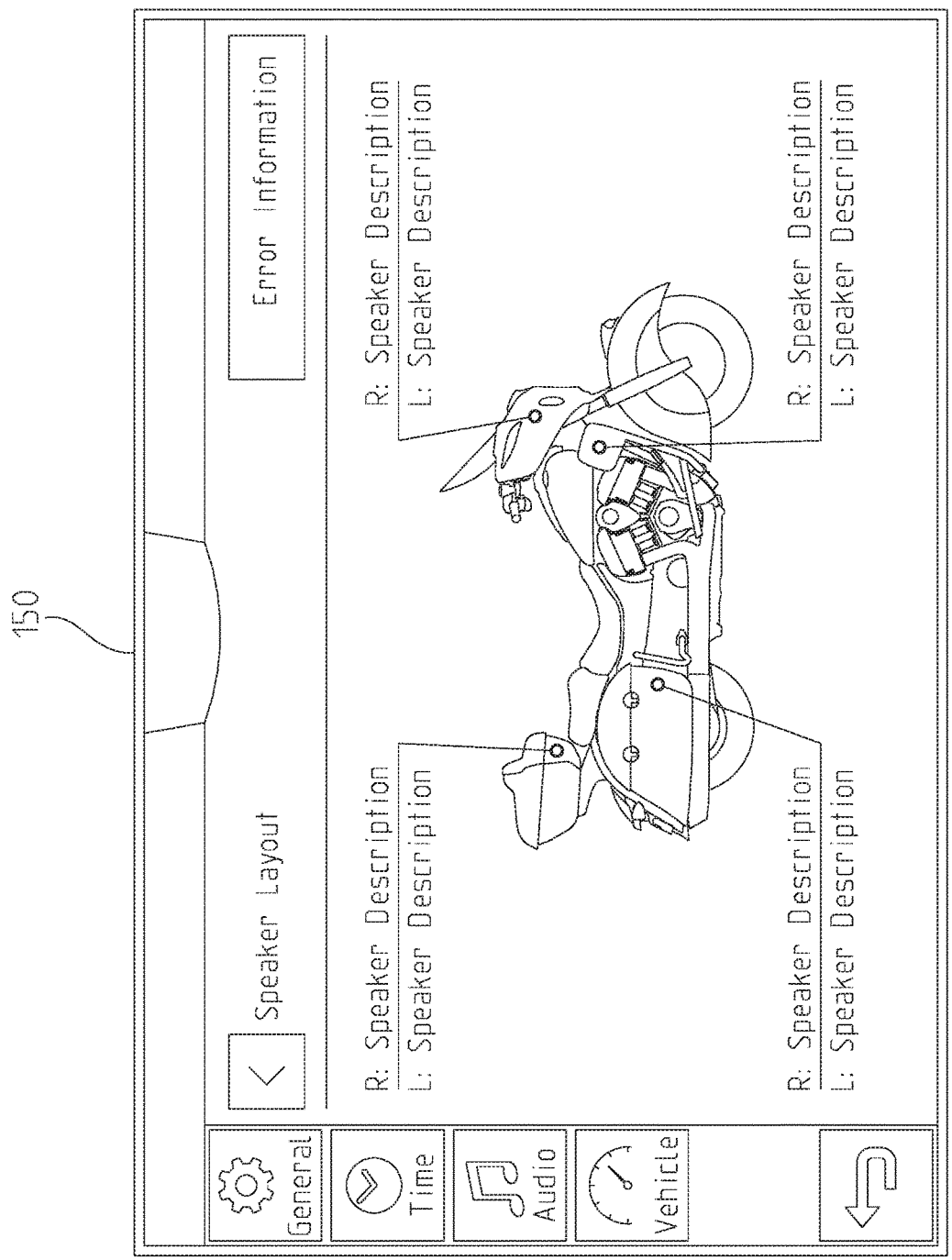
FIG. 20 illustrates the exemplary user interface of FIG. 16 displaying a fourth exemplary screen layout, such as a vehicle and accessory layout screen.
Figure 21:
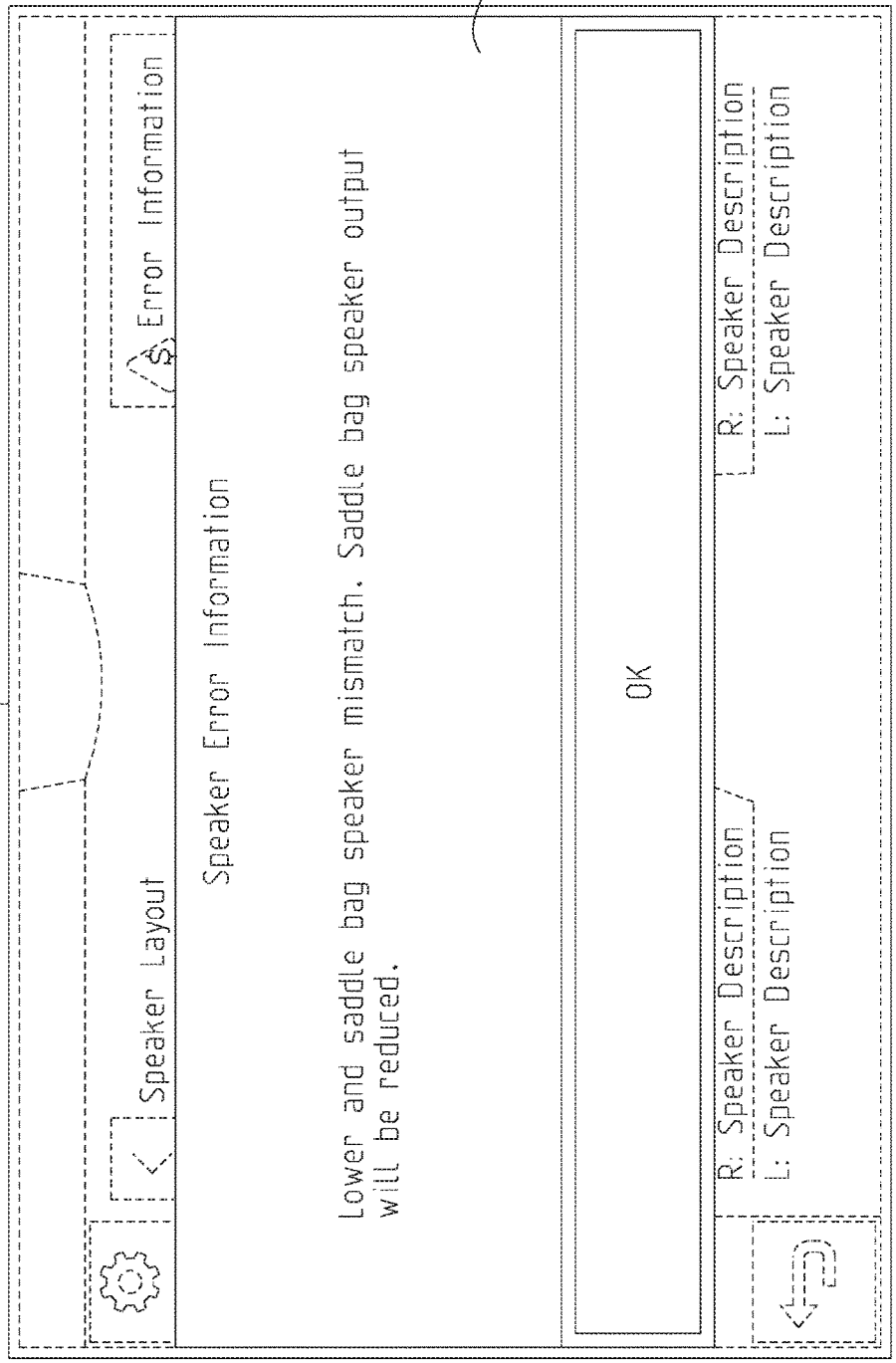
FIG. 21 illustrates the exemplary user interface of FIG. 16 displaying a fifth exemplary screen layout, such as a fault screen.

As represented by block 604, the controller 156 causes display of a speaker layout image on the user interface 150. The speaker layout image may include one or more speakers (e.g., base and/or accessory speakers) and the vehicle 100, such as a motorcycle. FIG. 20 illustrates an example of a speaker layout image 650. For example, the speaker layout image 650 displayed on the user interface 150 shows the vehicle 100 (e.g., a motorcycle) and multiple different speakers connected to the vehicle 100. The locations for the speaker placements on the motorcycle may include, but are not limited to, the motorcycle fairing, trunk, saddlebag, and/or lower fairing.

In some instances, block 604 is optional. For example, the controller 156 causes display of the speaker layout image 650 on the user interface 150 in response to user input indicating to display the image 650. Based on receiving the user input, the controller 156 may or might not cause display of the image 650. Additionally, and/or alternatively, the controller 156 may receive the user input at various different times throughout the process sequence 600. In response to receiving the user input, the controller 156 may cause display of the image 650.

As represented by block 606, similar to block 406 of detecting the accessories, the controller 156 determines whether accessory speakers are connected on the vehicle 100 based on the audio system component information. Additionally, and/or alternatively, the controller 140 (e.g., the smart power supply) determines whether the accessory speakers are connected and provides information indicating the connected speakers to the controller 156.

If they are connected, processing sequence 600 moves to block 610. If not, processing sequence 600 moves to block 612. In other words, based on whether the accessory speakers or the base speakers are connected, the controller 156 determines whether to enable and/or apply a first set of audio parameter characteristics or a second set of audio parameter characteristics. For example, if the accessory speakers are connected, the processing sequence moves to block 610, and the controller 156 generates one or more instructions to apply a first set of audio parameter characteristics. If the base speakers are connected, the processing sequence moves to block 612, and the controller 156 generates one or more instructions to apply a second set of audio parameter characteristics.

As represented by block 610, the controller 156 generates and/or provides one or more instructions to enable the accessory speaker system characteristics and/or updates the speaker layout image 650. In some examples, the accessory speaker system characteristics or first set of characteristics include, but are not limited to, permitting the user to adjust (e.g., provide user input to the controller 156) an increased amount of user-adjustable equalizer bands (e.g., 9 bands) compared to the base speaker's user-adjustable equalizer bands (e.g., 5 bands), enable a base audio boost, enable additional inputs (e.g., knobs) displayed on the user interface 150, and/or other additional abilities for the user to adjust the volume output and/or quality.

Additionally, and/or alternatively, similar to block 410, the controller 156 updates an image to show the new accessories (e.g., the connected accessory speakers), and causes display of the image on the user interface 150. For example, the controller 156 updates the audio branding shown on the speaker layout image 650 to show the new accessory speakers.

As represented by block 616, the controller 156 causes display of the updated speaker layout image 650 on the user interface 150. Referring back to block 606, if the accessory speakers are not connected, then processing sequence 600 moves to block 612. As represented by block 612, the controller 156 generates and/or provides one or more instructions to enable base speaker system characteristics and updates the speaker layout image 650. In some instances, the base speaker system characteristics or second set of characteristics include, but are not limited to, disabling a user-adjustable base audio boost, disabling one or more user-adjustable inputs displayed on the user interface 150, and/or permitting the user to adjust a decreased amount of user-adjustable equalizer bands (e.g., 5 bands compared to the 9 bands of the accessory speaker's equalizer bands). Additionally, and/or alternatively, the controller 156 updates the image (if necessary) to show the base speakers. For example, similar to block 410, the controller 156 updates the audio branding of the speaker layout image 650 to show the base accessory speakers. Then, as represented by block 616, the controller 156 causes display of the updated speaker layout image showing the base speakers.

As represented by block 608, the controller 156 determines whether there is a fault with the audio system and/or with the connection of the accessory speakers. For example, the controller 156 determines whether there is a mismatch fault between the speakers in the vehicle 100 (e.g., an accessory speaker is connected at one location, but a base speaker is connected at another location). If there is not a fault, then the processing sequence 600 moves to block 616. If there is a fault, then the processing sequence 600 moves to block 614.

As represented by block 614, the controller 156 determines the audio system fault and updates an image to show the fault. For example, after the controller 156 detects a fault due to a speaker mismatch (e.g., a lower and saddle bag speaker mismatch), the controller 156 determines which fault has occurred (e.g., speaker mismatch) and then updates an image to show the fault. In some examples, the audio system faults include, but are not limited to, no speaker connected at a speaker placement location, accessory speaker mismatch (e.g., one or more connected speakers are accessory speakers and one or more connected speakers are base speakers), and/or connected speaker error at a speaker placement location. In some instances, based on the audio system fault (e.g., speaker mismatch fault), the controller 156 may operate one or more speakers at a reduced performance.

As represented by block 616, the controller 156 causes display of the fault on the user interface 150. FIG. 20 illustrates an image 660 displayed on the user interface 150 showing a fault. By detecting and/or displaying the fault on the user interface 150, the processing sequence 600 permits a user to troubleshoot the fault.

As shown, blocks 606 and 608 operate in parallel. In examples where the controller 156 both detects a fault and that one of the accessory speakers has been connected, the controller 156 causes display of an image of the speaker layout with the enabled accessory speaker and the fault (e.g., the fault is displayed over the speaker layout). In some examples, blocks 606 and 608 are in series. In such examples, the controller 156 may determine an accessory speaker is connected. However, prior to enabling the accessory speaker system and/or updating the speaker layout image with the accessory speaker, the controller 156 determines whether there is a fault. If there is not a fault, then processing sequence 600 moves to block 610, and then to block 616. If there is a fault, then processing sequence 600 moves to block 614, and then block 616 without moving through 610.

Monitoring Power Usage of Accessories

Figure 22:
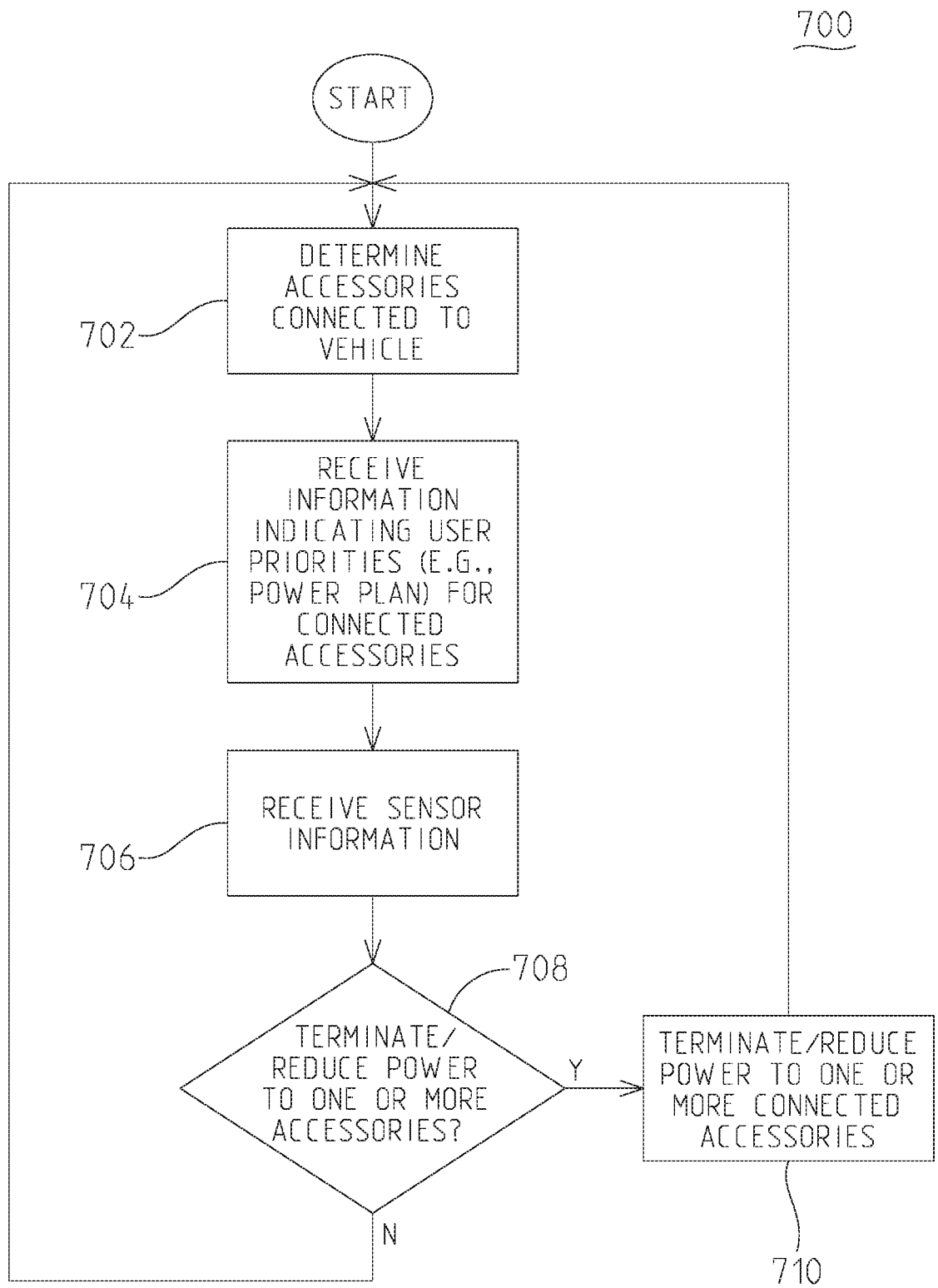
FIG. 22 illustrates an exemplary flowchart for terminating and/or reducing power to one or more accessories.

FIG. 22 illustrates an example flowchart describing a processing sequence 700 for a controller (e.g., the user interface controller 156 and/or the accessory controller 140) to terminate and/or reduce power to one or more accessories based on user input and/or sensor information. Using processing sequence 700 permits the vehicle 100 to shed or remove connected accessories based on a priority system. For example, by terminating power to one or more connected accessories, the vehicle 100 is able to allow the user to prioritize accessories to turn off based on certain vehicle parameters, such as the state of charge (SOC) of the battery. As such, the vehicle 100 is able to maintain power to the user prioritized accessories for a longer duration while terminating power to lower prioritized accessories.

In operation, as represented by block 702, the controller 156 determines accessories connected to the vehicle 100. For example, as mentioned above in processing sequence 400, the controller 156 determines and/or receives information indicating the accessories, such as accessory 202, 204, 206, 208, connected to the accessory controller 140.

As represented by block 704, the controller 156 receives information indicating user priorities (e.g., a power plan) for the connected accessories. For example, the user may use the user interface 150 to input or select priorities for the connected accessories. The controller 156 receives the user input priorities and uses them to determine whether to terminate/reduce power to one or more connected accessories.

For instance, referring back to FIGS. 16 and 17, the controller 156 may cause display of the image 500 on the user interface 150. The user may interact with different portions or interactive buttons of the displayed image 500 on the user interface 150. Based on the portion of the image the user interacted with, the controller 156 may cause display of a second image, such as image 510. Similarly, the user may interact with portions of on the user interface 150. As mentioned previously, image 510 indicates accessories connected to the vehicle 100. By selecting (e.g., pressing, touching, and/or interacting with) one of the images representing the accessories (e.g., images 512-520) on the user interface 150, the user is able to customize or control the selected accessory. In other words, in response to selecting an accessory (e.g., the user interface 150 receiving user input indicating a button or portion of the image related to the accessory), the user interface 150 provides user input to the controller 156 indicating the selected accessory. Then, the controller 156 causes display of a third image that allows the user to customize the accessory.

Figure 23:
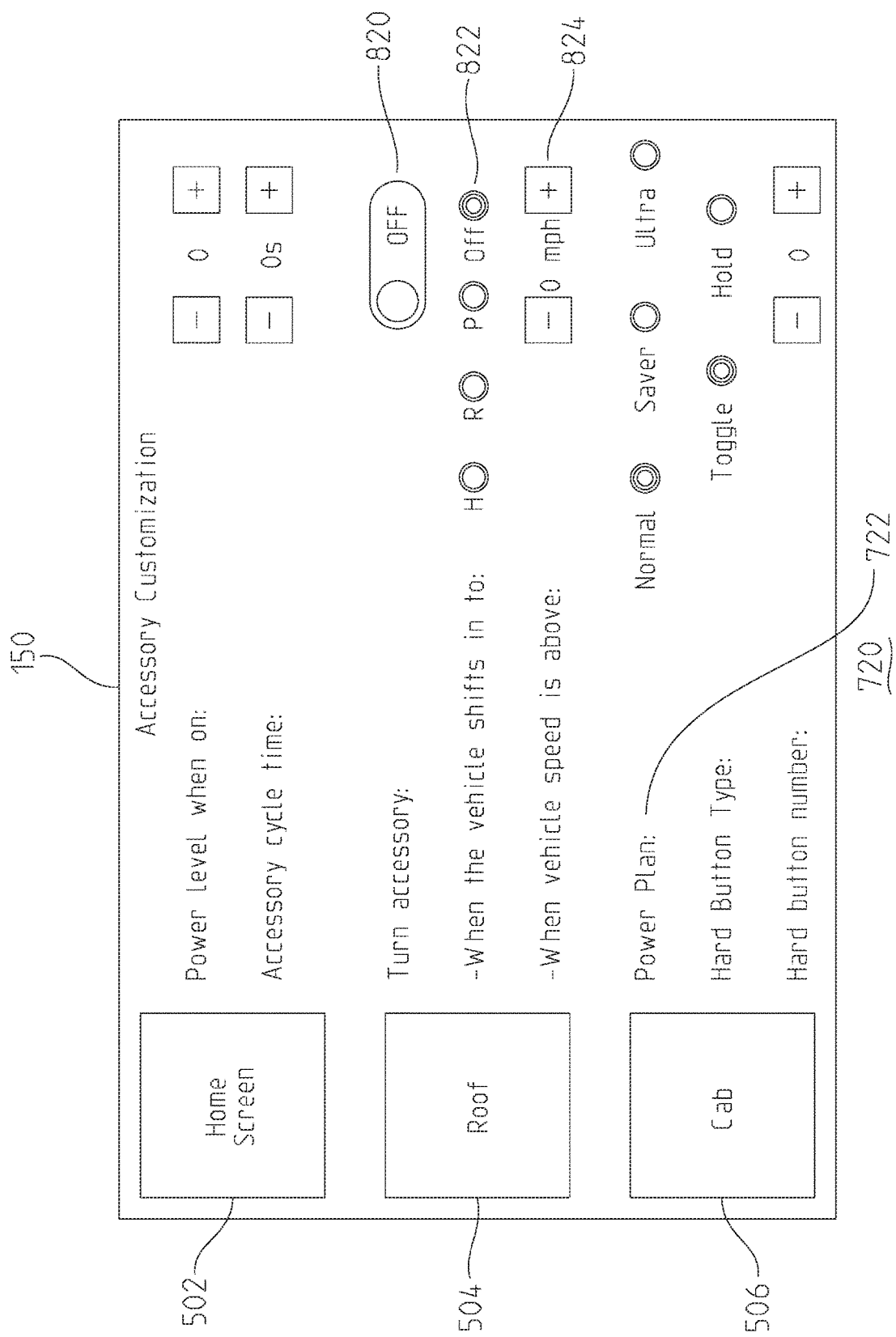
FIG. 23 illustrates the exemplary user interface of FIG. 16 displaying a sixth exemplary screen layout, such as an accessory customization screen.

FIG. 23 illustrates an exemplary accessory customization image 720 that is displayed on the user interface 150. For example, in response to receiving user input indicating a selection of the image 512 for the light bar accessory 202, the controller 156 causes display of image 720 indicating the accessory customization of the light bar accessory 202. Similar to the other images, the user may interact with the user interface 150 to select three different power plans 722 (e.g., priorities). The three power plans are normal, saver, and ultra. The normal power plan permits the accessory to operate regardless of battery level or accessory power consumption. The saver power plan allows the accessory to operate until the vehicle engine turns off or the battery levels are below a threshold. The ultra-power plan allows the accessory to operate until the vehicle engine turns off or accessory consumption is too high.

Using the displayed image 512 on the user interface 150, the user may select a power plan 722 for the accessory. In other words, based on the user interacting with the displayed image 512 of the user interface 150, the user interface 150 receives user input indicating a selected power plan (e.g., normal, saver, or ultra). The user interface 150 transmits the user input to the controller 156. As will be described below, the user input indicating the selected power plan is used to determine whether to terminate and/or reduce power to the accessory.

Only three exemplary power plans and/or priorities are shown in FIG. 23 and described above solely for brevity and clarity. However, additional types or concepts of power plans and/or priorities may also be used to determine whether to power on, turn off, and/or reduce power to the accessory. For example, the controller 156 may cause display of more or less than three priorities on the user interface 150 for the user to select. Additionally, and/or alternatively, each of the priorities may include similar and/or different limitations than the normal, saver, and/or ultra-power plans described above, and may cause different limitations to terminate and/or maintain operation of their corresponding accessories.

As represented by block 706, the controller 156 receives sensor information. For example, referring to FIG. 11, the accessory controller 140 receives sensor information from multiple different sensors, including the electrical power supply voltage sensor 308, the engine speed sensor 304, the accessory power consumption sensor(s) 318, the gear position sensor 310, and/or additional sensors coupled to the vehicle 100. After receiving the sensor information, the accessory controller 140 transmits the sensor information to the controller 156.

The electrical power supply voltage sensor 308 provides information indicating a battery voltage (e.g., a state of charge of the electrical power supply 162) to the controller 156 via the controller 140. The electrical power supply voltage sensor 308 may be operatively coupled to the electrical power supply 162 and may be any type of sensor that detects the state of charge of the electrical power supply 162. For example, the electrical power supply voltage sensor 308 is a battery monitoring sensor that monitors and detects/determines a charge of the electrical power supply 162.

The engine speed sensor 304 provides information indicating an engine speed (e.g., rotations per minute (RPM)) to the controller 156 via the controller 140. The engine speed sensor 304 is any type of sensor that detects an engine speed of the engine (e.g., the rotational speed of the crankshaft of the engine).

The accessory power/current consumption sensor(s) 318 may include one or more sensors and/or circuitry that detect a power usage, voltage, and/or current usage of the connected accessories. For example, the accessory power/current consumption sensor(s) 318 may be operatively coupled to each accessory and may provide information indicating a power consumption of the accessory and/or an amount of current drawn by the accessory. The sensor(s) 318 is any type of sensor that detects the power usage and/or current usage of the connected accessories. The accessory power/current consumption sensor(s) 318 provides, to the controller 156 via the controller 140, information indicating a power usage and/or a current usage of the accessory. In some instances, the accessory power/current consumption sensor(s) 318 may be included within the accessory controller 140 and/or the user interface controller 156. In other words, the accessory controller 140 and/or the user interface controller 156 may detect the power/current consumption of the accessories. Additionally, and/or alternatively, sensor 318 may determine the voltage and/or current usage of the accessories and use the voltage and/or current usage to determine the power consumption of the accessories.

As represented by block 708, the controller 156 determines whether to terminate and/or reduce power to one or more connected accessories based on the sensor information (e.g., state of charge (SOC) of the electrical power supply, the engine speed, power consumption of the accessory, and/or the current consumption of the accessory) and the user priorities. If the controller 156 determines to terminate/reduce power to one or more connected accessories, the processing sequence 700 moves to block 710. If not, the processing sequence 700 moves back to block 702, and the process repeats.

In some examples and referring to the example described in FIG. 23, based on the user priorities indicating a normal power plan, a saver power plan, and an ultra power plan, the controller 156 determines whether to terminate/reduce power to the connected accessories. For instance, the controller 156 determines the accessories with a normal power plan. Regardless of accessory power consumption (e.g., power usage/current consumption) and/or electrical power supply level (e.g., the SOC of the electrical power supply), the controller 156 does not terminate and/or reduce power to the accessory. Additionally, and/or alternatively, based on determining that the vehicle engine is off (e.g., the engine speed sensor 304 indicates the engine speed satisfies a threshold) and/or the electrical power supply level (e.g., SOC of the electrical power supply) satisfies (e.g., is below) a threshold, the controller 156 determines to terminate and/or reduce power to accessories that have a saver power plan. Additionally, and/or alternatively, based on determining that the vehicle engine is off and/or the accessory consumption (e.g., the power consumption and/or current consumption) satisfies (e.g., is above) a threshold, the controller 156 determines to terminate and/or reduce power to the accessories that have an ultra-power plan.

As represented by block 710, the controller 156 terminates and/or reduces power to one or more connected accessories. For example, based on the sensor information and/or the user priorities, the controller 156 terminates/reduces power to one or more connected accessories. In other words, the controller 156 provides information to the controller 140. The controller 140 terminates the connection between the electrical power supply 162 and the accessory, which causes the accessory to be turned off. After block 710, the processing sequence 700 may move back to block 702 and repeat.

In some examples, if the engine speed satisfies a threshold (e.g., if the engine speed indicates the engine is off and/or below a threshold), then the controller 156 terminates power to the accessories with an ultra-power plan and/or the saver power plan. In some instances, if the SOC of the electrical power supply satisfies a threshold (e.g., is below a threshold), then the controller 156 terminates power to the saver power plan accessories. In some variations, if the accessory consumption (e.g., power/current consumption) satisfies a threshold (e.g., is above the threshold), then the controller 156 terminates power to the ultra-power plan accessories.

In some examples, the controller 156 causes display of a prompt or indication of the terminated accessories. For example, if the light bar accessory 202 has an ultra-power plan and the controller 156 determines the power consumption of the light bar accessory 202 is greater than the threshold, then the controller 156 terminates power to the light bar accessory 202. The controller 156 may then cause display a prompt indicating the light bar accessory 202 has been turned off. The controller 156 may also provide a reason for turning off the light bar accessory 202 in the prompt (e.g., the power consumption was too high).

In some examples, as represented by block 704, the controller 156 receives information indicating user priorities on a channel by channel basis. For example, FIG. 24 illustrates another exemplary accessory customization image 730 that may be displayed on the user interface 150. The user may use the displayed image 730 on the user interface 150 to set their user priorities. For instance, each accessory is connected to a particular channel (e.g., channels 1, 2, 3 . . . n). Further, the user may select and/or input a priority for each accessory on a channel-by-channel (e.g., accessory by accessory basis). In other words, the user interface 150 receives user input indicating a priority for a particular channel associated with an accessory. In response to the user input indicating a desire to change a priority for a particular accessory, the controller 156 causes display of a prompt on the user interface 150. The user may use the prompt to input a new priority for the accessory, and the user interface 150 provides the user input indicating the new priority to the controller 156. In some instances, the controller 156 may receive information indicating a different priority for each channel/accessory. In other instances, the controller 156 may receive information indicating one or more accessories with the same priority and/or one or more accessories with different priorities.

In some instances, the user may select and/or input a maximum current value 736 for each accessory. For example, similar to above where the user interface 150 permits the user to input priorities, the controller 156 causes display of a prompt for a new maximum current value for the accessory. Further, the controller 156 receives user input indicating a new maximum current value for the accessory (e.g., on a channel-by-channel/accessory by accessory basis).

Then, in operation, as represented by block 708, the controller 156 compares the maximum current value with the detected current usage from the sensor 318 to determine whether to terminate and/or reduce power to the accessory. For example, if the detected current usage for the accessory is greater than or equal to the maximum current value, then the controller 156 determines, terminates, and/or reduces power to the accessory. In other words, the controller 156 provides information to the controller 140, and the controller 140 terminates the connection from the electrical power supply 162 to the accessory.

Figure 25:
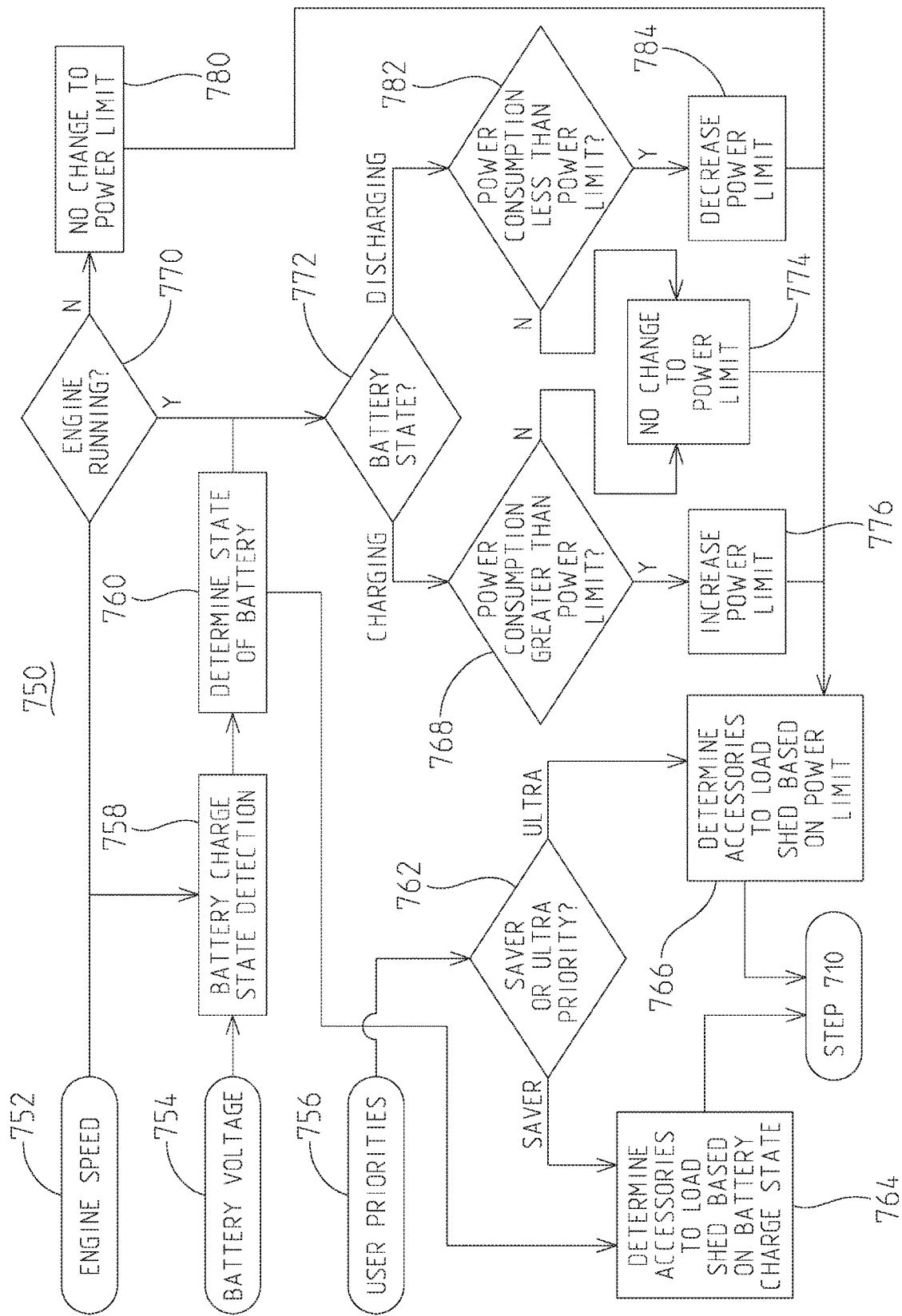
FIG. 25 illustrates another exemplary flowchart for terminating and/or reducing power to one or more accessories.

FIG. 25 illustrates another exemplary flowchart to determine whether to terminate and/or reduce power to the one or more accessories. For example, processing sequence 750 is an exemplary implementation of block 708 from the processing sequence 700. In other words, in some examples, the controller 156 may determine whether to terminate and/or reduce power to one or more accessories using the processing sequence 750. In other examples, another processing sequence and/or logic, such as the examples described above, may be used to determine whether to terminate and/or reduce power to the accessories.

In operation, as mentioned above and represented by blocks 752, 754, and 756, the controller 156 may receive the detected engine speed, the detected battery voltage, and the user priorities. As represented by blocks 758 and 760, the controller 156 may determine a charging state of the battery 162 (e.g., whether the battery 162 is charging and/or discharging). For example, block 758 may represent logic, such as an electronic circuit and/or one or more instructions stored in memory 158 and executable by a controller, such as the controller 156. In some examples, the controller 156 may include electronic circuitry that detects whether the battery 162 is charging and/or discharging. In other examples, the electronic circuitry may be separate from the controller 156 (e.g., electrically coupled to the controller 156). In yet other examples, the battery charge state detection 758 may be stored as instructions in memory, and when executed, the controller 156 may determine whether the battery 162 is charging and/or discharging.

As mentioned above, the controller 156 may determine whether to terminate and/or reduce power to the accessories based on whether the user priority indicates the accessory is in a normal power plan mode, saver power plan mode, and/or an ultra-power plan mode. As represented by blocks 762, the controller 156 may determine the accessories associated with a saver power plan priority. Then, based on the saver power plan priority and/or the charging state of the battery 162 (e.g., whether the battery 162 is charging or discharging and/or whether the battery 162 is below a threshold), the controller 156 may determine accessories to load shed (e.g., terminate and/or reduce power to). Then, referring back to FIG. 22, as represented by block 710, the controller 156 may generate and/or provide one or more commands to terminate and/or reduce power to the accessories with the saver power plan priority.

Additionally, and/or alternatively, referring back to FIG. 25, the controller 156 may determine a power limit threshold and load shed accessories based on the power limit threshold. For example, the controller 156 may determine whether to increase or decrease the current power limit threshold based on the determined battery state (e.g., charging/discharging) and/or the engine speed. For example, as represented by block 770, if the controller 156 determines the engine is not running based on the engine speed, the controller 156 might not change the current power limit threshold. The processing sequence 750 then moves to block 766. If the engine is running, the process sequence 750 may move to block 772. As represented by block 772, the controller 156 may determine whether the charging state indicates the battery is charging or discharging.

If the battery is charging, the processing sequence moves to block 768. As represented by block 768, the controller 156 determines whether the total amount of power consumption used by the connected accessories is greater than the current power limit threshold. If no, the processing sequence 750 moves to block 774 and the controller 156 does not change the current power limit. If yes, the processing sequence 750 moves to block 776 and the controller 156 updates (e.g., increases) the current power limit.

If the battery is discharging, the processing sequence moves from block 772 to block 782. As represented by block 782, the controller 156 determines whether the power consumption is less than the current power limit. If no, the processing sequence 750 moves to block 774 and the controller 156 does not change the current power limit. If yes, the processing sequence 750 moves to block 784 and the controller 156 updates (e.g., decreases) the current power limit.

As represented by block 766, the controller 156 determines accessories to load shed (e.g., terminate and/or reduce power to) based on the determined power limit threshold (e.g., the increased, decreased, and/or previous power limit threshold). For example, the controller 156 may determine to load shed accessories based on the battery charging state (e.g., charging/discharging) and/or the determined power limit threshold. The controller 156 may adjust the power consumption of the accessories (e.g., reduce/terminate power to the accessories) until the battery charging state and/or the power limit threshold are satisfied (e.g., the battery charging state indicates the battery 162 is charging and/or the total power consumption is below the power limit threshold). For example, the controller 156 may determine to terminate power to one or more accessories to lower the total power consumption of the accessories to below the determined power limit threshold. Additionally, and/or alternatively, the controller 156 may determine to reduce the power to one or more accessories (e.g., decrease the PWM level of one or more connected the accessories) to lower the total power consumption to below the determined power limit threshold.

In some instances, the controller 156 may receive, via the user interface 150, user input indicating priorities for the connected accessories (e.g., numerical priority values, power mode selection, and/or other user input that indicates priority). The controller 156 may reduce the total accessory power consumption based on the user input. For example, the controller 156 may reduce the total accessory power consumption by terminating and/or reducing power to the lowest priority accessories first until the total accessory power consumption is below the determined power limit threshold. Additionally, and/or alternatively, the controller 156 may increase the total accessory power consumption by turning on and/or increasing power to the higher priority accessories until the total accessory power consumption satisfies and/or reaches the power limit threshold.

In some variations, multiple accessories may have the same user selected priorities. In such variations, the controller 156 may sort and prioritize the accessories with the same user selected priorities based on one or more parameters (e.g., accessory type, the power consumption of the accessory, and/or additional detectable parameters). Additionally, and/or alternatively, the parameters may be pre-determined, pre-programmed and/or user-defined (e.g., the controller 156 may receive the parameters from the user interface 150). The controller 156 may load shed accessories based on the sorting and/or prioritizing the accessories based on the parameters.

Accessory Customization Based on User Input and Vehicle Parameters

Figure 26:
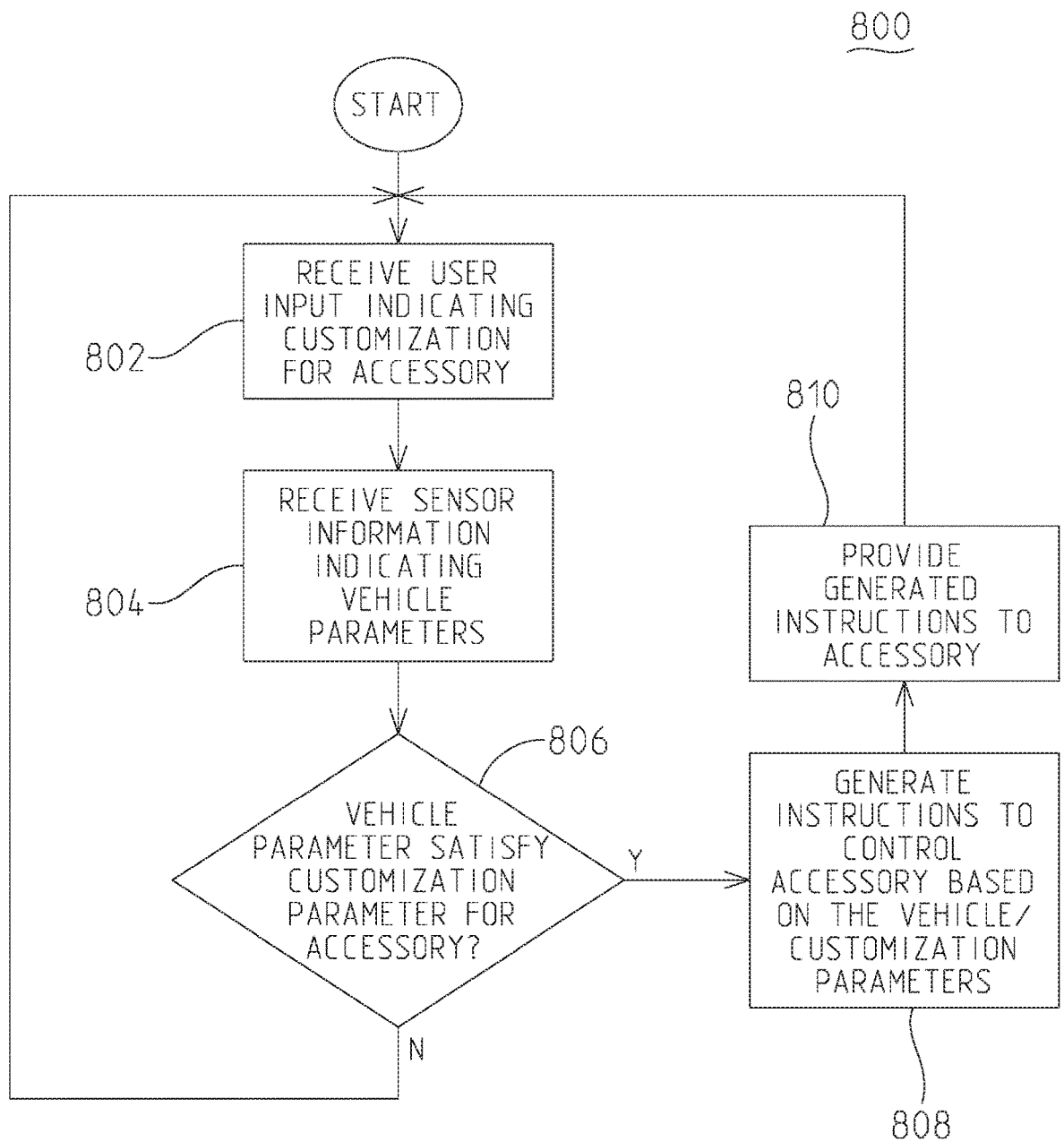
FIG. 26 illustrates an exemplary flowchart for controlling the one or more accessories using detected vehicle parameters.

FIG. 26 illustrates an example flowchart describing a processing sequence 800 for a controller (e.g., the user interface controller 156 and/or the accessory controller 140) to control and/or customize accessories based on user input and vehicle parameters.

Using processing sequence 800 permits a user to customize the accessory to their liking. For example, different users have different preferences, especially with the type and control of the accessories they connect to a vehicle, such as vehicle 100. By using processing sequence 800, the user is able to customize multiple accessories to their liking. For instance, a user may want the left side of their light bar to light up when turning left. As such, the user may customize the light bar, using the controller 156, such that the left side of the light bar turns on when turning left. Further, a user may seek to flash all vehicle lights when airborne. As such, the user may customize the lights of the vehicle 100 to flash on and off continuously when airborne. This will be explained in further detail below.

In operation, as represented by block 802, the controller 156 receives information indicating user customization for an accessory, such as accessory 202. For example, the user may use the user interface 150 to input user customization (e.g., customization parameters) for the accessory. The user interface 150 may provide the information indicating the user customization input to the controller 156.

In some instances, referring back to FIG. 17, the controller 156 may cause display of the image 510 on the user interface 150. Below each image of the accessory is an "ON", "OFF", or "CUSTOM" interactive button. The user may select, press, and/or otherwise interact with the "CUSTOM" button. The user interface 150 provides the user input to the controller 156. The controller 156 receives the user input and causes display of the selection of the custom button on the user interface 150. Further, the controller 156 enables the customization of the corresponding accessory indicated by the user input.

In some examples and for some accessories, the customization is pre-defined and/or pre-programmed. The controller 156 stores the pre-defined and/or pre-programmed customization information in memory, such as memory 142 and/or 158. Based on the user input indicating the customization for the accessory, the controller 156 retrieves the pre-defined and/or pre-programmed customization information from memory. Then, as will be explained below, based on one or more vehicle parameters (e.g., vehicle speed, turn signal, SOC of the electrical power supply), the controller 156 provides different commands to the accessories to control the accessories (e.g., turn left portion of light bar 202 on).

In some variations and for some accessories, the user is able to change the pre-defined and/or pre-programmed customization information using the user interface 150. The controller 156 receives the changed customization information from the user interface 150. Then, the controller 156 updates the customization information (e.g., stores the new/user-defined customization information) in memory, such as memory 142 and/or 158. The controller 156 then operates according to the new customization information. For example, as mentioned above and referring back to FIG. 23, the user is able to customize functions of individual accessories. For example, the user is able to customize when the accessory is turned off 820 (e.g., based on a gear shift position 822 and/or a vehicle speed 824). As mentioned above, image 720 is merely an exemplary representation and additional accessory customization parameters may also be included. The capability for the user to change the customization information will be described in further detail below.

As represented by block 804, the controller 156 receives sensor information from one or more sensors, components and/or entities. For example, referring to FIG. 11, the accessory controller 140 receives sensor information from multiple different sensors, components, and/or entities, including the electrical power supply voltage sensor 308, the engine speed sensor 304, the vehicle speed sensor 302, the steering sensor 306, the engine boost level sensor 314, the inertial measurement unit (IMU) 312, the gear position sensor 310, the ambient light detection sensor 316, the location determiner 184, and/or any additional sensors coupled to the vehicle 100. After receiving the sensor information, the accessory controller 140 transmits the sensor information to the controller 156.

The vehicle speed sensor 302 provides information indicating a vehicle speed to the controller 156 via the controller 140. The vehicle speed sensor 302 is any type of sensor that detects a vehicle speed of the vehicle 100.

The engine speed sensor 304 provides information indicating an engine speed (e.g., rotations per minute (RPM)) to the controller 156 via the controller 140. The engine speed sensor 304 is any type of sensor that detects an engine speed of the engine (e.g., the rotational speed of the crankshaft of the engine).

The steering sensor 306 provides information indicating a steering angle, steering position, and/or steering rate to the controller 156 via the controller 140. The steering sensor 306 is any type of sensor that detects the steering angle, position, and/or rate of the vehicle 100.

The electrical power supply voltage sensor 308 provides information indicating an electrical power supply voltage (e.g., a state of charge of the electrical power supply 162) to the controller 156 via the controller 140. The electrical power supply voltage sensor 308 may be operatively coupled to the electrical power supply 162 and may be any type of sensor that detects the state of charge of the electrical power supply 162. For example, the electrical power supply voltage sensor 308 is a sensor that monitors and detects/determines a charge of the electrical power supply 162.

The gear position sensor 310 provides information indicating a gear position (e.g., park, neutral, reverse, drive) to the controller 156 via the controller 140. The gear position sensor 310 is any type of sensor that detects a vehicle speed of the vehicle 100.

The inertial measurement unit (IMU) 312 provides information indicating an inertial measurement, such as a yaw rate, pitch rate, roll rate, longitudinal acceleration, and/or lateral acceleration, to the controller 156 via the controller 140. The IMU 312 is any type of sensor that detects the yaw rate, pitch rate, roll rate, longitudinal acceleration, and/or lateral acceleration of the vehicle 100.

The engine boost level sensor 314 provides information indicating an engine boost to the controller 156 via the controller 140. For example, the engine boost level sensor 314 is any type of sensor that detects an engine boost or a turbo boost pressure of the vehicle 100. The engine boost is the air pressure developed in the intake manifold of the engine. In some examples, a controller, such as an engine control module, may detect the turbo boost pressure and provide the turbo boost pressure to the controllers 140 and/or 156 via the CAN bus.

The ambient light detection sensor 316 provides information indicating an amount of detected ambient light to the controller 156 via the controller 140. The ambient light detection sensor 316 is any type of sensor that detects an ambient light level.

As represented by block 806, the controller 156 determines whether the vehicle parameters satisfy the customization parameters for one or more accessories. For example, the controller 156 retrieves the customization information (e.g., pre-programmed, pre-defined, and/or user-defined customization information) from memory, such as memory 142 and/or 158. The controller 156 compares the parameters from the customization information with the vehicle parameters from the sensor information. If one or more customization parameters satisfy the vehicle parameters, the processing sequence 800 moves to block 808. Otherwise, the processing sequence 800 goes back to 802 and the process repeats.

In some instances, and referring to FIG. 23, the user sets customization parameters for when to turn the accessory off 820. For example, the user may input that the accessory is to turn off based on a gear shift position 822 and/or when the vehicle speed is above a threshold 824. The controller 156 receives the user-defined customization information indicating the customization parameters (e.g., if the vehicle shifts to a reverse (R) gear shift position and/or if the vehicle speed is above 30 MPH, then turn off the accessory). The controller 156 compares the user-defined customization information with the vehicle parameters. If the vehicle parameters indicate either the gear shift position is in a reverse gear and/or the vehicle speed is above 30 MPH, then the processing sequence 800 moves to block 808. Otherwise, the processing sequence 800 goes back to 802.

As represented by block 808, the controller 156 generates instructions to control the accessory based on the vehicle parameters and/or the customization parameters. For example, the controller 156 determines one or more vehicle parameters that satisfy one or more customization parameters for an accessory, and generates instructions (e.g., commands) for the accessory. In some examples, the controller 156 generates instructions to turn off the accessory based on the gear shift position being in a reverse gear and/or the vehicle speed being above 30 MPH.

As represented by block 810, the controller 156 provides the generated instructions to the accessory and/or accessory controller 140. For example, referring to FIG. 13, the controller 156 provides the generated instructions to the accessory controller 140. In some examples, the accessory controller 140 executes the generated instructions (e.g., terminate and/or reduce power to the accessory). In other examples, the accessory controller 140 provides the instructions to an accessory, such as accessory 202. For example, the accessory controller 140 provides the instructions to an accessory controller, such as the accessory controller 210. The accessory controller 210 receives the generated instructions, and executes the generated instructions (e.g., turn off the accessory). In yet other examples, an accessory, such as accessory 202, does not include an accessory controller. In such examples, the controller 140 provides the instructions to the transceiver 452 and/or the harness microcontroller 454. The harness microcontroller 454 receives and executes the generated instructions and controls the operation of the accessory (e.g., turn off the accessory). After providing the generated instructions, the processing sequence 800 moves back to block 802 and repeats.

As mentioned previously, an accessory, such as accessory 202, communicates with the controller 140 via the wiring harness 450 using multiple different communication methods. For example, an accessory may communicate with the controller 140 using a communication protocol, such as the CAN/J1939 communication protocol, the LIN communication protocol, and/or the communication protocols (e.g., LIN) over power lines. The controller 140 provides the generated instructions via the wiring harness 450 to the harness microcontroller 454 and/or the accessory controller (e.g., controller 210) using the communication protocols.

Additionally, and/or alternatively, the controller 140 provides the generated instructions via the wiring harness 450 to the harness microcontroller 454 and/or the accessory controller using a pulse-width modulation (PWM) characteristic. For example, based on the satisfied vehicle parameters and/or the customization parameters, the controller 140 and/or the controller 156 varies the PWM frequency output to the accessory, such as the light bar accessory 202. In other words, different parameters may have different PWM frequencies assigned to them, and controller 156 and/or controller 140 selects and outputs the PWM frequency based on the parameters. The harness microcontroller 454 and/or the accessory controller (e.g., controller 210) obtains the PWM frequency. Further, the harness microcontroller 454 and/or the accessory controller identifies the PWM frequency and executes instructions to control the accessory based on the frequency.

For example, the light bar accessory 202 includes one or more lights, such as a spot light or a flood light. Based on the different PWM frequencies from the controller 140 and/or controller 156, the accessory controller 210 and/or harness microcontroller 454 turns on the spot light, the flood light, and/or both.

In some instances, the controller 156 receives user-defined customization information indicating discrete states of operation for the accessory. For example, as mentioned above, based on satisfying one or more thresholds, the controller 156 generates and provides instructions to control the operation of the accessory.

Figure 27:
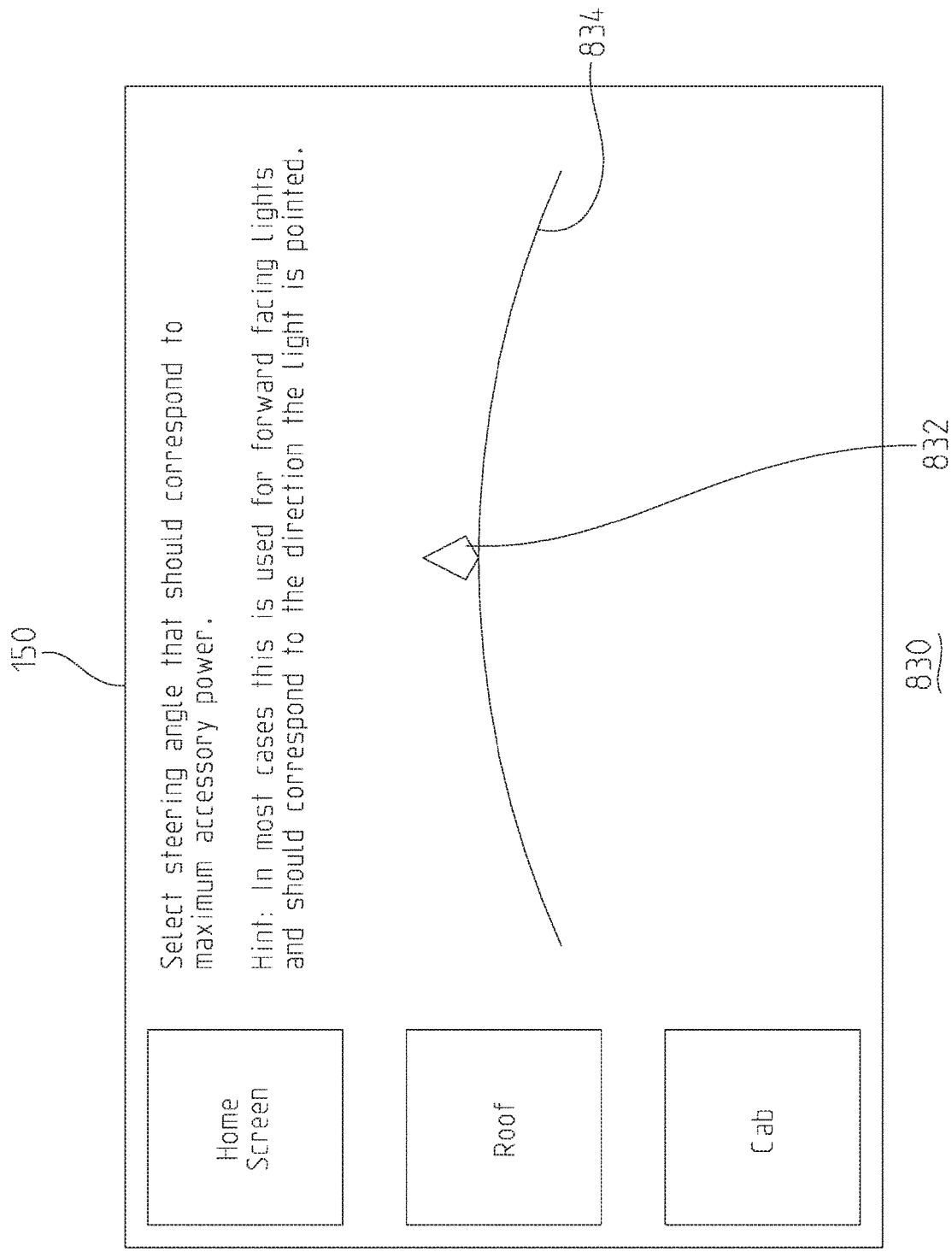
FIG. 27 illustrates the exemplary user interface of FIG. 16 displaying an eighth exemplary screen layout, such as a vehicle parameter customization screen for connected accessories.

In other instances, the controller 156 receives user-defined customization information indicating non-discrete states of operation for the accessory. A non-discrete state of operation is any state of operation where the controller 156 provides instructions to control the accessory without using thresholds. For example, based on the vehicle parameter, the controller 156 uses data representing an algorithm, function, and/or other processing sequence to control the operation of the accessory. In some instances, referring to FIG. 27, the controller 156 varies the maximum accessory power based on the steering angle. For instance, the user may use the user interface 150 displaying the image 830 to select the steering angle that relates to a maximum accessory power. The user interface 150 includes a slide bar 834 and allows the user to toggle (e.g., move or swipe) the cursor 832 from one side to the other. The slide bar 834 indicates various steering angles or positions for the vehicle 100.

In other words, after the user selects (e.g., moves the cursor 832) the steering angle, the user interface 150 provides user input indicating the steering angle to the controller 156. The controller 156 stores the user-defined customization information in memory. Further, referring to FIG. 26, the processing sequence 800 skips block 806, and moves from block 804 to 808. The controller 156 determines the current steering angle of the vehicle from the sensor information (e.g., from the steering sensor 306). The controller 156 uses data representing an algorithm or function to determine an amount of power to provide the accessory based on the user-defined customization information (e.g., the user-defined steering angle from the user interface 150) and the detected steering angle. The controller 156 generates a command indicating the amount of power to provide the accessory and provides the command to the controller 140. The controller 140 and/or another device (e.g., the accessory controller 210) executes the command and provides the indicated amount of power to the accessory. As such, in the non-discrete state, the controller 156 uses the user-defined customization parameters to provide varying controls of the accessory based on data representing a function or algorithm. The discrete and non-discrete customization and control of the accessories will be described below.

In some instances, processing sequence 800 is used to provide control to one or more accessories, such as light accessories connected to the vehicle, based on customization information (e.g., pre-programmed and/or user-defined customization information) and vehicle parameters. The light accessories can be any accessory that provides lighting, including, but not limited, to a light bar 202, 204, cube lights 206, rock lights, LED whips, work lights, rear lights, motorcycle puddle lights, and/or head/tail lights with turn signals.

In some examples, based on the customization information and a detected vehicle speed, the controller 156 generates and/or provides instructions indicating for a light accessory (e.g., a light bar, cube lights, rock lights, LED whips, work lights, rear lights, and/or head/tail lights with turn signals) to switch between a flood light and a spot light based on the detected vehicle speed. In other words, based on the vehicle speed exceeding a threshold, the controller 156 generates and/or provides an instruction to the accessory to change from a flood light to a spot light. The instruction may indicate for the accessory to turn on and/or off certain LED's within the accessory. Further, based on the vehicle speed being below the threshold, the controller 156 generates and/or provides an instruction to the accessory to change from the spot light to the flood light.

In other examples, the controller 156 generates and/or provides instructions for a light accessory (e.g., motorcycle puddle lights) to turn on or off based on the vehicle speed. For example, based on the vehicle speed exceeding a threshold, the controller 156 generates and/or provides instructions to turn on the motorcycle puddle lights. Based on the vehicle speed being below a threshold, the controller 156 generates and/or provides instructions to turn off the light accessory (e.g., the motorcycle puddle lights.

Additionally, and/or alternatively, based on detected vehicle speed, the controller 156 generates and/or provides instructions for a light accessory to vary the brightness/dimness of the light accessory. In other words, the controller 156 uses data representing an algorithm or function and the detected vehicle speed to determine a current to provide to the light accessory. The controller 156 generates and/or provides an instruction to the controller 140 and/or another device to provide the determined current for the light accessory. In some instances, the controller 156 uses one or more PWM characteristics to vary the brightness of the light accessory.

In some variations, based on the customization information and a detected engine speed (RPM), the controller 156 generates and/or provides instructions for a light accessory (e.g., a light bar, cube lights, rock lights, LED whips, work lights, and/or rear lights) to vary the brightness/dimness of the light accessory. In other words, the controller 156 uses data representing an algorithm or function and the detected engine speed to determine a current to provide to the light accessory. The controller 156 generates and/or provides an instruction to the controller 140 and/or another device to provide the determined current to the light accessory. In some instances, the controller 156 uses one or more PWM characteristics to vary the brightness of the light accessory.

Additionally, and/or alternatively, the controller 156 generates and/or provides instructions indicating for a light accessory (e.g., a LED whip) to light up certain sections based on the engine speed. In other words, based on the engine speed exceeding one or more thresholds, the controller 156 generates and/or provides an instruction to the light accessory to turn on and/or off certain LED's within the accessory.

In some examples, based on the customization information and a detected steering angle, position, or rate, or IMU measurement (e.g., yaw, pitch, roll rates, or lateral/longitudinal acceleration), the controller 156 generates and/or provides instructions indicating for a light accessory (e.g., a light bar, cube lights, rock lights, LED whips, work lights, and/or rear lights) to turn on or turn off. In other words, based on the steering angle, rate, or position exceeding or being below a threshold, the controller 156 generates and/or provides an instruction to the accessory and/or controller 140 to turn on or off the accessory. Additionally, and/or alternatively, the instruction may indicate for the accessory to turn on and/or off certain LED's within the accessory.

Additionally, and/or alternatively, based on detected steering angle, position, rate, or IMU measurement (e.g., yaw, pitch, roll rates, or lateral/longitudinal acceleration), the controller 156 generates and/or provides instructions for a light accessory to vary the brightness/dimness of the light accessory. In other words, the controller 156 uses data representing an algorithm or function and the detected vehicle speed to determine a current to provide to the light accessory. The controller 156 generates and/or provides an instruction to the controller 140 and/or another device to provide the determined current for the light accessory. In some instances, the controller 156 uses one or more PWM characteristics to vary the brightness of the light accessory.

In some instances, based on the customization information and a detected steering angle, position, or rate, the controller 156 generates and/or provides instructions indicating for a light accessory (e.g., head/tail lights with turn signals) to turn off the turn signals after the wheel has returned to a straight position. In other words, based on the steering angle satisfying a threshold, the controller 156 generates and/or provides an instruction to the light accessory to turn off the turn signals.

In some variations, based on the customization information and a detected electrical power supply voltage (e.g., electrical power supply SOC), the controller 156 generates and/or provides instructions for a light accessory (e.g., a light bar, cube lights, rock lights, LED whips, work lights, and/or rear lights) to vary the brightness/dimness of the light accessory. In other words, the controller 156 uses data representing an algorithm or function and the detected electrical power supply voltage to determine a current to provide to the light accessory. The controller 156 generates and/or provides an instruction to the controller 140 and/or another device to provide the determined current to the light accessory. In some instances, the controller 156 uses one or more PWM characteristics to vary the brightness of the light accessory. In some variations, the processing sequence 800 may be used in conjunction or as a replacement to processing sequence 700. For example, the controller 156 might not terminate power to the accessory (e.g., processing sequence 700) and alters (e.g., adjusts) the current provided to the accessory (e.g., processing sequence 800). In other instances, the controller 156 terminates power to the accessory based on a first threshold (e.g., processing sequence 700) and alters the current provided to the accessory based on one or more other thresholds (e.g., processing sequence 800).

In some examples, based on the customization information and a detected gear shift position, the controller 156 generates and/or provides instructions indicating for a light accessory (e.g., a light bar, cube lights, rock lights, LED whips, work lights, motorcycle puddle lights and/or rear lights) to turn on or turn off. In other words, based on the detected gear position, the controller 156 generates and/or provides an instruction to the accessory and/or controller 140 to turn on or off the accessory. Additionally, and/or alternatively, the instruction may indicate for the accessory to turn on and/or off certain LED's within the accessory. In some instances, if the accessory is a rear light, the controller 156 generates and/or provides instructions to turn on the rear light when the gear shift position is in reverse and turn off the rear light in other gear shift positions.

In some variations, based on detected IMU measurement (e.g., yaw, pitch, roll rates, or lateral/longitudinal acceleration), the controller 156 determines whether the vehicle is encountering an event, such as an airborne event, a turning/cornering event, an idling event, a hill sliding event, and/or a braking event. Based on the detected event, the controller 156 generates and/or provides instructions for a light accessory (e.g., a light bar, cube lights, rock lights, LED whips, work lights, and/or rear lights) to flash (e.g., repeatedly turn on/turn off), turn on, and/or turn off. In other words, based on the detected event, the controller 156 generates and/or provides an instruction to the accessory to turn on, turn off, and/or flash.

In some instances, based on the customization information and a detected engine boost level, the controller 156 generates and/or provides instructions for a light accessory (e.g., a light bar, cube lights, rock lights, LED whips, work lights, and/or rear lights) to vary the brightness/dimness of the light accessory. In other words, the controller 156 uses data representing an algorithm or function and the detected engine boost level to determine a current to provide to the light accessory. The controller 156 generates and/or provides an instruction to the controller 140 and/or another device to provide the determined current for the light accessory. In some instances, the controller 156 uses one or more PWM characteristics to vary the brightness of the light accessory.

In some instances, based on the customization information and a timer, the controller 156 generates and/or provides instructions for a light accessory (e.g., a light bar, cube lights, rock lights, LED whips, work lights, and/or rear lights) to flash on and off. In other words, based on a timer exceeding one or more threshold, the controller 156 generates and/or provides an instruction to the accessory to flash on and off.

Additionally, and/or alternatively, based on the customization information and a timer, the controller 156 generates and/or provides instructions for a light accessory (e.g., head/tail lights with turn signals) to turn on the hazard lights. In other words, based on a timer exceeding one or more threshold, the controller 156 generates and/or provides an instruction to the accessory to turn on the hazard lights.

In some examples, based on the customization information and a determined location of the vehicle 100 (e.g., a GPS location of the vehicle 100), the controller 156 generates and/or provides instructions indicating for a light accessory (e.g., a light bar, cube lights, rock lights, LED whips, work lights, rear lights, and/or head/tail lights with turn signals) to flash, turn on, or turn off. In other words, based on the determined GPS location, the controller 156 generates and/or provides an instruction to the accessory and/or controller 140 to flash, turn on, or off the accessory. Additionally, and/or alternatively, the instruction may indicate for the accessory to flash, turn on, and/or off certain LED's within the accessory. For instance, the controller 156 turns on the lights when in a first geographical location (e.g., a barn). The controller 156 flashes the lights when in a second geographical location (e.g., work yard or warehouse area).

In some examples, based on the customization information and a detected ambient light level, the controller 156 generates and/or provides instructions indicating for a light accessory (e.g., a light bar, cube lights, rock lights, LED whips, work lights, rear lights, motorcycle puddle lights, and/or head/tail lights with turn signals) to turn on or turn off. In other words, based on the detected ambient light level, the controller 156 generates and/or provides an instruction to the accessory and/or controller 140 to turn on or off the accessory. Additionally, and/or alternatively, the instruction may indicate for the accessory to turn on and/or off certain LED's within the accessory. In some instances, the controller 156 uses one or more PWM characteristics to turn on, turn off, and/or vary the brightness/dimness of the light accessory.

In some examples, the controller 156 provides accessory usage data (e.g., light accessory data) to a cloud computing server, such as cloud server 224. Additionally, and/or alternatively, the controller 156 receives location boundaries via a cloud server 224 (e.g., from a computing device, such as device 226). The controller 156 uses the location boundaries to control a light accessory, such as the head/tail lights with turn signals.

In some variations, based on the customization information and a detected battery voltage (e.g., battery SOC), the controller 156 generates and/or provides instructions to vary the volume output and/or maximum volume output of the speaker accessory. In other words, the controller 156 uses data representing an algorithm or function and the detected battery voltage to determine a current to provide to the speaker accessory. The controller 156 generates and/or provides an instruction to the controller 140 and/or another device to provide the determined current to the speaker accessory. In some instances, the controller 156 uses one or more PWM characteristics to vary the volume of the speaker accessory.

In some instances, processing sequence 800 is used to provide control to one or more accessories, such as mechanical attachment accessories connected to the vehicle, based on customization information (e.g., pre-programmed and/or user-defined customization information) and vehicle parameters. Mechanical attachment accessories are any accessory that is mechanically attached to the vehicle. Some examples of mechanical attachment accessories include, but are not limited to, a sprayer, a salt spreader, a plow, a winch, a power seat, a power window, and/or a motorcycle windshield.

In some examples, based on the customization information and/or the detected vehicle speed, the controller 156 generates and/or provides instructions to control an operation of a mechanical attachment accessory. In some instances, the controller 156 causes display of a prompt and/or image indicating a set amount of volume per area (e.g., gallons per acre) on a user interface 150. Then, the controller 156 generates and/or provides instructions to a sprayer to spray the liquid based on the vehicle speed. For example, for a faster the vehicle speed, the controller 156 may control the sprayer to spray more liquid.

In some variations, the controller 156 causes display of a prompt and/or image indicating a set amount of pounds of salt per square unit on a user interface 150. Then, the controller 156 generates and/or provides instructions to a salt spreader to apply more salt based on the vehicle speed. For example, for a faster the vehicle speed, the controller 156 may control the salt spreader to apply more salt.

In some examples, the controller 156 generates and/or provides instructions to a mechanical attachment accessory, such as a winch, to start reeling in as soon as the clutch engages. In some instances, the controller 156 generates and/or provides instructions to a mechanical attachment accessory, such as a motorcycle windshield, to raise and/or lower the windshield based on the vehicle speed.

In some variations, the controller 156 generates and/or provides instructions to a mechanical attachment, such as a plow, to adjust a plow angle to lighten the load of the plow based on the engine speed and/or a gear shift position (e.g., a low gear shift position). In some instances, the controller 156 generates and/or provides instructions to a mechanical attachment, such as a plow, to adjust the plow angle or height based on the steering angle, rate, and/or position.

In some examples, the controller 156 generates and/or provides instructions to a mechanical attachment, such as a sprayer, salt spreader, plow, and/or winch, to operate the mechanical attachment. Based on the detected electrical power supply voltage and the operation of the mechanical attachment, the controller 156 generates and/or causes display of a prompt alerting a user that the electrical power supply is being consumed too quickly. Additionally, and/or alternatively, the prompt includes recommended actions to remedy the situation.

In some instances, the controller 156 generates and/or provides instructions to a mechanical attachment, such as a plow, to raise the plow if the vehicle 100 is in a reverse gear shift position. If the gear shift position is high, the controller 156 generates and/or provides instructions to raise the plow to the highest location. If the gear shift position is low, the controller 156 generates and/or provides instructions to lower the plow and adjust to a preset angle.

In some examples, the controller 156 generates and/or provides instructions to operate a mechanical attachment, such as a winch. Based on an indication that the winch is out, the controller 156 generates and/or causes display of a prompt and/or image indicating a warning if the gear position is in high and the winch is out.

In some instances, the controller 156 determines a mechanical attachment, such as a sprayer and/or a salt spreader, is connected to the vehicle 100. Based on the connection, the controller 156 records the GPS location of the vehicle 100 during operation (e.g., as the vehicle 100 is being driven). Additionally, and/or alternatively, based on the GPS location of the vehicle 100, the controller 156 turns off the sprayer and/or the salt spreader. Additionally, and/or alternatively, based on the GPS location of the vehicle 100, the controller 156 generates and/or causes display of a prompt or image on the user interface 150 indicating a warning that the user is re-spraying an area. In some instances, the controller 156 provides data, such as the recorded area and/or other statistics using a heat map, to the cloud server 224.

In some examples, the controller 156 determines a mechanical attachment, such as a plow, is connected to the vehicle 100. Based on the connection, the controller 156 records the GPS location of the vehicle 100 during operation (e.g., as the vehicle 100 is being driven). Then, at another time, the controller 156 uses the recorded GPS locations of the vehicle 100 to autonomously plow the route by replaying the recorded route. In some instances, the controller 156 provides the logged area to a cloud server 224.

In some variations, the controller 156 determines a mechanical attachment, such as a winch, is connected to the vehicle 100. Based on the connection, the controller 156 records, using a GPS location of the vehicle 100, a location of a mud hole. The controller 156 provides the location of the mud hole to the cloud server 224.

User Input Customization for Accessories

Figure 28:
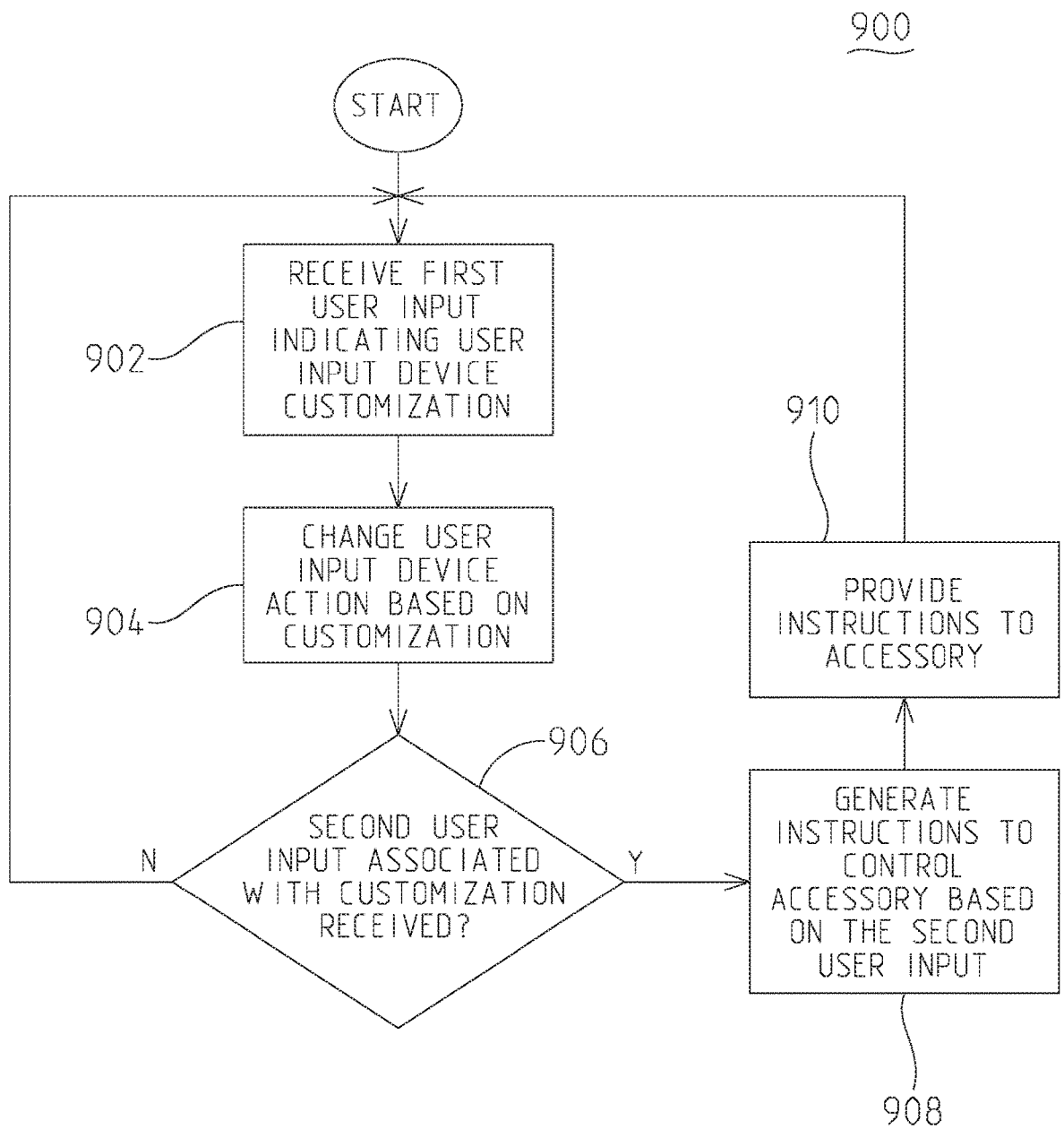
FIG. 28 illustrates an exemplary flowchart for controlling the one or more accessories using customizable user inputs.

FIG. 28 illustrates an example flowchart describing a processing sequence 900 for a controller (e.g., the user interface controller 156 and/or the accessory controller 140) to customize user input for one or more accessories.

Using processing sequence 900 permits a user to customize user input to customize accessories. For example, different users have different preferences, especially with the type and control of the accessories they connect to a vehicle, such as vehicle 100. By using processing sequence 900, the user is able to customize user inputs to control their accessories. For instance, a user may seek to have a hard button on the display or a frequency operated button (FOB) to turn on or off a first accessory, such as a light bar. However, when driving during the daytime, the user may seek to have the hard button or FOB be associated with another accessory, such as a winch. As such, processing sequence 900 permits the user the freedom to change the same user input selection to control different accessories.

In operation, as represented by block 902, the controller 156 receives first user input indicating user input device customization. For example, the user may use the user interface 150 to customize one or more user input devices 152. As mentioned above, exemplary input devices 152 include levers, buttons, switches, soft keys, selectors, knobs, FOBs, hard keys, and other suitable input devices. The user interface 150 may provide the information indicating the user customized user input devices 152 to the controller 156.

Figure 29:
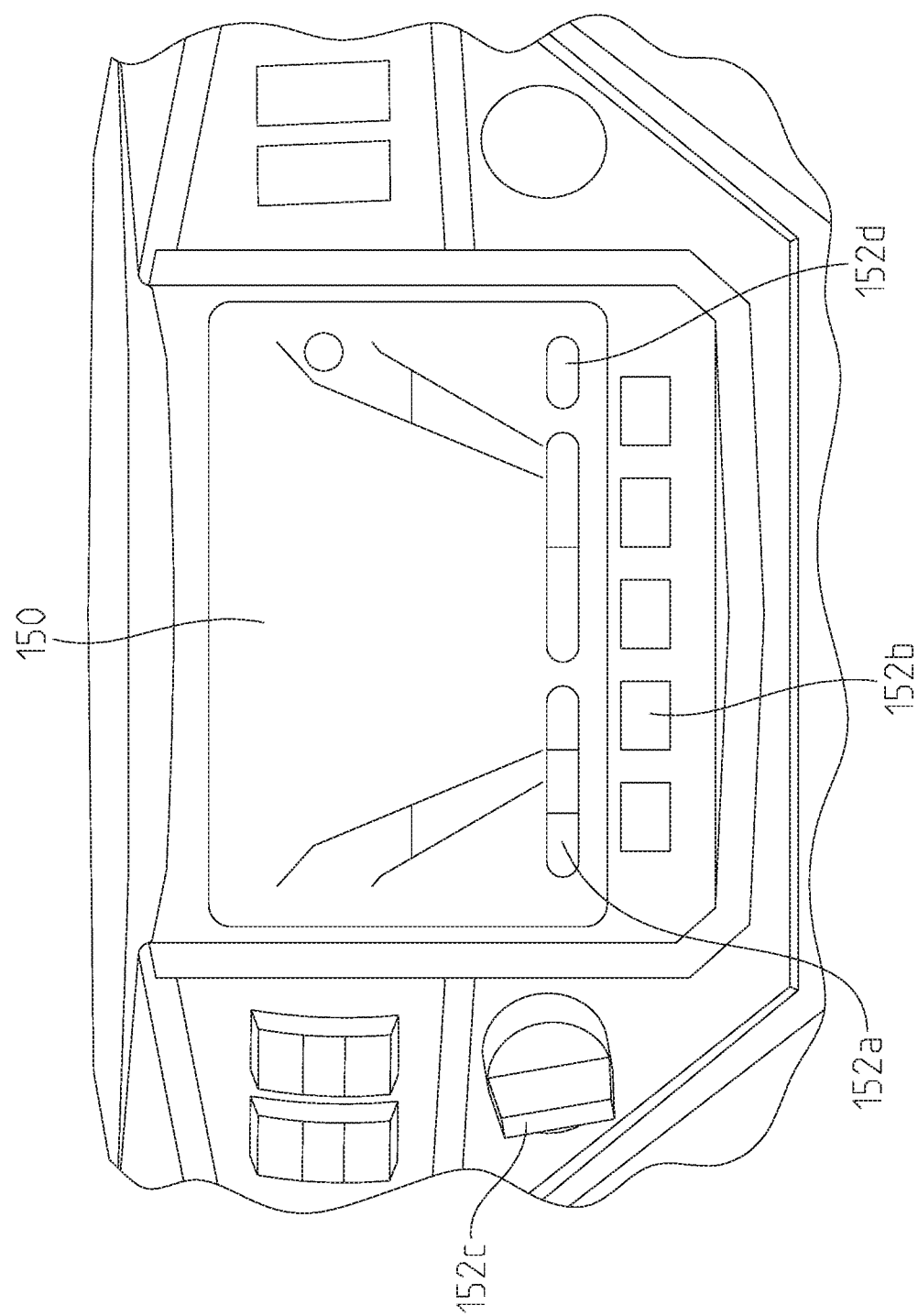
FIG. 29 illustrates exemplary user input devices.

FIG. 29 illustrates an exemplary user interface 150 with multiple different user input devices 152, and will be used to describe block 902. Exemplary user input devices 152 *a-d* are shown in FIG. 29. However, any number of other user input devices 152, including ones shown in FIG. 29 but not described, may also be customized by a user. The user input devices 152 may be soft keys (e.g., zones, buttons/interactive buttons, and/or other interactive features displayed on the user interface 150) and/or hard keys (e.g., buttons) located around the user interface 150 and/or otherwise on the vehicle 100). For example, as shown, user input devices 152*a* and 152*d* are soft keys or buttons displayed on the user interface 150. When a user selects a new screen or image, the soft keys may disappear from the user interface 150 and new soft keys may appear on the user interface 150. In other words, each image may have a separate set or group of soft keys that the user may customize. Further, user input device 152*b* is a hard key that is positioned directly below the user interface 150. Also, user input device 152*c* is a knob located to the left of the user interface 150.

Initially, the controller 156 may associate the user input devices 152 (e.g., a-d) with particular actions, such as turning off a light, display another screen, turn up or down the volume, etc. In other words, based on receiving a user input from a user input device 152, the controller 156 may determine, generate, and/or provide a command (e.g., action) associated with the user input device 152 to one or more devices, entities, components, and/or sub-systems in vehicle 100. The associated actions with the user input devices 152 may be stored as information in memory, such as memory 142 and/or 158.

As represented by block 904, the controller 156 changes the user input device 152 action based on the customization. For example, in response to receiving the first user input indicating the user input device customization, the controller 156 retrieves the information indicating the actions for the user input devices 152. Based on the user input device customization, the controller 156 changes the stored action to another action (e.g., a new user input device action). The new action may be associated with an accessory.

For example, initially, when a user presses (e.g., actuates) hard button 152*b*, the controller 156 may cause display of a music screen indicating the music currently being played by the vehicle 100. The controller 156 may receive a first user input indicating to customize the hard button 152*b* to turn on or off an accessory, such as the light bar accessory 202. The controller 156 may retrieve the information indicating the action for the user input device 152*b* (e.g., cause display of music screen on user interface 150). The controller 156 may change the action for the user input device 152*b* to turn on or off the accessory 202, and store the information back in memory (e.g., memory 142 and/or 158).

As represented by block 906, the controller 156 determines whether it has received a second user input associated with the customization. In other words, the controller 156 determines whether it has received a user input from the user input device that has been customized in blocks 902 and 904. For example, if the user input device 152*b* has been customized to turn on/off the accessory 202, the controller 156 determines whether it has received user input from the user input device 152*b*. If not, the processing sequence 900 moves back to block 902. Otherwise, the processing sequence 900 moves to block 908.

As represented by block 908, the controller 156 generates instructions to control an accessory based on the second user input. For example, the controller 156 generates an instruction to turn on or turn off the accessory 202.

As represented by block 910, the controller 156 provides the instruction to the accessory (e.g., the accessory controller 210 and/or the microcontroller 454 and the transceiver 452). For example, the controller 156 provides the instruction to turn on or off the accessory 202 to the accessory controller 210. The accessory controller 210 may turn on or off the accessory 202 based on the instruction. Then, processing sequence 900 may repeat. In another iteration, the user may decide to change the same user input device 152*b* and/or another user input device 152. For example, the user may seek to change user input device 152*b* again to activate the winch 208. As such, the controller 156 may retrieve the stored information, change the action for device 152*b*, and await a second user input for the 152*b*. In response to receiving it, the controller 156 may generate and/or provide instructions to activate the winch 208.

As mentioned previously, an accessory, such as accessory 202, communicates with the controller 140 and/or controller 156 via the wiring harness 450 using multiple different communication methods. For example, an accessory may communicate with the controller 140 using the PWM characteristics and/or a communication protocol, such as the CAN/J1939 communication protocol, the LIN communication protocol, and/or the communication protocols (e.g., LIN) over power lines. The controller 140 provides the generated instructions via the wiring harness 450 to the harness microcontroller 454 and/or the accessory controller (e.g., controller 210) using the communication protocols. Additionally, and/or alternatively, the controller 140 and/or 156 may communicate with the accessory via the network controller 180. For example, the network controller 180 may be operatively coupled to network components 182. The network components 182 may include a radio frequency transceiver (e.g., a WiFi, BLUETOOTH, and/or radio transceiver). The controller 140 and/or 156 may provide one or more commands via the network controller 180 and using the radio frequency transceiver.

In some examples, processing sequence 900 is used for input devices 152 that are knobs, such as knob 152c. For example, the user may seek to change knob 152c for heating, ventilation, and/or air conditioning (HVAC) systems. As such, the controller 156 may receive the first user input indicating a customization for knob 152c for a new application (e.g., controlling a different HVAC system). The controller 156 may change the knob 152c based on the new application and may generate/provide instructions in response to receiving user input from the knob 152c.

In some instances, processing sequence 900 is used to provide user input device customization for one or more accessories, such as light accessories connected to the vehicle 100. The light accessories can be any accessory that provides lighting, including, but not limited to, a light bar 202, 204, cube lights 206, rock lights, LED whips, work lights, rear lights, motorcycle puddle lights, and/or head/tail lights with turn signals.

In some variations, the controller 156 receives a first user input to map a light accessory (e.g., to a light bar, cube lights, rock lights, LED whips, work lights, rear lights, motorcycle puddle lights, and/or head/tail lights with turn signals) to a user input device 152, such as a hard button (e.g., hard button 152b). The controller 156 retrieves the information indicating an action the user input device 152 and changes it to turn on or turn off the light accessory. The controller 156 stores the new user input device action (e.g., turn on or off the accessory) in memory, such as memory 142 and/or 158. In response to actuation of the mapped user input device 152, the controller 156 generates and/or provides a command to the accessory to turn on or off the accessory.

In some instances, processing sequence 900 is used to provide user input device customization for one or more accessories, such as mechanical attachment accessories connected to the vehicle 100. Mechanical attachment accessories are any accessory that is mechanically attached to the vehicle. Some examples of mechanical attachment accessories include, but are not limited to, a sprayer, a salt spreader, a plow, a winch, and/or a motorcycle windshield.

In some variations, the controller 156 receives a first user input to map a mechanical attachment accessory (e.g., a sprayer, a salt spreader, a plow, a power seat, a power window, and/or a winch) to a user input device 152, such as a hard button (e.g., hard button 152b). The controller 156 retrieves the information indicating an action for the user input device 152 and changes it to turn on or turn off the mechanical attachment accessory. The controller 156 stores the new action (e.g., turn on or off the accessory) for the user input device in memory, such as memory 142 and/or 158. In response to actuation of the mapped user input device 152, the controller 156 generates and/or provides a command to the accessory to turn on or off the accessory.

In some instances, the controller 156 receives a first user input to map a mechanical attachment accessory (e.g., motorcycle windshield) to a user input device 152, such as a hard button (e.g., hard button 152b). The controller 156 retrieves the information indicating an action the user input device 152 and changes it to control the motion of the mechanical attachment accessory (e.g., move it up or down). The controller 156 stores the new user input device action (e.g., turn on or off the accessory) in memory, such as memory 142 and/or 158. In response to actuation of the mapped user input device 152, the controller 156 generates and/or provides a command to the accessory to turn on or off the accessory.

In some examples, the controller 156 determines a mechanical attachment, such as a power seat (e.g., a seat that includes forward and back control and/or back angle adjustment) and/or a power window (e.g., a window that can be controlled via an input), is connected to the vehicle 100. The controller 156 causes display of an accessory customization image on the user interface 150 for the power seat and/or window. The controller 156 may receive user inputs corresponding to presets for different users. Based on the user presets, the controller 156 may control the power seat and/or window accordingly. Additionally, and/or alternatively, the controller 156 may receive user inputs via the accessory customization image on the user interface 150 to set a temperature setting for the power seat. Additionally, and/or alternatively, the controller 156 may receive user inputs to move the power seat accessory forward and/or back. The controller 156 may provide one or more commands to implement the user inputs.

In some examples, the controller 156 uses the network controller 180 to communicate with and/or control one or more accessories operatively coupled to another vehicle. For example, the first recreational vehicle 100 may receive user input via the user interface 150. The user input may indicate for the first recreational vehicle 100 to control the accessories of another vehicle. For example, the user may seek to link audio from a first vehicle to a second vehicle, turn on one or more lights on the second vehicle, and/or activate a winch from the other vehicle. The first recreational vehicle 100 may use the network controller 180 to provide the user input to the second recreational vehicle via the network controller 180. The second recreational vehicle may control the connected accessories based on the received user input.

Additionally, and/or alternatively, a communication device, such as communication device 222, may provide one or more commands to an accessory operatively coupled to a vehicle, such as vehicle 100. For example, the communication device 222 may provide one or more commands to the vehicle 100 via the network controller 180. The controller 156 and/or 140 may receive the commands from the communication device 222. Based on the commands, the controller 156 and/or 140 may generate and/or provide one or more commands to control the accessory (e.g., turn on or off the accessory).

Figure 30:
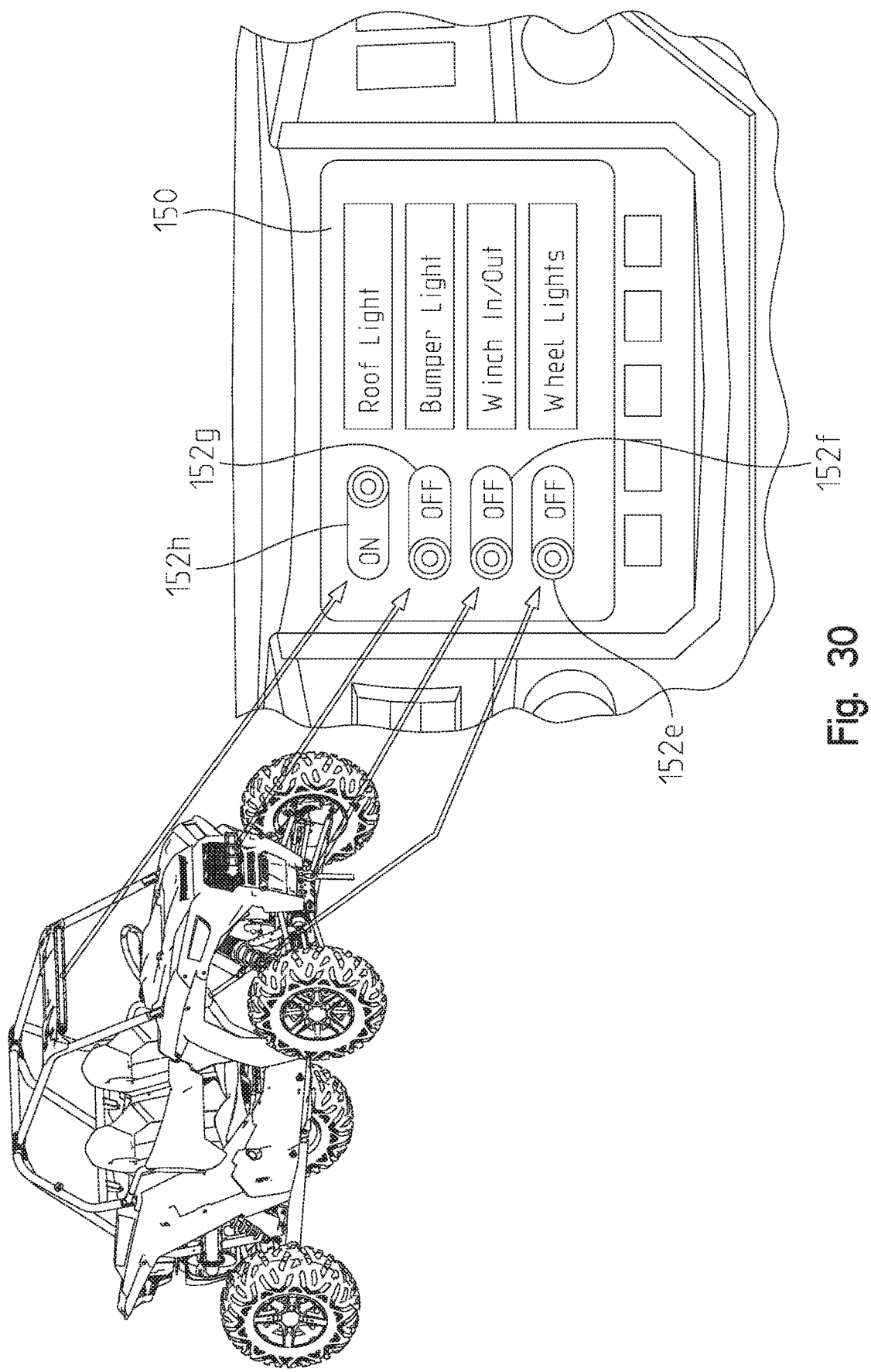
FIG. 30 illustrates additional exemplary user input devices on the exemplary user interface of FIG. 16.
Figure 31:
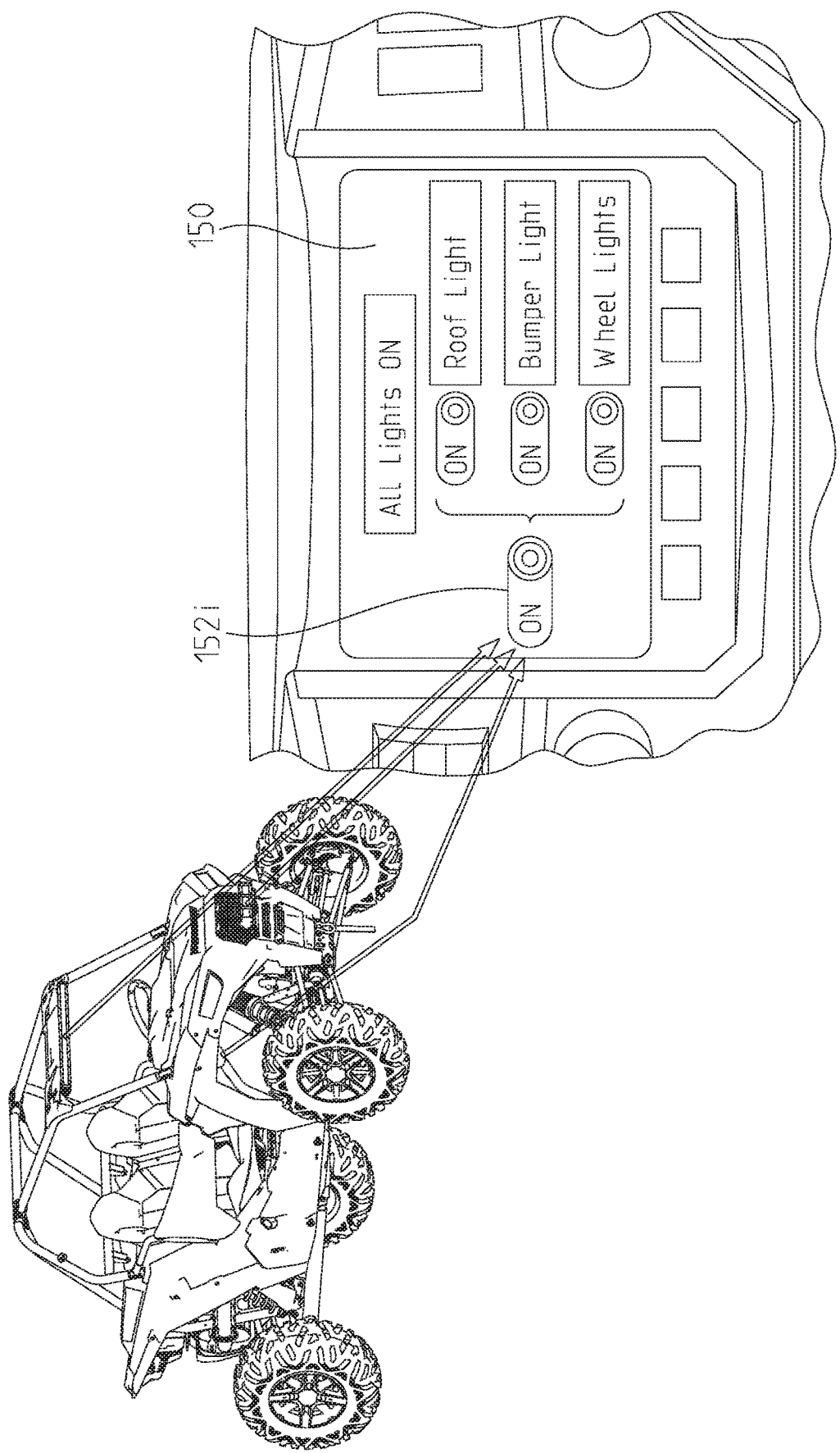
FIG. 31 illustrates additional exemplary user input devices on the exemplary user interface of FIG. 16.

In some instances, the controller 156 may change and/or associate one user input device 152 to multiple different accessories. For example, FIG. 30 illustrates four soft keys 152 e-h. The four soft keys 152 e-h may turn on or off different accessories. Using processing sequence 900, the controller 156 may associate two or more of the soft keys to a single soft key. For example, FIG. 31 illustrates another soft key 152i. When the user interacts with soft key 152i, the controller 156 may turn on or off three different accessories (e.g., the roof light, bumper light, and/or the wheel light).

In other words, the controller 156 may group multiple different user input devices (e.g., 152e, 152g, and 152h) controlling multiple accessories (e.g., roof light, bumper light, and/or wheel light) to respond to one user input device (e.g., 152i). As such, the user input device 152i may control the actions (e.g., turn on or turn off) of multiple accessories (e.g., roof light, bumper light, and/or wheel light).

Figure 32:
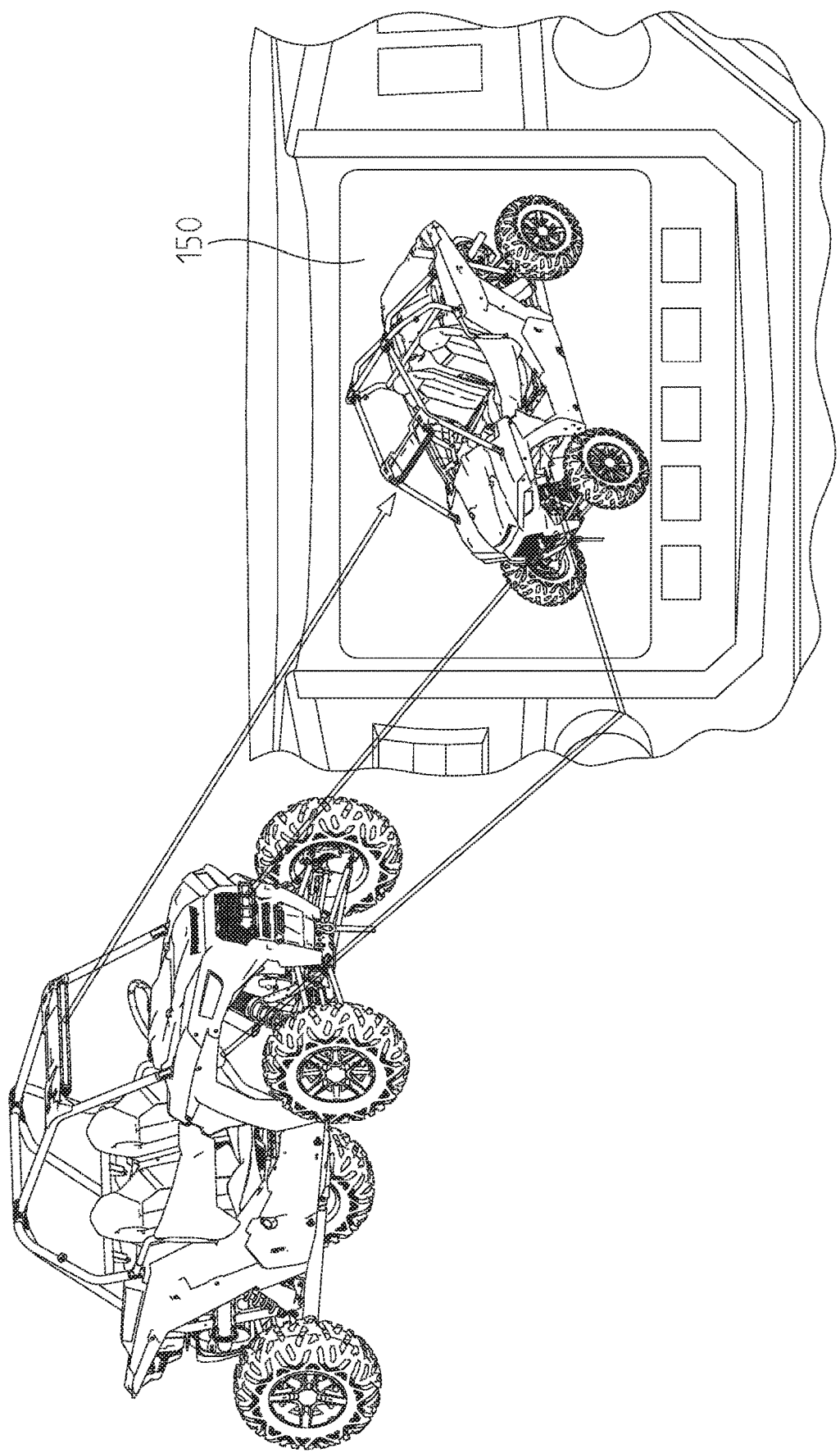
FIG. 32 illustrates additional exemplary user input devices on the exemplary user interface of FIG. 16.

Additionally, and/or alternatively, in response to connecting an accessory or a first user input, the controller 156 may provide control of the accessory via an image on the user interface 150. For example, FIG. 32 illustrates the vehicle 100 with three installed light accessories. Further, when the user interacts with the user interface 150 (e.g., presses a light on the user interface 150), the controller 156 receives the user input. Then, the controller 156 generates and/or provides a command to turn on or off the associated accessory (e.g., light).

In other words, an image of the vehicle 100 may be stored in memory, such as a frame buffer. The image may have associated buttons to turn on or off lights based on user interaction. In response to a light accessory being connected, the controller 156 may enable the buttons (e.g., enable user inaction with the interactive buttons) for the corresponding light accessory. The controller 156 may cause display of the image of the vehicle 100. In response to receiving user input indicating the light accessory from the user interface 150, the controller 156 may generate/provide a command to turn on the corresponding light accessory.

Figure 33:
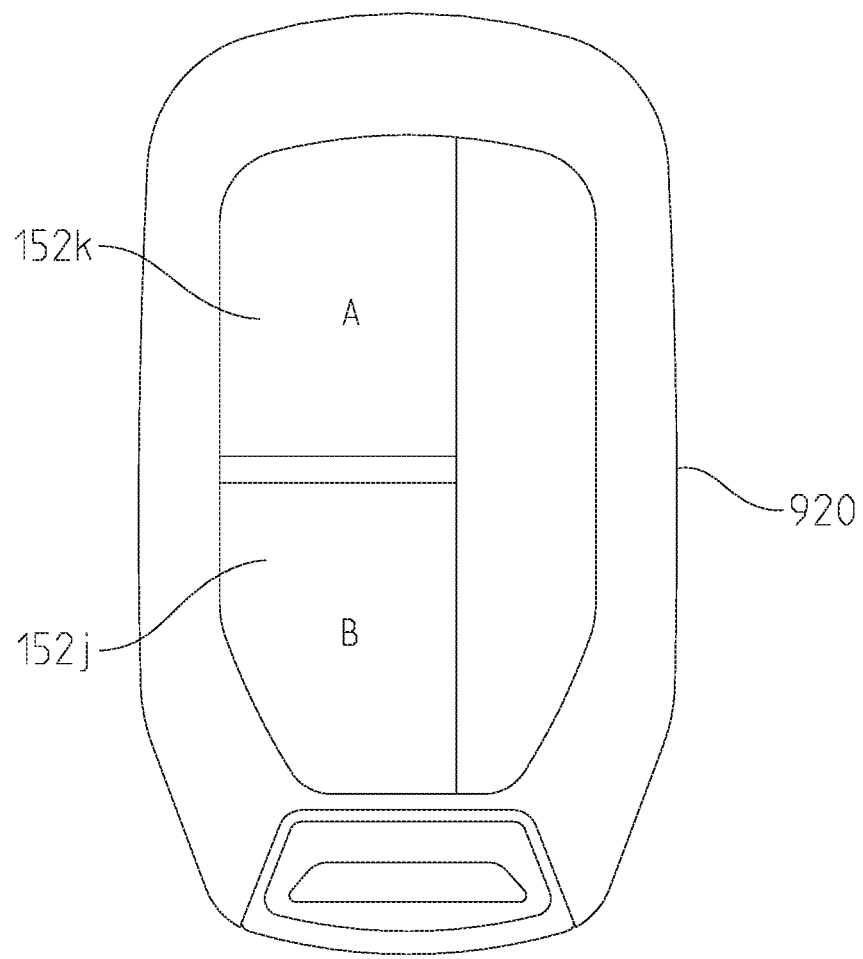
FIG. 33 illustrates an additional exemplary user input device, such as a vehicle key frequency operated button (FOB)

In some instances, the user may use the user interface 150 to customize buttons (e.g., user input devices) on a key FOB. For example, FIG. 33 illustrates a key FOB 920 with two buttons (e.g., user input devices 152*k* and 152*j*). The user may use the user interface 150 to program the buttons of the key FOB 920 to perform different actions. For example, as represented by block 902, the controller 902 may receive a first user input indicating a customization of the buttons 152*k, j* for the key FOB 920. As represented by block 904, the controller 156 may retrieve information indicating an action for the buttons 152*k, j* and change it based on the customization. For example, initially, the buttons 152*k, j* of the key FOB 920 may turn on or off a light accessory. The user may change the buttons 152*k, j* of the key FOB 920 to operate a winch. As represented by block 908 and 910, in response to detecting an actuation of a button (e.g., via the network controller 220), the controller 156 may generate and/or provide a command to the new accessory (e.g., turn on or off the winch). In other words, the network controller 180 may receive information indicating an activation of a button (e.g., 152*k, j*) from the key FOB 920. The controller 156 may receive the information indicating the activation. Then, based on the information, the controller 156 may generate and/or provide a command to the new accessory.

In some variations, the controller 156 may control an accessory using voice commands. For example, the vehicle 100 may be in communication with a communication device 222, such as a headset or a microphone array. The communication device 222 may provide a voice command to the network controller 220. The network controller 220 may provide the voice command to the controller 140 and/or the controller 156. The controller 156 and/or controller 140 may determine an action (e.g., command) from the voice command. Then, the controller 156 may generate and/or provide instructions to an accessory, such as accessory 202, based on the voice command.

Audio Tune Configuration Selection

Figure 34:
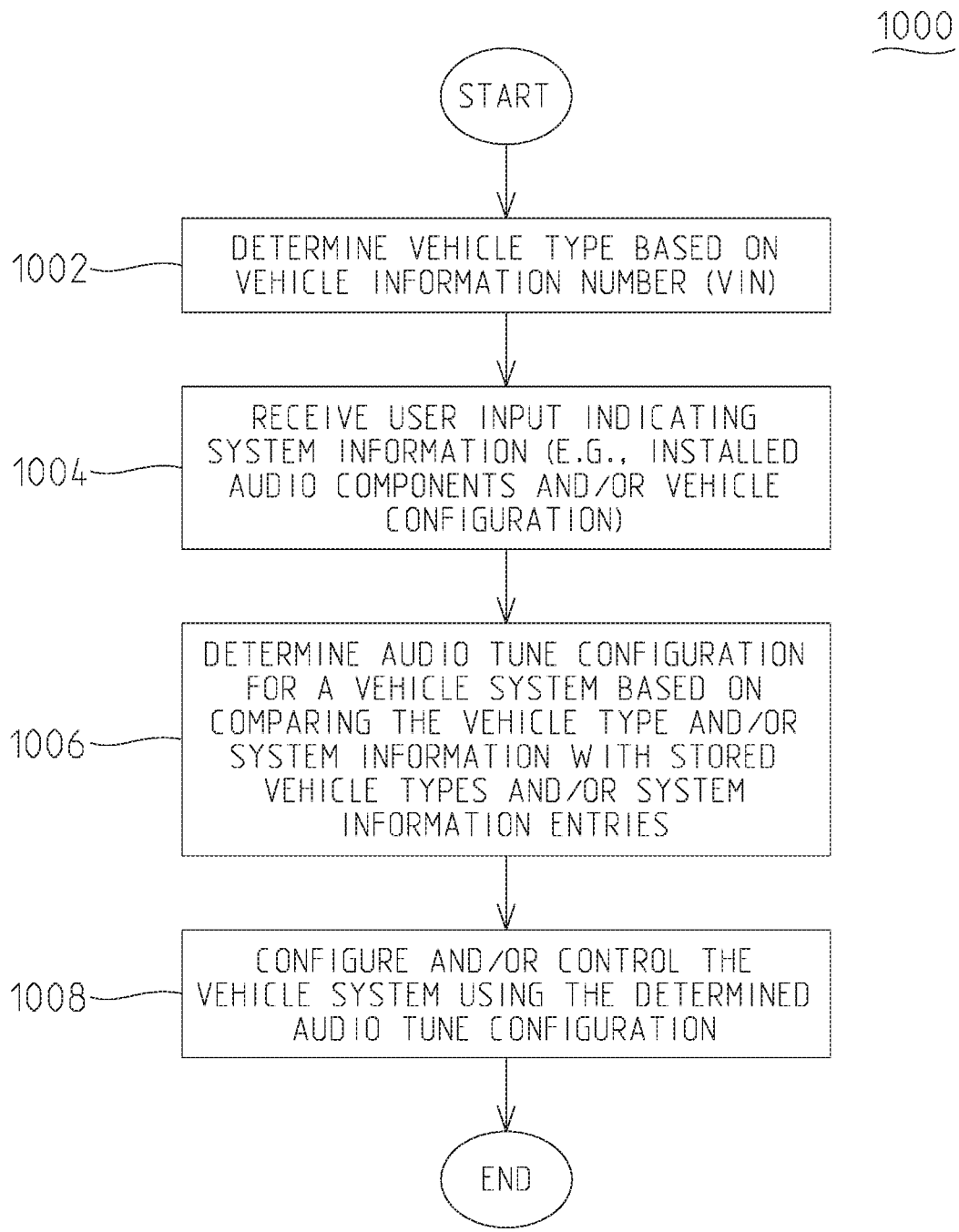
FIG. 34 illustrates an exemplary flowchart for optimizing one or more audio components.
Figure 35:
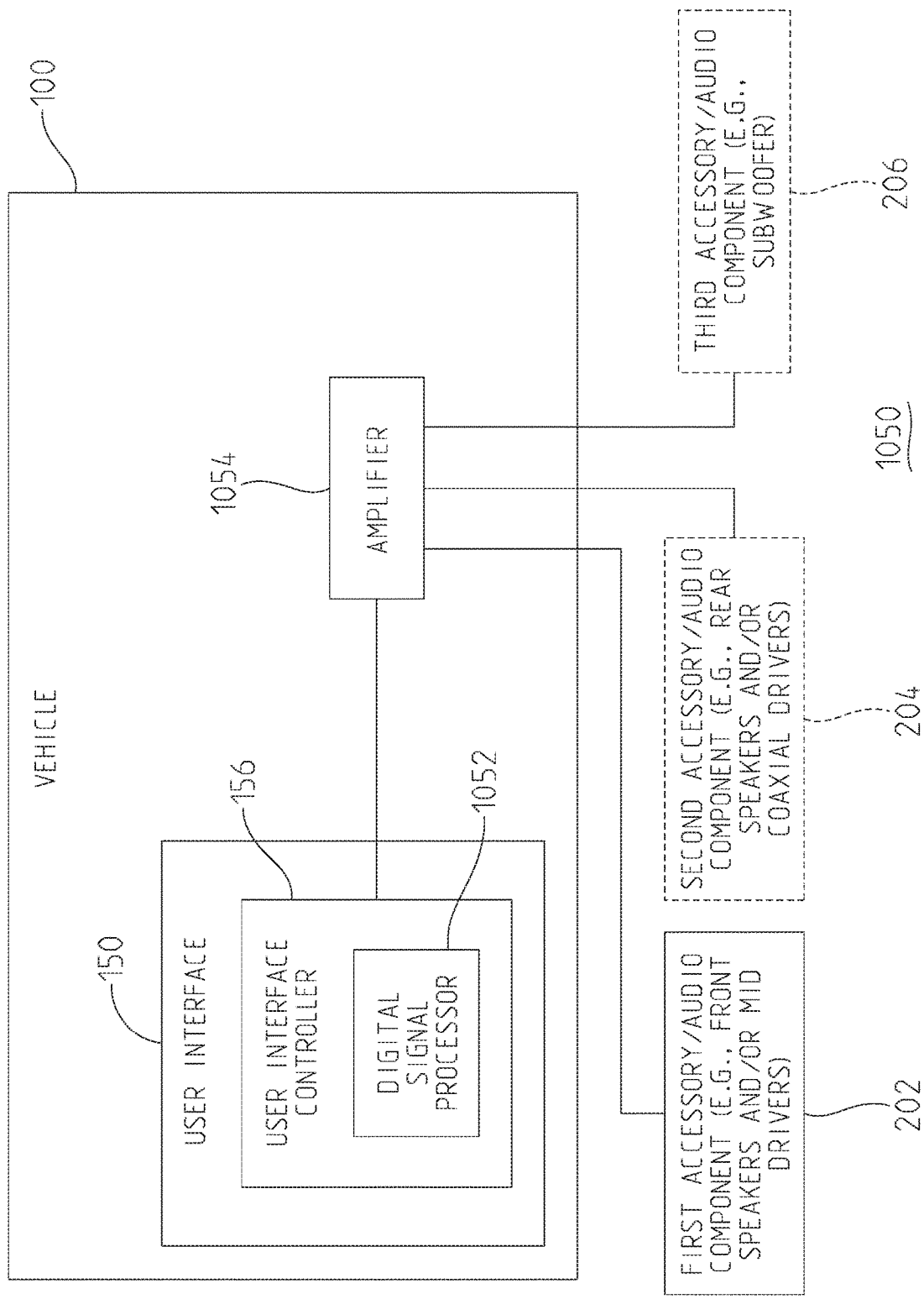
FIG. 35 illustrates another representative view of exemplary components of the vehicle of FIG. 1, including a vehicle controller.

FIG. 34 illustrates an example flowchart describing a processing sequence 1000 for a controller (e.g., the user interface controller 156 and/or the accessory controller 140) to configure one or more accessories, such as one or more audio components (e.g., speakers). Processing sequence 1000 will be described with reference to FIGS. 1, 3, and 35. FIG. 35 illustrates a vehicle system 1050 (e.g., a vehicle audio system) configured to optimize audio tune configurations for the audio components. In embodiments, vehicle system 1050 is a vehicle entertainment system. Exemplary vehicle entertainment systems include one or more of an audio output, a video output, and a tactile output. Exemplary vehicle entertainment systems further include one or more features of an audio system, a display system (video and/or still image), and/or tactile system which may be enabled, disabled, or otherwise adjusted.

The user interface controller 156 includes the digital signal processor 1052. The digital signal processor 1052 may be any type of digital signal processor that is used for digital signal processing of audio signals as known in the art (e.g., processing analog and digital signals). The user interface controller 156 may provide signals and/or commands to configure/control the digital signal processor 1052 to optimize the audio tune configurations, which will be explained below.

As shown, the user interface controller 156 includes the digital signal processor 1052. In some examples, the digital signal processor 1052 is located and/or positioned within another part of the vehicle 100 such as within the accessory controller 140 and/or as a separate component. In yet other examples, the digital signal processor 1052 is within an accessory, such as an audio component 202, 204, and/or 206. For example, each audio component 202, 204, 206 includes the digital signal processor 1052.

The amplifier 1054 may be any type of amplifier that is used for amplifying the audio signal (e.g., increasing/decreasing the gain of the audio signal at various frequency settings) as known in the art. The user interface controller 156 may provide signals and/or commands to configure/control the amplifier 1054 to optimize the audio tune configurations, which will be explained below As shown in FIG. 35, the amplifier 1054 is a separate component within the vehicle 100 and operatively coupled to the user interface controller 156, which includes the digital signal processor 1052. In other examples, the amplifier 1054 is located and/or positioned within another part of the vehicle 100 such as within a controller (e.g., the accessory controller 140 and/or the user interface controller 156). In yet other examples, the amplifier 1054 is within an accessory, such as an audio component 202, 204, and/or 206. For example, each audio component 202, 204, 206 includes the digital signal processor 1052 and the amplifier 1054. In yet other examples, the functionalities of the amplifier 1054 are included in the digital signal processor 1052. In other words, a single device such as a smart amplifier is configured to perform the functionalities of both the digital signal processor 1052 and the amplifier 1054.

The accessories/audio components 202, 204, and/or 206 may be any type of audio component that is used for outputting sound. For example, as shown in FIG. 35, the audio component 202 may be the front right and left speakers and/or mid drivers. The audio component 204 may be the rear right and left speakers and/or coaxial drivers. The audio component 206 may be a subwoofer. Additional exemplary accessories/audio components include devices or systems for altering sound level or sound quality.

In some instances, one or more audio components may be optional. For example, the user interface controller 156 may configure components of the vehicle system 1050 based on the audio components installed on the vehicle 100. For instance, the user interface controller 156 may provide different audio configurations based on whether the vehicle has an installed subwoofer 206. Additionally, and/or alternatively, the user interface controller 156 may provide different audio configurations based on whether the vehicle 100 includes only front speakers 202, front speakers 202 and rear speakers 204, or only rear speakers 204.

The user interface controller 156 uses processing sequence 1000 to configure audio tune configurations for the vehicle system 1050 (e.g., the digital signal processor 1052). Audio tune configurations are digital signal processor and/or amplifier settings that are used to improve the audio quality within the vehicle. In some examples, the audio tune configurations include settings to reduce the distortion of the audio signal based on vehicle characteristics (e.g., engine speed from the engine speed sensor 304 and/or a gear position from the gear position sensor 310). Additionally, and/or alternatively, the audio tune configurations include settings to adjust the phasing or delay of the audio signal for one or more audio components to "place" the music in the desired locations such as at a user's location. For example, the driver's seat may be closer to the front left audio component 202 rather than the front right audio component 202. The user interface controller 156 may configure the digital signal processor 1052 to adjust the phase and/or delay of the audio signal such that the front left audio component 202 provides the audio signal slightly delayed compared to the front right audio component 202. By adjusting the phasing/delay, the audio signal may reach the user sitting in the driver's seat at substantially the same time. Additionally, and/or alternatively, the audio tune configurations include settings to optimize the frequency response by adjusting gain settings at different frequency bands (e.g., equalizer (EQ) bands) and/or increase the number of EQ bands.

For example, the user interface controller 156 may determine a preferred audio tune configuration based on the audio components installed. For instance, the user interface controller 156 may select a first audio tune configuration if the vehicle 100 has only two front audio components 202 (e.g., front right and front left speakers). If the vehicle 100 has the two front audio components 202 and two rear audio components (e.g., rear right and rear left speakers), the user interface controller 156 may select a different or second audio tune configuration. If the vehicle 100 includes a specialized audio component, such as the subwoofer 206, the user interface controller 156 may select a third audio tune configuration. In other words, the sound quality of the audio components may be improved based on the components installed within the vehicle system 1050. For example, if the vehicle 100 includes a subwoofer 206, the user interface controller 156 may adjust the gain settings for the lower frequencies differently than if the vehicle 100 does not include a subwoofer 206. This will cause an increase the sound quality for vehicles 100 with a subwoofer 206 and vehicles 100 without a subwoofer 206.

Additionally, and/or alternatively, the configuration of the vehicle 100 may also impact the sound quality. For example, vehicles 100 with different types of vehicle attachments/enclosure attachments (e.g., cabins (cabs)) may use different audio tune configurations. Vehicle/enclosure attachments or vehicle cabs include, but are not limited to, roofs, tops, half doors, full doors, windows, windshields, rear windshields, partitions, and/or other vehicle enclosure attachments. In other words, the sound quality may differ depending on the vehicle configuration, such as if the vehicle includes windows, roofs, tops, seats, and so on. Thus, depending on the vehicle configuration, the controller, such as the user interface controller 156, may determine a different preferred audio tune for the vehicle 100. Furthermore, the vehicle configuration may also include the seat configuration/number of seats (e.g., the vehicle includes only a single row or multiple rows). In embodiments, the user interface controller 156 may determine the preferred audio tune configuration based on the seat configuration. In some instances, the user interface controller 156 may receive user input indicating the seat configuration and/or occupancy (e.g., whether a user is sitting in the seat). In other instances, the user interface controller 156 may receive information or feedback from one or more sensors indicating the seat configuration and/or occupancy. For example, the vehicle 100 may include one or more seat sensors that are configured to provide feedback to a controller such as the user interface controller 156 in response to detecting that a user is occupying the seat.

Additionally, and/or alternatively, for different vehicle types (e.g., determined using vehicle information such as a vehicle identification number (VIN) and/or a vehicle configuration memory object), the user interface controller 156 may determine a different preferred audio tune for the vehicle 100. For example, the user interface controller 156 may determine a different preferred audio tune depending on whether the vehicle 100 is a utility vehicle, a sport vehicle, a cross-over vehicle, and so on. Different types of vehicles 100 are described above in relation to FIGS. 5-10.

In some variations, the user interface controller 156 may cause display of a prompt on the display (e.g., output device 154) indicating the user to select the audio configuration before audio channels (e.g., audio components) are enabled. This will allow for a means of adapting the audio tune configuration to the preferred audio tune configuration based on consumer selection. If the user does not enable the audio component (e.g., subwoofer 206), the audio component will not output any audio. In other words, processing sequence 1000 allows the user to acknowledge the installed audio components on the display, which will permit more control to the user in configuring and/or altering the audio system/components installed on their vehicle 100. This will allow for the audio system to change tunes based on installed audio components, and thus optimize the tune for the particular vehicle 100 and installed audio configuration. Furthermore, this will be used when modifying the vehicle system 1050 from the original equipment manufacturer (OEM) configuration—i.e. expanding the system 1050 by adding components.

In operation, at block 1002, the user interface controller 156 determines a vehicle type based on the vehicle information number (VIN). The VIN may be number associated with a type of vehicle and/or assigned to each individual vehicle. For example, the VIN may be a serial number with a certain amount of digits in the serial number indicating a type of vehicle (e.g., the first four digits of the VIN indicates a particular vehicle). The user interface controller 156 receives the VIN (e.g., via user input and/or a bus such as the CAN bus described above), and uses the VIN to determine the vehicle type. In some variations, a vehicle configuration object (e.g., data) may be stored in memory such as user interface memory 158 and/or vehicle memory 142. A vehicle configuration object may be a variable, data structure, function, method, and/or another other type of data that is used to define the configuration of the vehicle 100. The user interface controller 156 may retrieve the vehicle configuration object from the memory and use it to determine the vehicle type and/or the vehicle configuration.

Additionally, and/or alternatively, the user interface controller 156 may use other information such as user input to determine the vehicle type. Additionally, and/or alternatively, the user interface controller 156 may determine another type of vehicle configuration such as whether the vehicle 100 has one row of seats or multiple rows of seats.

At block 1004, the user interface controller 156 receives user input indicating system information (e.g., installed audio components and/or vehicle configuration). For example, the user interface controller 156 causes display of a prompt, screen, and/or graphical user interface (GUI) using the user interface 150 (e.g., the output devices 154). The prompt, screen, and/or GUI indicates for the user to indicate installed audio components (e.g., front right speaker, front left speaker, rear right speaker, rear left speaker, and/or subwoofer).

Figure 36:
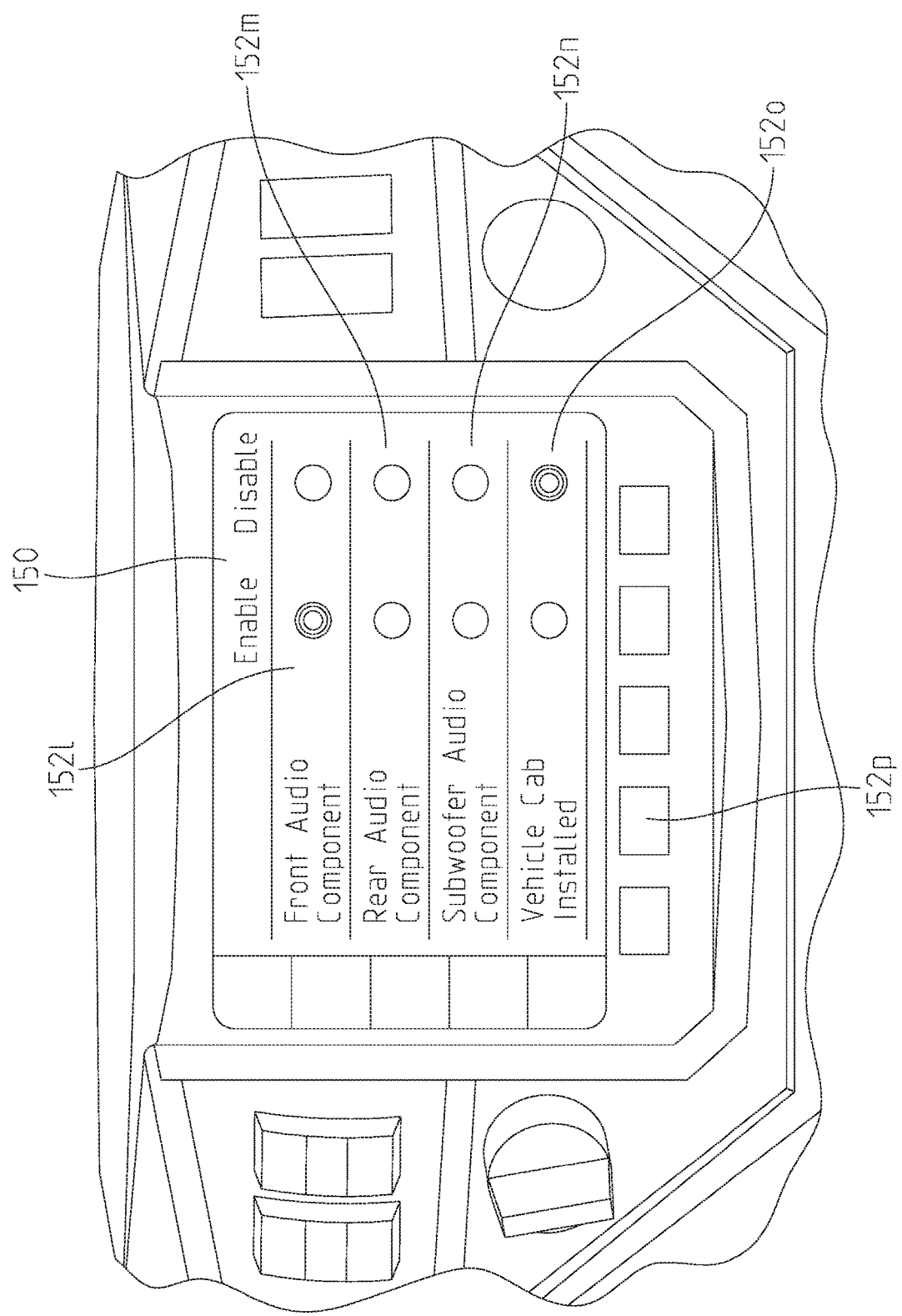
FIG. 36 illustrates exemplary user input devices used to optimize the one or more audio components.

FIG. 36 shows an exemplary user interface 150 with multiple different user input devices 152 that may be used to optimize the audio tune configurations. For example, the exemplary user input devices 152L-152P are used to indicate which audio components have been installed within the vehicle system 1050 and/or the vehicle configuration. However, any number of other user input devices 152, including ones shown in FIG. 36 but not described, may also be used by the user to indicate installed audio components and/or vehicle configuration. The user input devices 152L-152P may be soft keys (e.g., zones, buttons/interactive buttons, and/or other interactive features displayed on the user interface 150) and/or hard keys (e.g., buttons) located around the user interface 150 and/or otherwise on the vehicle 100). For example, as shown, the user input devices 152L-152O are soft keys or buttons displayed on the user interface 150 and user input device 152P is a hard button adjacent the user interface 150.

In response to causing display of the prompt, the user interface controller 156 receives user input indicating system information such as accessories (e.g., speakers) installed on the vehicle 100 and/or the vehicle configuration information. For example, the user may use the input devices 152L-O to indicate whether a front audio component 202 is installed (e.g., enabled or disabled), a rear audio component 204 is installed, a subwoofer audio component is installed, and/or a vehicle configuration (e.g., whether the one or more enclosure attachments are installed). In other words, the user may install one or more accessories such as audio components (e.g., subwoofers, front left/right speakers, and/or rear left/right speakers) and/or change one or more vehicle configurations. After, the user may use the user interface 150 indicate the installed audio components and/or vehicle configurations.

In some variations, the user interface controller 156 may determine the system information (e.g., the installed audio components and/or the vehicle configuration) without using user input. For example, the audio components 202, 204, 206 may automatically provide feedback to the user interface controller 156 after the user installs the audio components.

In some instances, the user interface controller 156 may use other information such as an RFID tag to determine the vehicle type and/or system information. For example, as describe above and referring to FIG. 13, a user may use a communication device 222 with an RFID scanner 456 to scan RFID tags for one or more accessories 202, 204, and/or 206. The communication device 222 may provide the scanned RFID tags to the user interface controller 156. Based on the scanned RFID tags, the user interface controller 156 may determine the system information (e.g., the audio components installed on the vehicle 100).

At block 1006, the user interface controller 156 determines an audio tune configuration for the vehicle system 1050 based on comparing the vehicle type and/or the system information with stored vehicle types and/or stored system information entries (e.g., entries indicating a particular vehicle configuration and/or a particular audio component configuration installed within the vehicle system 1050). For example, a plurality of audio tune configuration entries for each of the different vehicle types and/or different system information entries may be stored in memory such as user interface memory 158 and/or vehicle memory 142. Each audio tune configuration entry may be associated with a particular vehicle type, a particular vehicle configuration, and/or different types of audio components installed within the vehicle system 1050.

For example, referring to FIG. 36, the user may use user interface 150 to indicate that the front audio components 202 is installed, but the rear audio components 204 and the subwoofer audio component 206 is not installed. Furthermore, the user may indicate that the one or more enclosure attachments (e.g., vehicle cab) is not present. The user interface controller 156 may retrieve the audio tune configuration entry based on the vehicle configuration (e.g., cab is disabled) and the installed audio components (e.g., only the front audio components 202 are installed). If the cab is enabled and/or different audio components are installed (e.g., the subwoofer 206 is installed as well as the front audio components 202), the user interface controller 156 may retrieve a different audio tune configuration. Additionally, and/or alternatively, for each type of vehicle (e.g., utility, sport, comfort, snowmobile, and so on), the memory such as user interface memory 158 and/or vehicle memory 142 may store different audio tune configuration entries. The user interface controller 156 may select from the different audio tune configuration entries based on the type of vehicle 100 and the system information.

In some examples, block 1002 may be optional. In other words, the user interface controller 156 may determine the audio tune configuration based on either the determined vehicle type or the system information.

At block 1008, the user interface controller 156 configures, controls, and/or optimizes a vehicle system 1050 using the determined audio tune configuration from block 1006. As mentioned above, audio tune configurations are digital signal processor settings (e.g., distortion settings, phasing/delay settings, and/or frequency response settings) that are used to improve the sound quality within the vehicle. Based on the audio tune configuration, the user interface controller 156 provides one or more signals or commands to the digital signal processor 1052 and/or the amplifier 1054 to adjust the audio signals for distortion settings, phase/delay settings, and/or frequency response settings. For example, using the audio tune configuration, the user interface controller 156 may provide signals/commands to the digital signal processor 1052 to reduce the distortion of the audio signals being processed by the digital signal processor 1052.

In other words, the user interface controller 156 may store the determined audio tune configuration in a memory location such as user interface memory 158 and/or vehicle memory 142. The digital signal processor 1052 may use the determined audio tune configuration that is stored in the memory location to configure the audio tunes for the vehicle system 1050.

Additionally, and/or alternatively, using the audio tune configuration, the user interface controller 156 may provide signals/commands (e.g., configuration settings) to the digital signal processor 1052 to adjust the phase/delay settings of the audio components 202, 204, and/or 206. For example, the audio tune configuration may indicate a particular time delay/phase delay for each of the installed audio components 202, 204, and/or 206. For instance, audio tune configuration may indicate that the left speaker of the audio component 202 has a slight time delay compared to the right speaker of the audio component 202. Similarly, there may be a time delay between the front audio components 202 and the rear audio components 204.

Additionally, and/or alternatively, using the audio tune configuration, the user interface controller 156 may provide signals/commands to the digital signal processor 1052 to adjust the gain of the frequency settings of the audio components 202, 204, and/or 206. For example, the audio tune configuration may indicate gains at different frequency/EQ settings or bands. The user interface controller 156 may set the gains for the different frequency/EQ settings or bands based on the determined audio tune configuration from block 1006. Additionally, and/or alternatively, the audio tune configuration may indicate the number of frequency/EQ settings or bands available to adjustment.

In some instances, the user may adjust one or more of the audio tune configurations using the user interface 150. For example, the user interface controller 156 may cause display of a screen to adjust one or more of the audio tune configurations (e.g., distortion settings, phasing/delay settings, and/or frequency response settings). In response, the user may select one or more options on the screen, such as adjusting the gain at a frequency setting. Based on user input, the user interface controller 156 may adjust the audio tune configuration (e.g., adjusting the gain at the frequency setting).

In some examples, the audio tune configuration may indicate noise reduction based on the vehicle profile (e.g., vehicle type) and/or vehicle characteristics. For example, different types of vehicles 100 may have different wind noise, engine noise, and/or air intake noise. Based on the determined type of vehicle 100, the user interface controller 156 may select/retrieve a different audio tune configuration indicating the noise reduction settings from memory. Based on the audio tune configuration, the user interface controller 156 may configure the vehicle system 1050 (e.g., the digital signal processor 1052 and/or the amplifier 1054) to apply the noise reduction for the type of vehicle 100. Furthermore, based on the vehicle characteristics (e.g., engine speed from the engine speed sensor 304, vehicle speed from the vehicle speed sensor 302, and/or an accelerator pedal position from a sensor that detects the accelerator pedal position), the user interface controller 156 may apply different levels of noise reduction.

In some variations, the user interface controller 156 may repeat the processing sequence 1000 one or more times. For example, if the user installs a new audio component, such as a subwoofer 206. The user may use the user interface 150 to indicate that the new audio component has been installed. Then, the user interface controller 156 may determine a new audio configuration based on the new audio component. After, the user interface controller 156 may configure the vehicle system 1050 based on the new audio configuration.

In some examples, the user interface controller 156 may control the vehicle system 1050 (e.g., the audio components 202, 204, 206, and/or the digital signal processor 1052) based on one or more vehicle characteristics. For example, after configuring and/or controlling the vehicle system 1050 using the determined audio tune configurations, the user interface controller 156 may monitor one or more vehicle characteristics and adjust one or more audio tune configurations based on the vehicle characteristics. For instance, based on a speed (e.g., vehicle speed from the vehicle speed sensor 302 and/or engine speed based on the engine speed sensor 304), the user interface controller 156 may adjust the volume for one or more of the audio components 202, 204, and/or 206.

In some examples, based on a speed (e.g., vehicle speed and/or engine speed), the user interface controller 156 may adjust one or more pre-set frequency bands/EQ settings. For example, based on the vehicle speed from the vehicle speed sensor 302, the user interface controller 156 may attenuate (e.g., lower) and/or accentuate (e.g., increase) gains for different frequency bands. For instance, as the vehicle speed increases, the user interface controller 156 may attenuate the gains for the lower frequency bands and accentuate gains for the higher frequency bands.

Light Device Control Using Vehicle Characteristics

Figure 37:
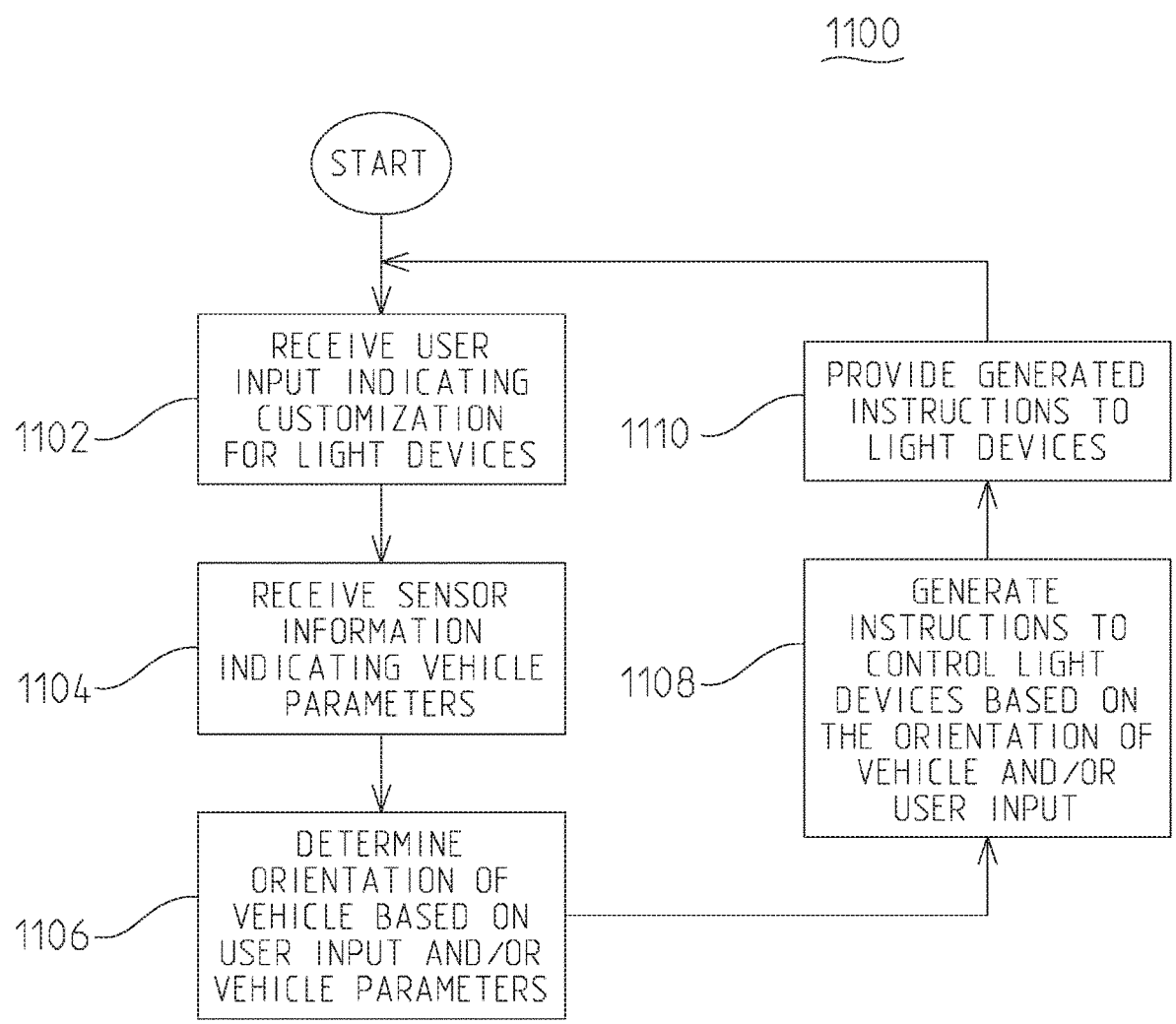
FIG. 37 illustrates another exemplary flowchart for controlling the one or more light devices using detected vehicle parameters and/or user input.
Figure 38:
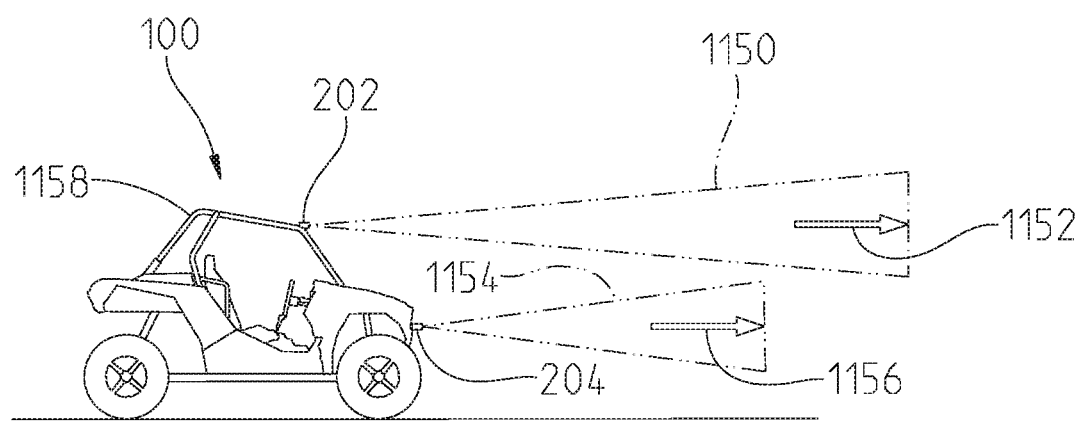
FIG. 38 illustrates controlling one or more light devices based on an exemplary vehicle traveling across flat ground.
Figure 39:
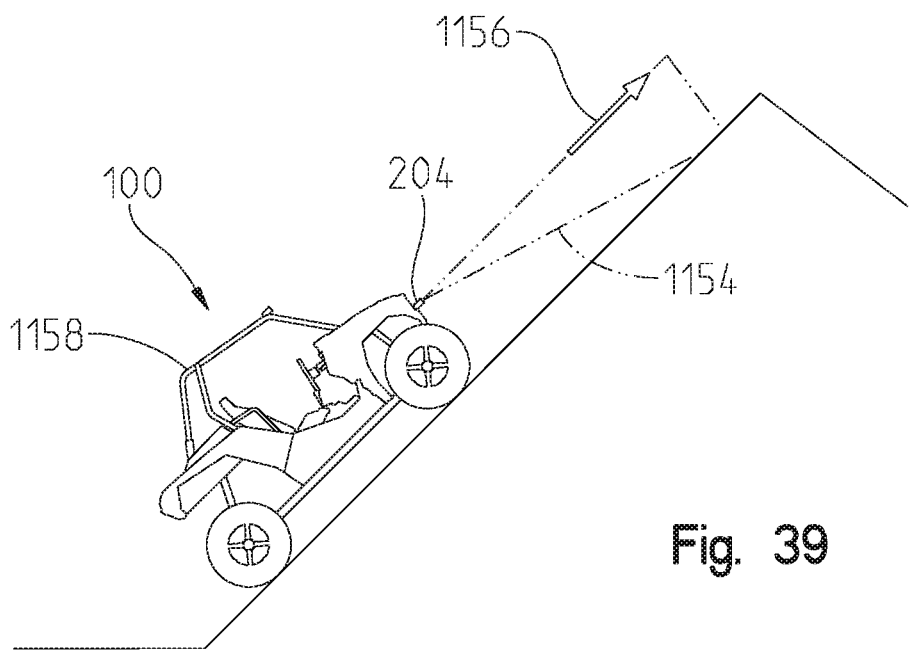
FIG. 39 illustrates controlling one or more light devices based on an exemplary vehicle traveling uphill.
Figure 40:
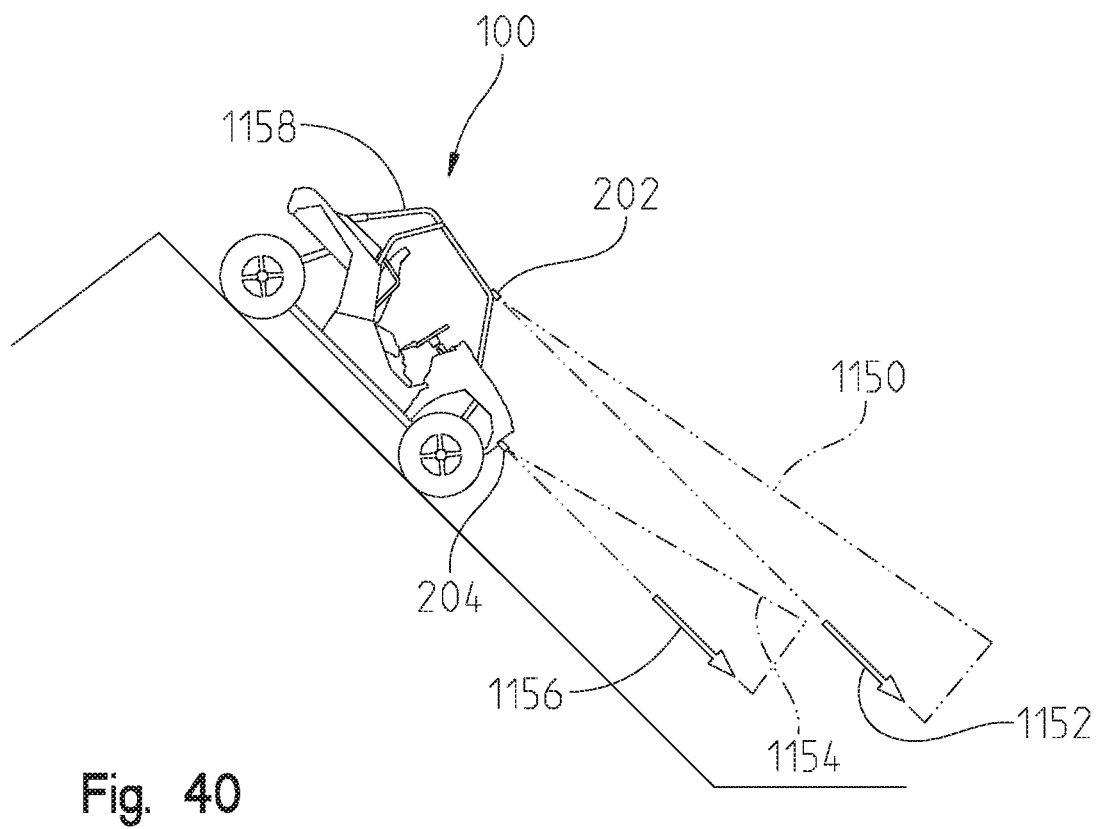
FIG. 40 illustrates controlling one or more light devices based on an exemplary vehicle traveling downhill.

FIG. 37 illustrates another example flowchart describing a processing sequence 1100 for a controller (e.g., the user interface controller 156 and/or the accessory controller 140) to control and/or customize accessories based on user input and/or vehicle parameters. Processing sequence 1100 will be described with reference to FIGS. 38-40. FIGS. 38-40 illustrate using a controller to control light devices (e.g., OEM light devices and/or light accessories) based on user input and/or vehicle parameters for the vehicle 100. For example, one or more light accessories connected to the vehicle 100 (e.g., light accessories 202, 204, and/or 206) may be enabled, disabled, and/or actuated (e.g., angled) differently based on an orientation of the vehicle 100 (e.g., whether the vehicle 100 is on flat ground, uphill, or downhill). For instance, by angling and/or enabling/disabling the connected light accessories, the light accessories 202, 204, and/or 206 may provide additional lighting to the terrain that the vehicle 100 is traversing. In one embodiment, an angle of a lighting device may be altered by actuating an actuator that changes an orientation of a light device relative to the frame of the vehicle. In one embodiment, an angle of a lighting device may be altered by moving a component internal to the light device, such as a light source, a reflector, a lens, or other component to alter a direction that light exits the lighting device.

In other words, the user may seek to supplement lighting provided by the OEM lighting configuration for the vehicle 100 by connecting one or more light accessories 202, 204, and/or 206. Further, a vehicle may include as OEM lighting devices headlights, taillights, and one or more light accessories 202, 204, and/or 206. Depending on whether the vehicle 100 is traveling uphill and/or downhill, the controller 156 may control the connected light accessories 202, 204, and/or 206 to provide additional lighting for the vehicle 100. For example, the controller 156 may activate different light accessories 202, 204, and/or 206 to provide additional lighting and/or angle the connected light accessories 202, 204, and/or 206 to provide lighting to different portions of the terrain being traversed. By providing additional lighting using the connected accessories 202, 204, and/or 206, the processing sequence 1100 may assist the user in traversing off-road terrain. For example, the additional lighting provided by the accessories 202, 204, and/or 206 may allow the user to see obstacles in the off-road terrain so that the user may be able to navigate around the obstacles. This will be explained in further detail below.

The operation of the light accessories 202, 204, and 206 are described above and also shown in FIG. 4. However, as mentioned above, light accessories 202, 204, and 206 are merely exemplary accessories that may be identified and controlled by the controller 156 and/or 140. In other words, in some examples, the controller 156 may control other types of light accessories to provide additional lighting to assist the user in navigating off-road terrain, including when the vehicle 100 is traversing uphill or downhill terrain.

Referring to FIG. 26, processing sequence 1100 is a more detailed implementation of processing sequence 800. For example, as will be explained in further detail below, blocks 1102, 1004, 1006, 1108, and 1110 relate to blocks 802, 804, 806, 808, and 810 respectively.

In operation, as represented by block 1102, the controller 156 receives information indicating user customization for the light devices such as the connected light accessories 202 and/or 204. For example, the user may use the user interface 150 to input user customization information (e.g., customization parameters) for the connected accessory. The user interface 150 may provide the information indicating the user customization input to the controller 156.

The dotted lines around block 1102 indicate that, in embodiments, the block 1102 is optional. For example, when not present, the processing sequence 1100 may begin with block 1104. In other words, after the light accessories 202, 204, and/or 206 are installed as described above in processing sequence 400, the controller 156 automatically controls the OEM lights and/or light accessories 202, 204 206 based on the orientation of the vehicle 100 to provide additional light for the vehicle 100.

When present, the controller 156 may receive user input permitting the controller 156 to control the OEM lights and/or light accessories 202, 204, 206 based on the orientation of the vehicle 100 (e.g., uphill, downhill, flat ground). Additionally, and/or alternatively, the user input may indicate customizable parameters for the light accessories 202, 204, and/or 206 such as adjusting the angle of the light accessories 202, 204, and/or 206 and/or enabling/disabling the connected light accessories 202, 204, and/or 206.

As represented by block 1104, the controller 156 receives sensor information from one or more sensors, components and/or entities. For example, referring to FIG. 11, the accessory controller 140 receives sensor information from multiple different sensors, components, and/or entities, including the electrical power supply voltage sensor 308, the engine speed sensor 304, the vehicle speed sensor 302, the steering sensor 306, the engine boost level sensor 314, the inertial measurement unit (IMU) 312, the gear position sensor 310, the ambient light detection sensor 316, the location determiner 184, and/or any additional sensors coupled to the vehicle 100. After receiving the sensor information, the accessory controller 140 transmits the sensor information to the controller 156.

The inertial measurement unit (IMU) 312 provides information indicating an inertial measurement, such as a yaw angle, a pitch angle, a roll angle, a yaw rate, a pitch rate, a roll rate, a longitudinal acceleration, and/or a lateral acceleration, to the controller 156 via the controller 140. The IMU 312 is any type of sensor that detects at least one of a yaw angle, a pitch angle, a roll angle, a yaw rate, a pitch rate, a roll rate, a longitudinal acceleration, and/or a lateral acceleration of the vehicle 100.

As represented by block 1106, the controller 156 determines an orientation (e.g., uphill, downhill, and/or flat ground) of the vehicle 100 based on the user input from block 1102 and/or the vehicle parameters from block 1104. For example, the controller 156 may receive a pitch angle of the vehicle 100 from the IMU 312. Based on the pitch angle of the vehicle 100, the controller 156 determines the orientation of the vehicle 100. Additionally, and/or alternatively, the controller 156 may use other vehicle parameters (e.g., longitudinal acceleration, lateral acceleration, roll angle, vehicle speed, and/or engine speed) to determine the orientation of the vehicle 100. Details regarding using vehicle parameters to determine the orientation of the vehicle 100 are disclosed in U.S. patent application Ser. No. 16/198,280, filed Nov. 21, 2018, the disclosure of which is expressly incorporated by reference herein.

In some examples, the controller 156 determines the orientation of the vehicle 100 without using the user input from block 1102 (e.g., when block 1102 is not present). In other examples, the user input may indicate user-defined thresholds for determining whether the vehicle 100 has a downhill orientation, uphill orientation, or on flat ground. For example, the user may use the user interface 150 to set customizable parameters (e.g., pitch angle and/or other vehicle parameters) for one or more light accessories 202, 204, and/or 206. The controller 156 compares the customizable parameters with the vehicle parameters from the IMU 312 to determine the orientation of the vehicle 100. For instance, the customization parameters may indicate that if the vehicle's 100 pitch angle exceeds a threshold, the controller 156 may determine the orientation of the vehicle as uphill or downhill. The user may use the user interface to continuously change this parameter throughout their operation of the vehicle 100.

In some variations, block 1106 is a more detailed implementation of block 806. For example, the vehicle parameters may satisfy one of the three customization parameters (e.g., vehicle 100 is uphill, downhill, or on flat ground) for the light accessories 202, 204, 206 and the processing sequence may continuously move onto the next block (e.g., block 808/block 1108).

As represented by block 1108, the controller 156 generates instructions to control the light devices based on the orientation of the vehicle 100 and/or the user input. For example, based on whether the vehicle 100 is oriented uphill, downhill, or on flat ground, the controller 156 generates instructions to adjust the angle of one or more the light accessories 202, 204, and/or 206 and/or activate/de-activate one or more of the light accessories 202, 204, and/or 206. For instance, in some variations, the light accessories 202, 204, and/or 206 may include an actuator (e.g., a motor) that is in communication with a controller such as the controller 156 and/or 140. Based on instructions from the controller 156, the actuator may rotate the lights from the light accessory up or down to adjust the direction of the light beam generated by the light accessory. As represented by block 1110, the controller 156 provides the generated instructions to the light devices and/or to the accessory controller 140 to provide to the light devices.

FIG. 38-40 will be used to describe an exemplary example of the controller 156 using the processing sequence 1100 to control light devices based on the orientation of the vehicle 100. The vehicle 100 is shown with two light accessories 202 and 204. The vehicle 100 includes a roll cage 1158. The roll cage 1158 extends over an operator seat and the second lighting device is supported by the roll cage 1158. However, other examples of using processing sequence 1100 to control the light devices are also contemplated.

Referring to FIG. 38, the vehicle 100 is oriented on flat ground. The direction arrows 1152 and 1156 indicate a direction that is parallel to the vehicle 100 (e.g., straight-ahead of the vehicle 100). Based on the determined orientation of the vehicle 100 (e.g., on flat ground), the controller 156 generates and/or provides instructions to the light accessories 202 and 204 to activate (e.g., turn on) the light accessories 202 and 204. Additionally, and/or alternatively, the controller 156 generates and/or provides instructions to the light accessories 202 and 204 to control (using the actuator) the direction of the light beams 1150 and 1156.

Referring to FIG. 39, the vehicle 100 is oriented uphill. For example, the vehicle 100 is traveling on flat ground and then begins traveling uphill. Based on the determined change in orientation of the vehicle 100 (e.g., flat ground to uphill), the controller 156 generates and/or provides instructions to the light accessories 202 and 204 to activate (e.g., turn on) the light accessory 204 and de-active (e.g., turn off) the light accessory 202. Additionally, and/or alternatively, the controller 156 generates and/or provides instructions to the light accessory 204 to control (using the actuator) the direction of the light beam 1156. For example, the controller 156 provides instructions to the actuator to orient the light beam downward relative to direction arrow 1156 (e.g., direction parallel to the vehicle 100) based on determining the vehicle 100 is travelling uphill.

Referring to FIG. 40, the vehicle 100 is oriented downhill. For example, the vehicle 100 is traveling uphill and after reaching the top, the vehicle 100 begins travelling downhill. Based on the determined change in orientation of the vehicle 100 (e.g., uphill to downhill), the controller 156 generates and/or provides instructions to the light accessories 202 and 204 to activate (e.g., turn on) the light accessories 202 and 204. Additionally, and/or alternatively, the controller 156 generates and/or provides instructions to the light accessory 202 and 204 to control (using the actuator) the direction of the light beams 1150 and 1156. For example, direction arrows 1152 and 1156 are still parallel to the vehicle 100. The controller 156 provides instructions to the actuator to orient the light beam upward relative to direction arrows 1152 and 1156 based on determining the vehicle 100 is travelling downhill.

In some examples, the instructions may indicate to turn off one or more rows/columns of lights for the light accessories based on the orientation of the vehicle 100. For example, based on the orientation of the vehicle 100, the controller 156 de-activates and/or activates one or more rows/columns of lights for a light accessory such as light bar 202. For instance, if the vehicle 100 is traveling uphill, the controller 156 may activate the top row of lights for the light bar 202. If the vehicle 100 is traveling downhill, the controller 156 may activate the bottom row of lights for the light bar 202.

In some variations, the controller 156 may activate a light device (e.g., the accessory light 202 from FIGS. 38-40) based on a vehicle characteristic such as the pitch angle. For example, referring to block 1106 and 1108, if the pitch angle exceeds a pre-determine and/or user-defined threshold (e.g., the vehicle 100 moves from flat ground to an uphill or downhill orientation), the controller 156 may activate the light accessory 202 and adjust the angle of the light beam generated by the light accessory 202.

Activation of Light Accessories Based on Location of User Locator Device

Figure 41:
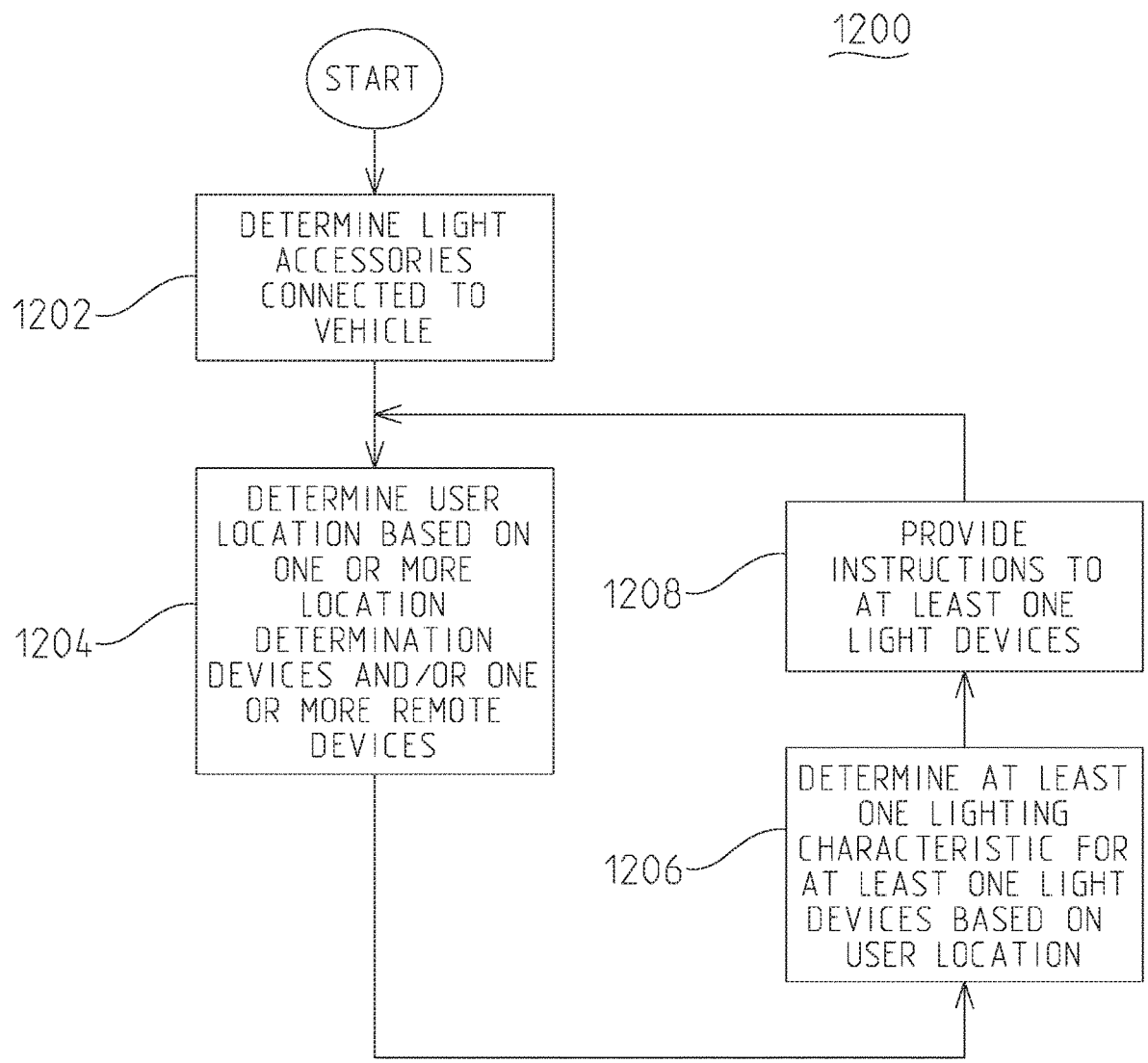
FIG. 41 illustrates an exemplary flowchart for controlling the one or more light devices based on user location.
Figure 42:
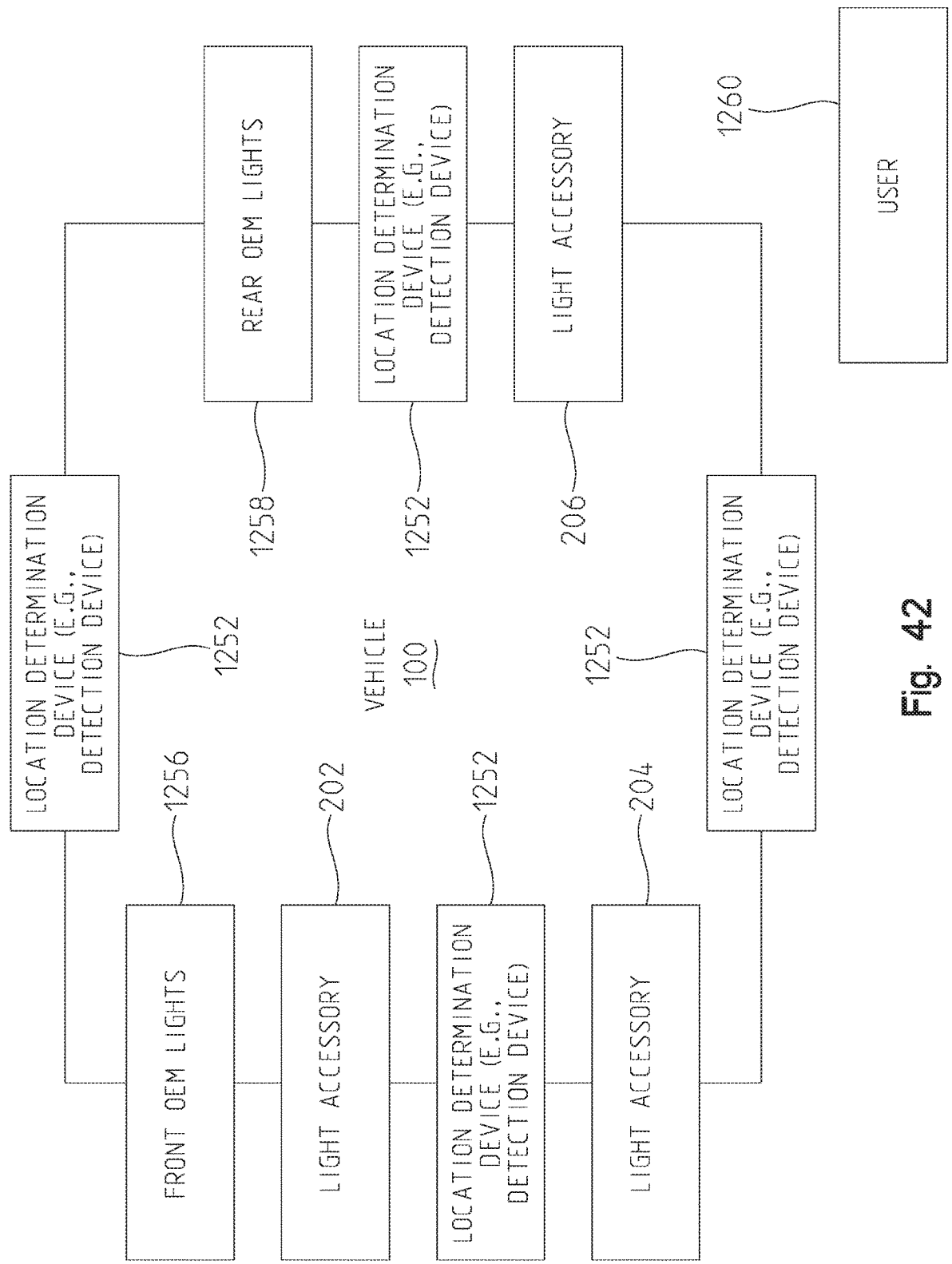
FIG. 42 illustrates a representative view of exemplary components of the vehicle of FIG. 1 and a user.
Figure 43:
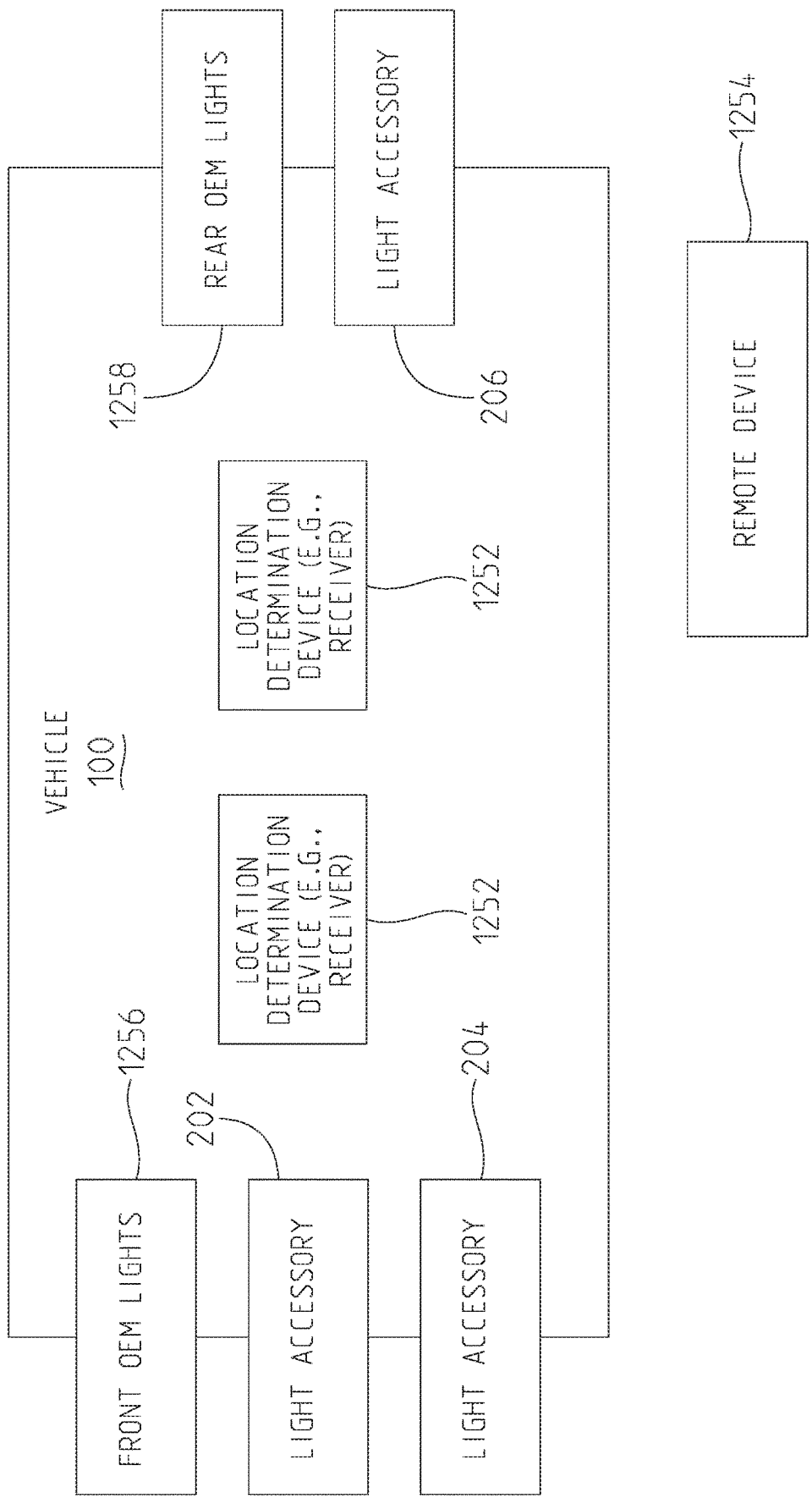
FIG. 43 illustrates another representative view of exemplary components of the vehicle of FIG. 1 and a remote device.

FIG. 41 illustrates an example flowchart describing a processing sequence 1200 for a controller (e.g., the user interface controller 156 and/or the accessory controller 140) to control light accessories based on a user location. Processing sequence 1200 will be described with reference to FIGS. 42 and 43. FIGS. 42 and 43 illustrate exemplary examples of the vehicle 100 with location determination devices 1252, a remote device 1254, and a user 1260. For example, the user may connect light accessories to the vehicle 100 such as light accessories to the front and/or rear of the vehicle 100. Then, based on a location of a user (e.g., user 1260) relative to the vehicle 100, the controller 156 may activate one or more light accessories 202, 204, and/or 206. For instance, the user 1260 may be completing a task at the front of the vehicle 100 and may seek additional lighting to complete the task. The controller 156 may detect the location of the user and then may activate one or more light accessories to provide additional lighting to the user. This will be described in further detail below.

In operation, as represented by block 1202, the controller 156 determines (identifies) light accessories connected to the vehicle 100. For example, as mentioned above in processing sequence 400, the controller 156 determines and/or receives information indicating the accessories, such as accessory 202, 204, 206, 208, are connected to the accessory controller 140. The controller 156 uses this information to identify the accessories connected to the vehicle 100.

As represented by block 1204 and referring to FIGS. 42 and 43, the controller 156 determines a user location based on one or more location determination devices 1252 and/or one or more remote devices 1254. Exemplarily location determination devices 1252 include, but are not limited to, an antenna/receiver to determine a signal characteristic from a remote device 1254 and/or a detection device (e.g., a camera, a vision-type device, heat-seeking sensor, a motion sensor, and/or an ultrasonic sensor).

Referring to FIG. 42, the vehicle 100 includes front and rear OEM lights 1256 and 1258, one or more light accessories 202, 204, and/or 206, location determination devices 1252 such as detection devices. In FIG. 42, the user 1260 is also located at the rear portion of the vehicle 100 outside of an envelope of vehicle 100. The detection devices 1252 may be operatively coupled to and/or attached to the vehicle 100. For example, the detection devices 1252 may be attached to the exterior of the vehicle 100 at the front, rear, and side of the vehicle 100. However, FIG. 42 illustrates only one example of the number of detection devices 1252 and their respective locations. In other examples, the number of detection devices 1252 may be greater or less than 4 devices and may be operatively coupled to sections of the vehicle 100. For example, in another example, the vehicle 100 may include two detection devices attached to the rear of the vehicle 100—one on the left rear side of the vehicle 100 and the other on the right rear side of the vehicle 100. Additionally, and/or alternatively, the detection devices 1252 may be in the interior of the vehicle 100 such as on the interior dashboard or window of the vehicle 100.

As represented by block 1206, the controller 156 determines at least one lighting characteristic for at least one light device (e.g., light accessories 202, 204, 206, front OEM lights 1256, and/or rear OEM lights 1258) based on the user location. The lighting characteristic may include to activate/de-activate the light devices, adjust an orientation of the light devices, and/or adjust a brightness of the light devices. For example, the detection devices 1252 may detect a location of the user 1260 (e.g., at the rear of the vehicle 100, at the front of the vehicle, on a driver side of the vehicle, and on a passenger side of the vehicle). The detection devices 1252 may provide information back to the controller 156 indicating the location of the user. Then, the controller 156 may determine to activate light accessory 206 and/or the rear OEM lights 1258 based on the user location. As represented by block 1208, the controller 156 provides the instructions to the at least one light devices indicating the at least one lighting characteristic. For example, the controller 156 provides instructions to activate the light accessory 206 and the rear OEM lights 1258. In other words, the controller 156 alters a lighting characteristic of the at least one light device (e.g., activating, de-activating, adjusting an orientation, and/or adjusting a brightness).

After block 1208, the processing sequence 1200 moves back to block 1204. In other words, the processing sequence 1200 may repeat continuously. For instance, in some variations, the user 1260 may move from one position relative to the vehicle 100 to another position (e.g., from the rear of the vehicle 100 to the front of the vehicle 100). The controller 156 may use processing sequence 1200 to automatically de-activate and/or activate lighting devices based on the movement of the user. For example, if the controller 156 determines the user 1260 moves from the rear of the vehicle 100 to the front of the vehicle 100, the controller 156 may de-activate the lighting devices at the rear of the vehicle 100 (e.g., light accessory 206 and/or the rear OEM lights 1258) and may activate the lighting devices at the front of the vehicle 100 (e.g., the light accessories 202, 204 and the front OEM lights 1256).

FIG. 43 shows another exemplary implementation of the controller 156 using the processing sequence 1200 to control light accessories based on user location. For example, instead of the location determination device 1252 being a detection device, the location determination device 1252 may be one or more signal receivers. The controller 156 may use the receivers 1252 to determine a signal characteristic (e.g., signal strength and/or time characteristic) from a remote device 1254, and then use the signal characteristic to determine the user location. Exemplarily remote devices 1254 include, but are not limited to, the communication device (e.g., mobile phone or smartphone) such as the communication device 222 shown on FIG. 13, a FOB device such as the FOB device 920 shown in FIG. 33, and/or any type of transmitter device such as a transmitter device located on a helmet or other apparel that may be worn by the user.

The receivers 1252 may be located in a front portion of the vehicle 100 and a rear portion of the vehicle 100. In some instances, the controller 156 may use the signal strength to determine the location of the remote device 1254. For instance, if the signal strength from the remote device 1254 is greater for the receiver 1252 at the front portion of the vehicle 100 compared to the signal strength for the receiver 1252 at the rear portion of the vehicle 100, the controller 156 determines the user is located at the front of the vehicle 100. Then, as described above in blocks 1206 and 1208, the controller 156 determines to activate the light devices at the front of the vehicle 100 (e.g., accessories 202, 204, and front OEM lights 1256). Similarly, based on the signal strength from the receivers 1252, the controller 156 may determine the user moved from the front of the vehicle 100 to the rear of the vehicle 100, the controller 156 may de-activate the front light devices and activate the rear light devices (e.g., light accessory 206 and/or rear OEM lights 1258). FIG. 43 illustrates only one example of the number of receivers 1252 and their respective locations. In other examples, the number of receivers 1252 may be greater or less than 2 and may be at different locations of the vehicle 100.

In some examples, the controller 156 may use a time characteristic to determine the user location. For example, the receivers 1252 may send out a signal to the remote device 1254 and may receive a response (e.g., pinging the remote device 1254). The receivers 1254 may provide information to the controller 156 indicating the response time. The controller 156 may use the response time to determine a location of the remote device 1254.

In some variations, one or more detection devices 1252 (e.g., a camera) is oriented facing an operator seat of the vehicle 100. In other words, the location determination devices 1252 may detect an orientation of the user operating the vehicle 100. The controller 156 may receive information indicating the orientation of the user using the detection devices 1252. The controller 156 may use this information to control the light devices including the light accessories such as 202, 204, and/or 206. For example, based on the orientation of the user (e.g., the direction the user's head/eyes are facing), the controller 156 may activate, de-activate, and/or adjust an angle of the light beam for the light devices. In other words, if the controller 156 determines the user is facing and/or looking left, the controller 156 may activate/de-activate and/or adjust the light beam to face where the user is facing and/or looking.

In one or more embodiments above, substantially zero is any value which is effectively zero. For example, a substantially zero value does not provide an appreciable difference in the operation compared to when the value is zero.

The above detailed description of the present disclosure and the examples described therein have been presented for the purposes of illustration and description only and not by limitation. It is therefore contemplated that the present disclosure covers any and all modifications, variations or equivalents that fall within the scope of the basic underlying principles disclosed above and claimed herein.

What is claimed is:

1. A recreational vehicle operatively coupled to a user interface, comprising:
   a plurality of ground engaging members;
   a frame supported by the plurality of ground engaging members;
   an electrical power supply supported by the frame and configured to provide power to at least one removable accessory;
   at least one sensor operatively coupled to the frame and configured to provide sensor information; and
   a controller operatively coupled to the frame and configured to:
      receive, via a user interface, user input indicating at least one user priority;
      receive the sensor information from the at least one sensor; and
      adjust the power from the electrical power supply to the at least one removable accessory based on the sensor information and the user input.

2. The recreational vehicle of claim 1, wherein the user input indicates a threshold to adjust the power to the at least one removable accessory, wherein the sensor information indicates a sensor value, and wherein the controller is configured to adjust the power from the electrical power supply to the at least one removable accessory based on determining whether the sensor value satisfies the threshold from the user input.

3. The recreational vehicle of claim 1, wherein the at least one sensor comprises an electrical power supply voltage sensor configured to provide an electrical power supply voltage to the controller, and wherein the controller is configured to adjust the power from the electrical power supply to the at least one removable accessory based on the user input and determining the electrical power supply voltage satisfies a threshold.

4. The recreational vehicle of claim 1, wherein the recreational vehicle further comprises an engine supported by the frame, wherein the at least one sensor comprises an engine speed sensor configured to:
   monitor an engine speed of the engine; and
   provide the engine speed to the controller, and
   wherein the controller is configured to adjust the power from the electrical power supply to the at least one removable accessory based on the user input and based on determining the engine speed satisfies a threshold.

5. The recreational vehicle of claim 1, wherein the at least one sensor comprises an accessory current consumption sensor configured to:
   detect a current consumption of the at least one removable accessory; and
   provide the current consumption to the controller, and
   wherein the controller is configured to adjust the power from the electrical power supply to the at least one removable accessory based on the user input and based on determining the current consumption satisfies a threshold.

6. The recreational vehicle of claim 5, wherein the controller is further configured to:
   determine a voltage corresponding to the at least one removable accessory;
   determine a power consumption of the at least one removable accessory based on the voltage and the current consumption, and
   wherein the controller is configured to adjust the power from the electrical power supply to the at least one removable accessory based on the user input and the power consumption of the at least one removable accessory.

7. The recreational vehicle of claim 5, wherein the controller comprises the accessory current consumption sensor, and wherein the controller is configured to detect the current consumption of the at least one removable accessory.

8. The recreational vehicle of claim 1, wherein the user input indicates a first maximum current allowed threshold for a first accessory of the at least one removable accessory, and
   wherein the at least one sensor comprises an accessory current consumption sensor configured to:
   detect a first current consumption of the first accessory; and
   provide the first current consumption to the controller, and
   wherein the controller is configured to terminate the power from the electrical power supply to the first accessory based on determining whether the first current consumption of the first accessory satisfies the first maximum current allowed threshold.

9. The recreational vehicle of claim 8, wherein the user input further indicates a second maximum current allowed threshold for a second accessory of the at least one removable accessory,
   wherein the second maximum current allowed threshold is different from the first maximum current allowed threshold,
   wherein the accessory current consumption sensor is configured to:
   detect a second current consumption of the second accessory; and
   provide the second current consumption to the controller, and
   wherein the controller is configured to terminate the power from the electrical power supply to the second accessory based on determining whether the second current consumption of the second accessory satisfies the second maximum current allowed threshold.

10. A method for controlling a plurality of accessories connected to a vehicle, comprising:
   receiving user input indicating a plurality of priorities corresponding to the plurality of accessories;
   receiving, from at least one sensor, sensor information indicating a vehicle parameter;
   determining at least one accessory from the plurality of accessories based on the plurality of priorities and the vehicle parameter satisfying a vehicle parameter threshold associated with the at least one accessory; and
   providing one or more commands to limit an amount of power supplied to the at least one accessory.

11. The method of claim 10, further comprising:
   determining a plurality of vehicle parameter thresholds based on the plurality of priorities;
   determining whether to turn off power to the at least one accessory based on comparing the vehicle parameter with the plurality of vehicle parameter thresholds, and
   wherein providing the one or more commands comprises providing one or more commands to turn off the power to the at least one accessory.

12. The method of claim 10, further comprising:
   determining a plurality of vehicle parameter thresholds based on the plurality of priorities;
   determining whether to reduce the amount of power supplied to the at least one accessory based on comparing the vehicle parameter with the plurality of vehicle parameter thresholds, and
   wherein the providing the one or more commands comprises providing one or more commands to reduce the amount of power supplied to the at least one accessory.

13. The method of claim 10, wherein each priority of the plurality of priorities has a corresponding accessory of the plurality of accessories.

14. The method of claim 10, wherein the sensor information indicating the vehicle parameter comprises electrical power supply voltage information indicating a state of charge of an electrical power supply.

15. The method of claim 10, wherein the sensor information indicating the vehicle parameter comprises engine speed information indicating whether an engine of the vehicle is turned off.

16. The method of claim 10, wherein the sensor information indicating the vehicle parameter comprises sensor information indicating a total current consumption of the plurality of accessories or a total power consumption of the plurality of accessories.

* * * * *